United States Patent
Nishikawa et al.

(10) Patent No.: US 7,215,451 B1
(45) Date of Patent: May 8, 2007

(54) REFLECTION TYPE DIFFUSE HOLOGRAM, HOLOGRAM FOR REFLECTION HOLOGRAM COLOR FILTERS, ETC., AND REFLECTION TYPE DISPLAY DEVICE USING SUCH HOLOGRAMS

(75) Inventors: Shingo Nishikawa, Tokyo (JP); Kenji Ueda, Tokyo (JP); Toshikazu Segawa, Tokyo (JP); Tsuyoshi Hotta, Tokyo (JP); Yuko Kuwabara, Tokyo (JP); Masachika Watanabe, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/116,589

(22) Filed: Jul. 16, 1998

Related U.S. Application Data

(63) Continuation-in-part of application No. 08/839,666, filed on Apr. 15, 1997, now abandoned.

(30) Foreign Application Priority Data

| Apr. 15, 1996 | (JP) | 8/092518 |
| May 17, 1996 | (JP) | 8/123390 |
| Jul. 22, 1996 | (JP) | 8/192020 |
| Jul. 26, 1996 | (JP) | 8/197574 |
| Sep. 9, 1996 | (JP) | 8/237857 |
| Jul. 16, 1997 | (JP) | 9-190970 |

(51) Int. Cl.
  G03H 1/20 (2006.01)
  G03H 1/22 (2006.01)
  G02B 5/32 (2006.01)

(52) U.S. Cl. .............. 359/12; 359/15; 359/22; 359/24; 359/32

(58) Field of Classification Search ............ 359/9, 359/10, 11, 12, 13, 14, 22, 35, 1, 32, 634, 359/15, 24; 430/1, 2
See application file for complete search history.

(56) References Cited

U.S. PATENT DOCUMENTS 3,647,289 A * 3/1972 Weber .............. 359/12

(Continued)

*Primary Examiner*—Audrey Chang
(74) *Attorney, Agent, or Firm*—Sughrue Mion, PLLC

(57) ABSTRACT

A method of fabricating a hologram having a pattern made up of pixels in which a photosensitive material for forming a hologram is stacked on either a reflection-type hologram or a transmission type hologram. According to one aspect of the invention, the photosensitive material is stacked on a reflection-type relief hologram and reconstructing illumination light of a given wavelength is struck on the reflection-type relief hologram through the photosensitive material, so that interference fringes produced by interference of the light diffracted from the reflection type relief hologram and the incident light are recorded in the photosensitive material. According to another aspect of the invention, the photosensitive material is stacked on a transmission-type hologram, and reconstructing illumination light of a given wavelength is struck on a side of the transmission type hologram that is not opposite to the volume hologram photosensitive material, so that interference fringes produced by interference of light diffracted from the transmission type hologram and reference light incident on the photosensitive material are recorded in the photosensitive material. According to a third aspect of the invention, the photosensitive material is stacked on a transmission type hologram, and reconstructing illumination light of a given wavelength is struck on a side of the transmission type hologram that is not opposite to the photosensitive material, so that interference fringes produced by interference of light diffracted from the transmission type hologram and zero-order transmitted light are recorded in the photosensitive material, and a reflecting layer is provided on a back side of the photosensitive material.

5 Claims, 32 Drawing Sheets

U.S. PATENT DOCUMENTS

| | | | |
|---|---|---|---|
| 3,758,186 A | * | 9/1973 | Brumm .......................... 359/12 |
| 4,720,158 A | * | 1/1988 | Kawayama et al. ........... 359/12 |
| 4,870,268 A | * | 9/1989 | Vincent et al. .............. 250/226 |
| 4,915,464 A | * | 4/1990 | Hopwood ..................... 359/12 |
| 5,016,953 A | * | 5/1991 | Moss et al. ..................... 359/9 |
| 5,372,900 A | * | 12/1994 | Minami ......................... 359/12 |
| 5,473,447 A | * | 12/1995 | Molteni et al. ................ 359/13 |
| 5,475,201 A | * | 12/1995 | Pike ............................ 219/497 |
| 5,499,118 A | * | 3/1996 | Wreede et al. ................. 359/12 |
| 5,781,317 A | * | 7/1998 | Kawazoe et al. .............. 359/12 |

\* cited by examiner

FIG.13(a)

|  81B | 81G | 81R |   |   |   |
|---|---|---|---|---|---|
| B | G | R | B | G | R |
| B | G | R | B | G | R |
| B | G | R | B | G | R |
| B | G | R | B | G | R |
| B | G | R | B | G | R |

|  81B | 81G | 81R |   |   |   |
|---|---|---|---|---|---|
| B | G | R | B | G | R |
| G | R | B | G | R | B |
| R | B | G | R | B | G |
| B | G | R | B | G | R |
| G | R | B | G | R | B |

|  81B | 81G | 81R |   |   |   |
|---|---|---|---|---|---|
| B | G | R | B | G | R |
|  | R | B | G | R | B |
| B | G | R | B | G | R |
|  | R | B | G | R | B |
| B | G | R | B | G | R |

81

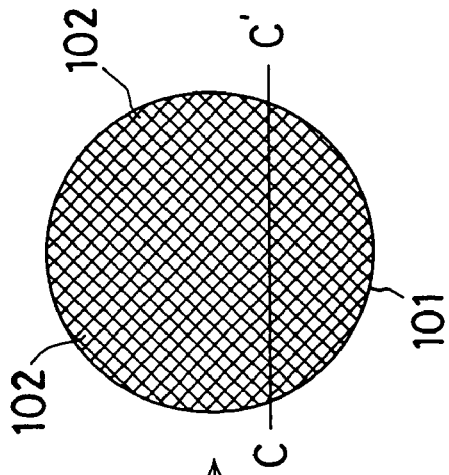
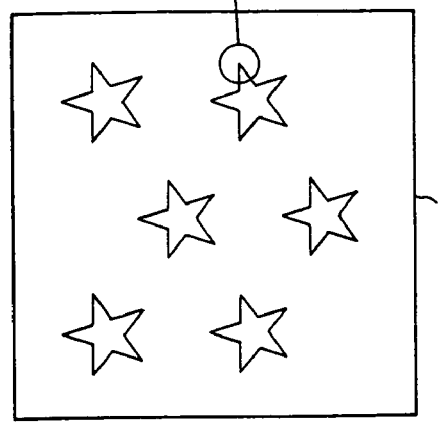
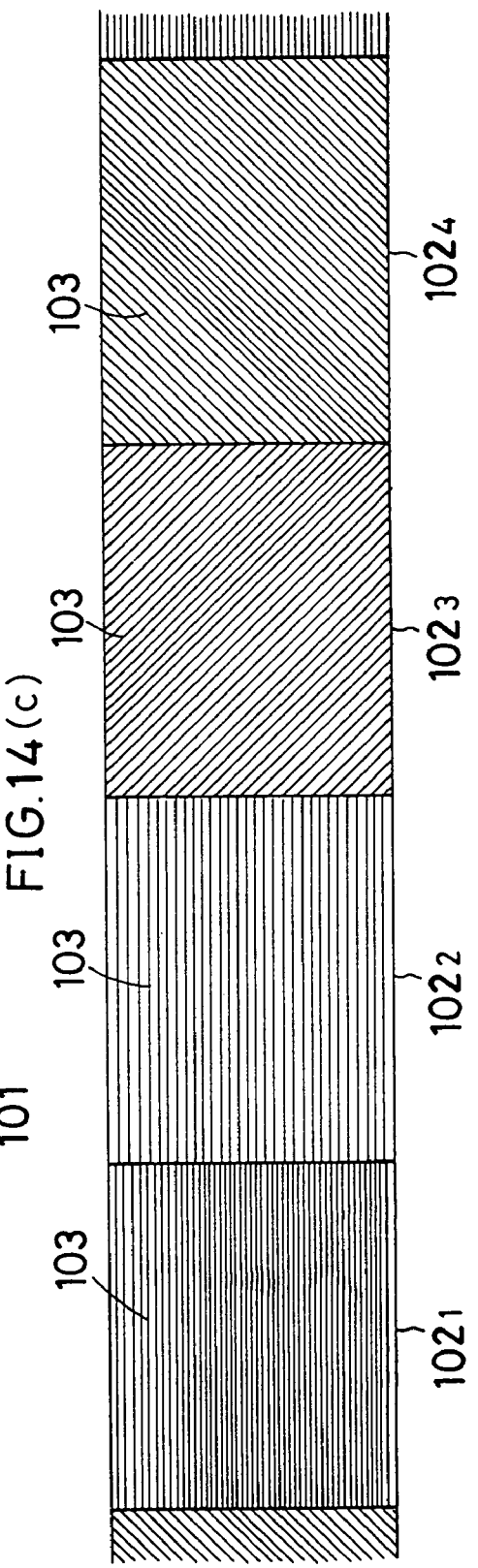

131

132

140

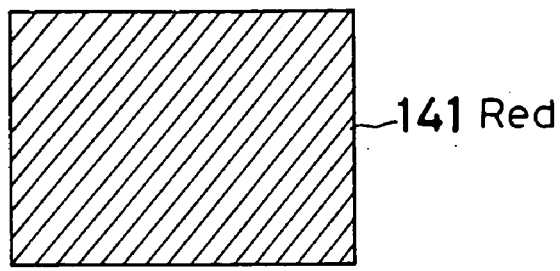
FIG. 34(a) — 141 Red
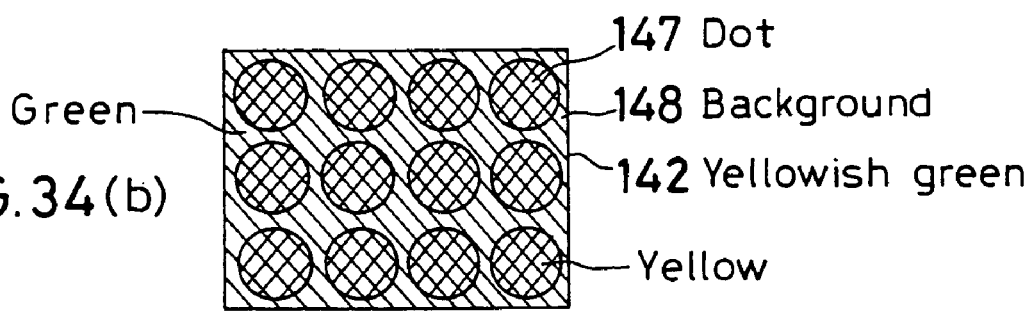
FIG. 34(b) — Green, 147 Dot, 148 Background, 142 Yellowish green, Yellow
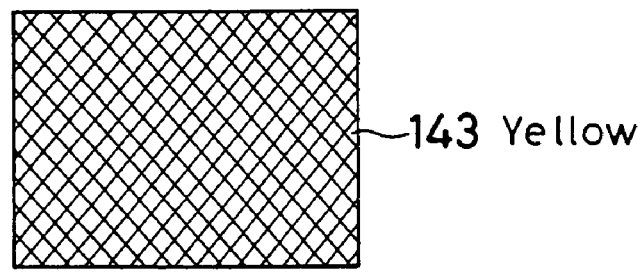
FIG. 34(c) — 143 Yellow
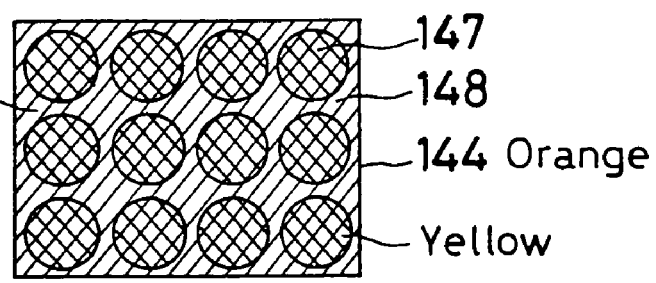
FIG. 34(d) — Red, 147, 148, 144 Orange, Yellow
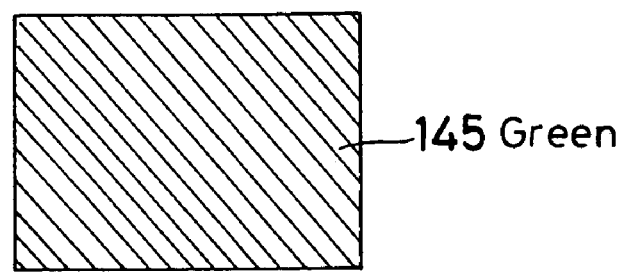
FIG. 34(e) — 145 Green

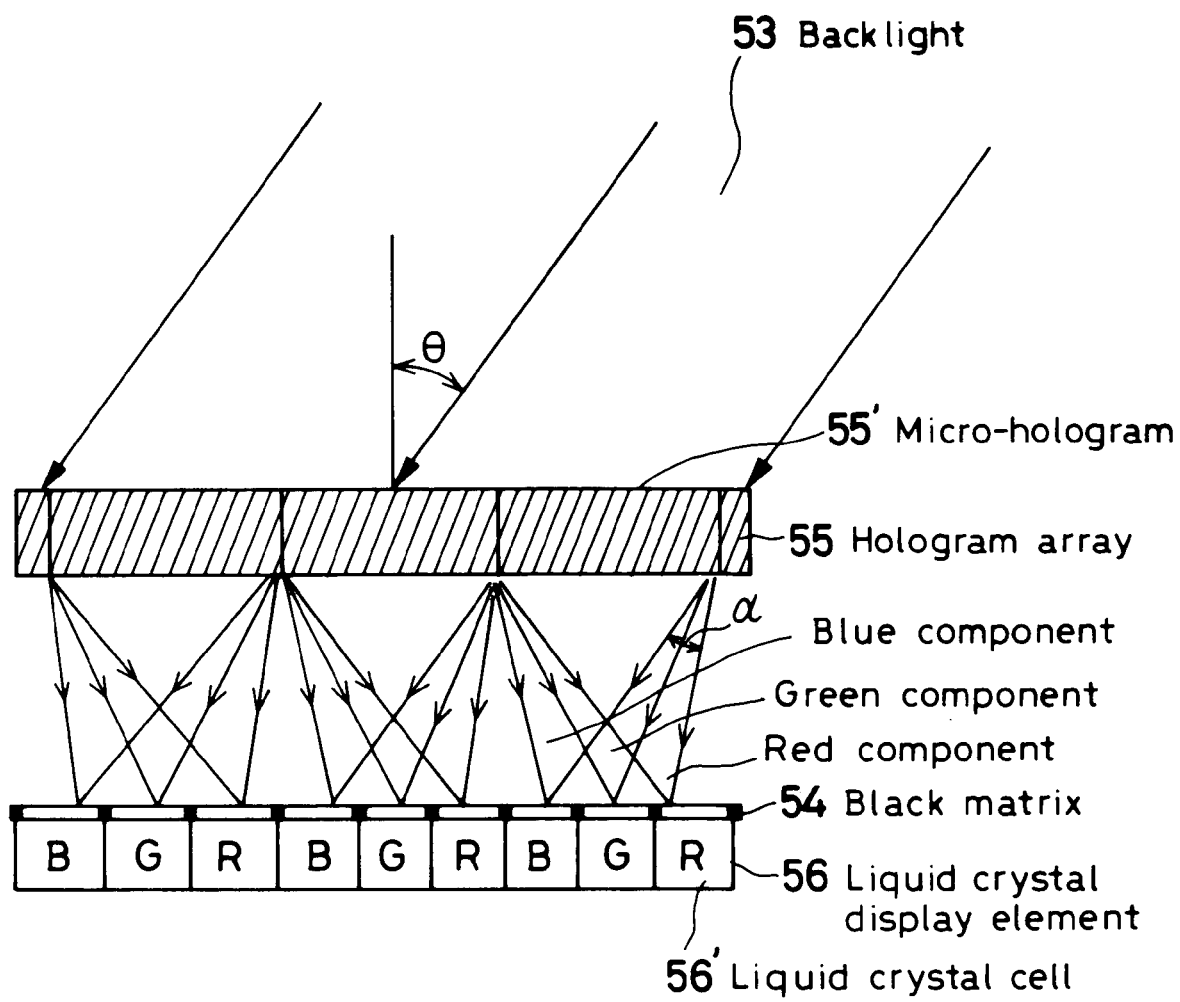

FIG. 44(a)
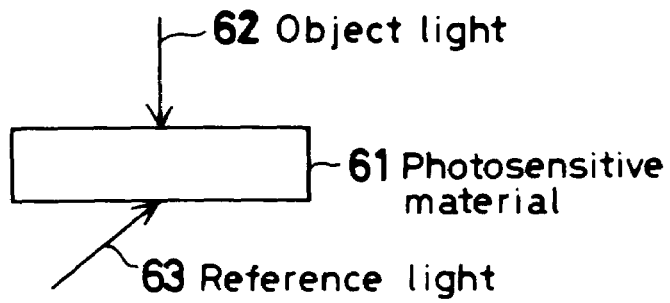
FIG. 44(b)
FIG. 44(c)
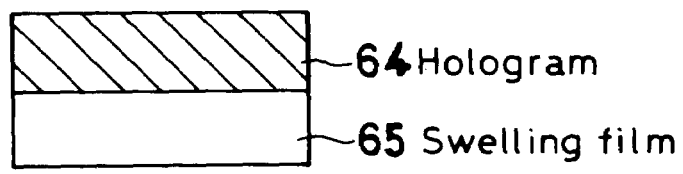
FIG. 44(d1)  FIG. 44(d2)  FIG. 44(d3)
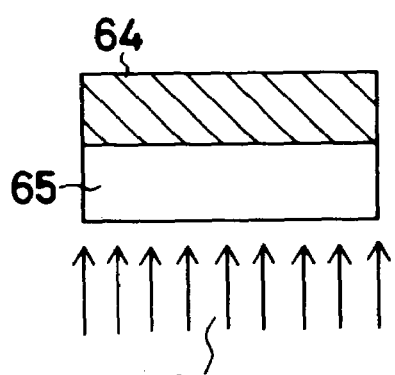 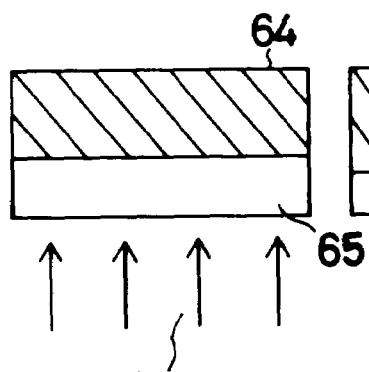 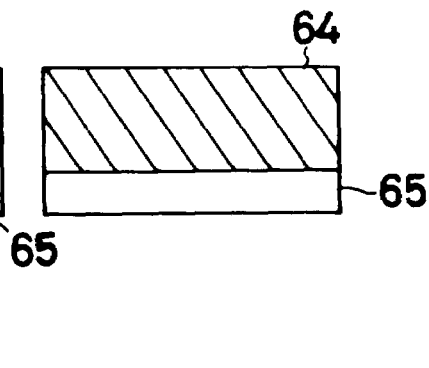
66 Light irradiation    66 Light irradiation FIG. 45(a)
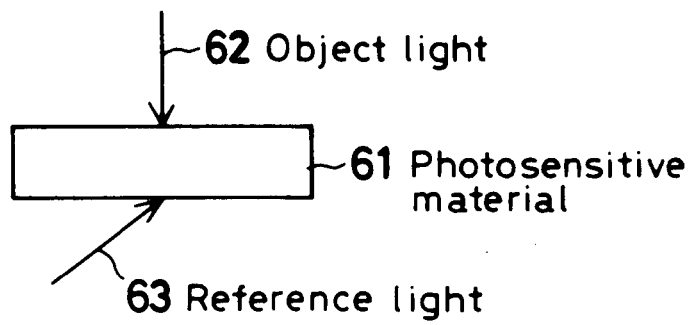
FIG. 45(b)
FIG. 45(c1)  FIG. 45(c2)  FIG. 45(c3)
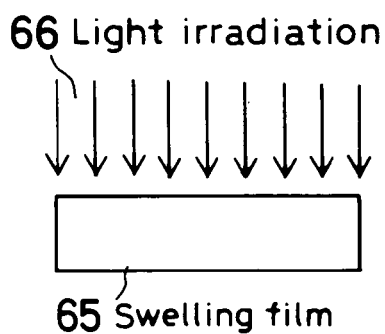 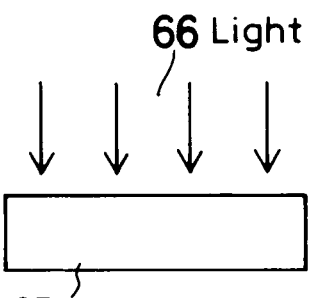 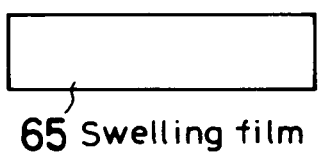
FIG. 45(d1)  FIG. 45(d2)  FIG. 45(d3)
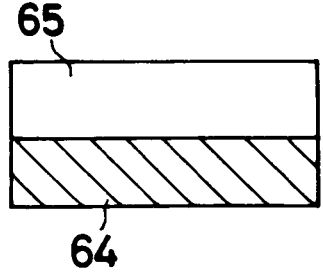 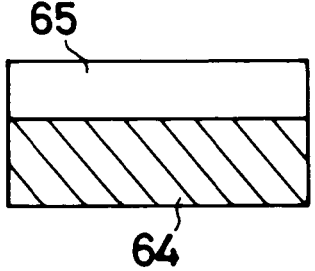 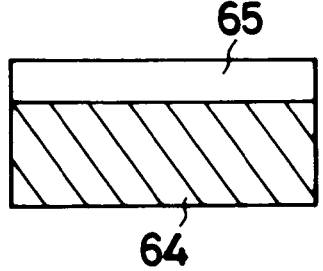

REFLECTION TYPE DIFFUSE HOLOGRAM, HOLOGRAM FOR REFLECTION HOLOGRAM COLOR FILTERS, ETC., AND REFLECTION TYPE DISPLAY DEVICE USING SUCH HOLOGRAMS

This is a Continuation-In-Part or application Ser. No. 08/839,666 filed Apr. 15, 1997 now abandoned.

BACKGROUND OF THE INVENTION

The present invention relates to a reflection type diffuse hologram that can be used for display devices such as liquid crystal display devices, a hologram for reflection hologram color filters, etc., and a reflection type display device using such holograms.

Backlight used with a liquid crystal display device should have some scattering characteristics, so that the display device can have a wide viewing angle. So far, scattering characteristics have been imparted to backlight by use of beads or the like, but a problem with this is that too large an angle of diffusion results in wasteful illumination light loss.

This is also true of an automotive brake lamp or direction indicator. That is, although too large a diffusion angle is not required in view of the positional relation to succeeding cars, light from these lamps is not only wastefully consumed but also becomes dark because lenses positioned in front of the lamps cause the light to be diffused at an angle larger than required.

The present applicant has filed Japanese Patent Application No. 12170/1993 to come up with a color filter in which a hologram is used to achieve a remarkable increase in the efficiency of backlight used for liquid crystal display purposes, etc., and a liquid crystal display device that makes use of such a color filter.

A typical liquid crystal display device that makes use of this hologram color filter will now be briefly described with reference to a sectional view attached hereto as FIG. 43. As illustrated, a hologram array 55 forming the color filter is spaced away from the side of a liquid crystal display element 56 upon which backlight 53 is to strike, said element being regularly divided into liquid crystal cells 56' (pixels). On the back side of the liquid crystal display element 56 and between the liquid crystal cells 56' there are located black matrices 54. Although not illustrated, polarizing plates are arranged on the incident side of the hologram array 55, and the exit side of the liquid crystal display element 56. As is the case with a conventional color liquid crystal display device, between the black matrices 54 there may additionally be located an absorption type of color filters which transmit light rays of colors corresponding to pixels R, G, and B.

The hologram array 55 comprises micro-holograms 55' which are arranged in an array form at the same pitch as that of R, G, and B spectral pixels, corresponding to the period of repetition of R, G, and B spectral pixels, i.e., sets of liquid crystal cells 56', each including three adjoining liquid crystal cells 56' of the liquid crystal display element 56 as viewed in a plane direction of the drawing sheet. One micro-hologram 55' is located in line with each set of three adjoining liquid crystal cells 56' of the liquid crystal display element 6 as viewed in the plane direction of the drawing sheet. The micro-holograms 55' are then arranged in a Fresnel zone plate form such that a green component ray of the backlight 3 incident on the hologram array 55 at an angle θ with respect to its normal line is collected at a middle liquid crystal cell G of the three R, G, and B spectral pixels corresponding to each micro-hologram 55'. Each or the micro-hologram 55' in this case is constructed from a relief, phase, amplitude or other transmission type of hologram which has little, if any, dependence of diffraction efficiency on wavelength. The wording "little, if any, dependence of diffraction efficiency on wavelength" used herein is understood to refer specifically to a hologram of the type which diffracts all wavelengths by one diffraction grating, much unlike a Lippmann type hologram which diffracts a particular wavelength alone but does not substantially permit other wavelengths to be transmitted therethrough. The diffraction grating having little dependence of diffraction efficiency on wavelength diffracts different wavelengths at different angles of diffraction.

In such an arrangement, consider now the incidence of the white backlight 53 from the side of the hologram array 55, which does not face the liquid crystal display element 56 at the angle θ with respect to its normal line. The angle of diffraction of the light by the micro-hologram 55' varies depending on wavelength, so that light collection positions for wavelengths are dispersed in a direction substantially parallel with the surface of the hologram array 55. If the hologram array 55 is constructed and arranged such that the red wavelength component is diffractively collected at a red-representing liquid crystal cell R; the green wavelength component at a green-representing liquid crystal cell G; and the blue wavelength component at a blue-representing liquid crystal cell B, the color components pass through the corresponding liquid crystal cells 56' with no or little attenuation through the black matrices 4, so that color displays can be presented depending on the state of the liquid crystal cells 56' at the corresponding positions. It is here noted that the angle of incidence θ of backlight 53 on the hologram array 55 is determined by various conditions including hologram-recording conditions, the thickness of hologram array 55, and the distance between the hologram array 55 and the liquid crystal display element 56.

By using the hologram array 55 as a color filter in this way, the wavelength components of backlight used with a conventional color filter are allowed to strike on the liquid crystal cells 56' without extravagant absorption, so that the efficiency of utilization thereof can be greatly improved.

The aforesaid hologram color filter proposed by the present applicant is applicable to only a color liquid crystal display device making use of backlight. However, when surrounding ambient light alone is used as illumination light, this hologram color filter cannot diffract, and collect its wavelength components into desired positions. In other words, this hologram color filter can never be applied to a direct-view type of liquid crystal display device or other like device in which surrounding ambient light is used as illumination light, or any particular backlight source is not required.

Moreover, the applicant has filed Japanese Patent Application No. 120016/1993 to come up with a method for using a swelling film to make from a volume hologram having uniform interference fringes recorded therein a color pattern that varies in reconstructed color depending on position. The principles are similar to those applied to a photo-polymer. First, a swelling film is prepared by mixing a monomer or oligomer, a photopolymerization initiator, etc. with a binder polymer. Then, the swelling film is irradiated with a given quantity of light before or after its close contact with a photopolymer or other photosensitive material having interference fringes recorded therein, so that a given proportion of the monomer or oligomer contained in the swelling film, on the one hand, is polymerized for deactivation and the amount of the remaining active monomer or oligomer, on the other hand, is controlled. The thus controlled amount of the monomer or oligomer is diffused, and swollen into the photosensitive material with interference fringes recorded therein, whereby fringe spacings are precisely controlled to any desired quantity to control reconstruction wavelengths to given ones. After this swelling treatment, the photosensitive material with the interference fringe recorded therein is irradiated with light or otherwise heated to fix the diffused monomer or oligomer in the interference fringes, so that there can be obtained a hologram excelling in the storage stability of reconstructed colors. In addition, a color pattern can be formed on the hologram by allowing the illumination light to have a spatial distribution.

This method will now be explained in a little more detail with reference to FIGS. 44 and 45. FIG. 44 illustrates the principles applied when the swelling agent (monomer or oligomer) contained in the swelling film is deactivated by irradiation with light after the swelling film has been brought into close contact with the photosensitive material, and FIG. 45 depicts the principles applied when the swelling agent contained in the swelling film is deactivated by irradiation with light before the swelling film is brought into close contact with the photosensitive material. Referring to FIG. 44(a), such a volume hologram 64 as depicted in FIG. 44(b) is obtained by striking object light 62 and reference light 63 on both sides of a photo-polymer or other photosensitive material 61 to record an interference fringe therein. As depicted in FIG. 44(c), a swelling film 65 prepared by mixing a monomer or oligomer, a photopolymerization initiator, etc. with a binder polymer is then brought into close contact with the photosensitive material. Subsequently, either the hologram 64 or the swelling film 65 is irradiated with light 66, as depicted in FIGS. 44(d1) to (d3), before or at the same time as heating is carried out to increase the degree of diffusion of the penetrating monomer or oligomer in the swelling film 65. This irradiation with light 66 causes a part or all of the penetrating active monomer or oligomer in the swelling film 65 to be polymerized, and so deactivated, at a proportion corresponding to the quantity of irradiating light 66, so that the ability of the monomer or oligomer to penetrate (diffuse) vanishes substantially. When the quantity of irradiating light 66 is large (FIG. 44(d1)), therefore, nearly all of the penetrating active monomer or oligomer in the swelling film 65 is deactivated, so that the monomer or oligomer does not substantially penetrate into the hologram 64 even upon being heated. If, for instance, interference fringes are recorded in the volume hologram 64 with a blue wavelength in FIG. 44(a), the hologram 64 subject to the swelling step in FIG. 44(d1) does not substantially swell, and diffracts and reconstructs blue light. When the quantity of irradiating light 66 is moderate (FIG. 44(d2)), on the other hand, about a half of the penetrating active monomer or oligomer in the swelling film 65 is deactivated. Another half of the penetrating monomer or oligomer penetrates into the hologram 64 upon being heated, which in turn swells moderately. For this reason, the hologram 64 subject to the swelling step shown in FIG. 44(d2) diffracts, and reconstructs green light that is longer in wavelength than blue light. Moreover, when the swelling film is not irradiated with light 66 (FIG. 44(d3)), nearly all of the penetrating monomer or oligomer from the swelling film 65 penetrates into the hologram 64, which in turn swells to the maximum extent. For this reason, the hologram 64 subject to the swelling step shown in FIG. 44(d3) diffracts, and reconstructs red light that is longer in wavelength than green light. By controlling the quantity of light 66 with which the swelling film 65 in close contact with the hologram 64 is irradiated, it is thus possible to optionally regulate the color to be reconstructed to one lying between red and blue.

Referring then to FIG. 45, especially FIGS. 45(a) and 45(b), a volume hologram 64 is obtained as depicted in FIGS. 44(a) and (b). As shown in FIGS. 45(c1) through (c3), a swelling film 65 is prepared by mixing a monomer or oligomer, a photo-polymerization initiator, etc. with a binder polymer. Upon this film being irradiated with a given quantity of light 66, a part or all of the penetrating active monomer or oligomer contained therein is deactivated at a proportion corresponding to the quantity of light 66, so that the ability of the monomer or oligomer to penetrate (diffuse) vanishes. When the swelling film 65 already irradiated with light 66 is brought into close contact with the hologram 64, as depicted in FIGS. 45(d1) through 45(d3), and then heated as shown in FIG. 44, the degree of swelling of the hologram 64 varies depending on the quantity of light 66. By controlling the quantity of light 66 with which the swelling film 65 is irradiated, it is thus possible to optionally regulate the color to be reconstructed to one lying between red and blue.

In this regard, it is noted that the swelling film 65 is prepared by mixing a monomer or oligomer, a photo-polymerization initiator, etc. with a binder polymer, and so is similar to a photopolymer used for recording holograms. Therefore, the hologram-recording photopolymer may be used as the swelling film 65; that is, it is unnecessary to prepare any special swelling film.

The aforesaid color pattern-making method proposed by the present applicant is to control the quantity of light with which the swelling film is irradiated before or after it is brought into close contact with a photosensitive material having interference fringes already recorded therein, thereby controlling the amount of the active monomer or oligomer contained in the swelling film, so that the proportion of swelling of the interference fringes (or the interference fringe spacings) can be controlled to regulate the color to be reconstructed to a given one. In short, the color to be reconstructed is controlled by the quantity of irradiating light.

However, one problem with the aforesaid method is that it is not always easy to precisely control the quantity of light to develop a given color, and another possible problem is that the reproducibility of the color reconstructed is not stable.

SUMMARY OF THE INVENTION

In view of such problems associated with the prior art, it is an object of the present invention to provide a diffusing plate which can use a hologram to limit the angle of diffusion within a desired range, and makes bright display, etc. possible.

Another object of the present invention is to provide a reflection type of direct-view color display device such as a color liquid crystal display device, which makes use of a hologram color filter already proposed by the present applicant but makes no use of any backlight source at all.

Yet another object of the present invention is to provide a reflection type color display device such as a color liquid crystal display device, which uses a hologram reflection layer as a color filter but makes no use of any backlight source.

Still yet another object of the present invention is to provide a hologram recording medium, and a hologram color display medium, which can all be utilized as a color filter of a reflection type color display device, and a method of making them.

According to the present invention, the objects mentioned above can be achieved by the provision of a reflection type diffuse hologram characterized by reflecting, and diffracting light incident thereon at an angle with respect to a normal direction while it is diffused within a desired angle range. Throughout the specification, it is to be noted that the angle of incident light with respect to the normal direction may include 0°, or the angle of incidence may be 0°.

In this case, it is desired that the angle of diffusion lie within a range of 100 to 35°.

Another reflection type diffuse hologram of the present invention is characterized by having been formed by allowing diffused light that diffuses within a desired angle range, and parallel light to strike on both sides of a volume hologram-recording photosensitive material, and interfere therein.

It is here to be noted that an image has simultaneously been recorded in the reflection type diffuse hologram of the present invention in a recontructible fashion.

It is also to be noted that the reflection type diffuse hologram may be located on a backlight side of a liquid crystal display device for diffuse illumination purposes.

The present invention provides a method for fabricating a reflection type diffuse hologram characterized in that a transmission type diffusing plate having a diffusion angle characteristic within a desired angle range is located in close contact with, or in proximity to, a volume hologram-recording photosensitive material, and two light beams are allowed to strike on front and back sides of the combined diffusing plate and photosensitive material for interference recording.

In this case, the transmission type diffusing plate used may be a diffusing plate of a 20% to 60% haze, an array of microlenses, a lenticular screen or the like.

A reflection type of direct-view color display device using a hologram color filter according to the present invention—which is provided to achieve the objects mentioned above—comprises a hologram color filter composed of an array of element light-collecting holograms, each of said element light-collecting holograms comprising a hologram color filter for subjecting white light incident at a given angle with respect to a normal line of a hologram-recorded surface to wavelength dispersion in a direction substantially along said hologram-recorded surface for spectral diffraction, a reflection type hologram located in the vicinity of a light-collection surface thereof, and a transmission type spatial light modulator located between said hologram color filter and said reflection type hologram.

In this case, it is preferable that the reflection type hologram has interference fringes recorded in the vicinity of a position on which white light strikes while said white light is separated into each spectral component of each color, said interference fringes reflecting light of wavelength of each color in an identical direction.

The reflection type hologram may be of diffusibility.

For the transmission type spatial light modulator, for instance, a liquid crystal display element may be used.

A reflection type color display device of the present invention—which is provided to achieve the aforesaid object—is characterized by comprising a transmission type spatial light modulator comprising a collection of pixels, and having a controllable transmittance per pixel, and a reflection type hologram color filter located on a back side of said modulator.

In this case, it is preferable that the reflection type hologram color filter comprises periodically arranged volume hologram elements varying in reflection, and diffraction wavelength for each position of the pixels in the transmission type spatial light modulator.

In this connection, the reflection type hologram color filter may be of diffusibililty.

It is preferable that the reflection type hologram color filter has an absorption layer located on a back side thereof.

Also, the reflection type hologram color filter may be provided on its back side with an absorption type color filter, which is provided on its back side with a backlight source, so that color information is interchangeable when said backlight source is turned on, said color information being displayed on each pixel in the transmission type spatial light modulator.

It is here noted that for the transmission type spatial light modulator, for instance, a liquid crystal display element, a polymer-dispersed type liquid crystal display element or the like may be used.

A hologram-recorded medium of the present invention—which is provided to achieve the aforesaid object—is an imagewise or other pattern-recorded medium comprising a collection of pixels, characterized in that any one of a plurality of volume type diffraction gratings comprising volume holograms and differing from each other is assigned to at least a part of said pixels.

In this case, it is preferable that a plurality of volume type diffraction gratings comprising volume holograms and differing from each other include at least three volume type diffraction gratings which are identical in orientation of grating surface with each other but different in grating spacing from each other.

It is also preferable that at least two of a plurality of mutually different volume type diffraction gratings are multi-recorded in at least a part of the pixels.

It is further preferable that a volume type diffraction grating that expresses red, a volume type diffraction grating that expresses green, and a volume type diffraction grating that expresses blue are assigned to three dot areas into which at least a part of the pixels is divided, or to three adjoining pixels, so that color tone or gradation is controlled by varying a dot percent occupied by said volume type diffraction gratings, or a diffraction efficiency ratio between said volume type diffraction gratings.

The hologram-recorded medium of the present invention may have a reflecting layer on its back side.

Each of pixels in the hologram-recorded medium of the present invention may be of diffusibility.

The hologram-recorded medium of the present invention as mentioned above may be used as a reflection type hologram color filter.

Such a hologram-recorded medium of the present invention is fabricated as recited below.

(1) A method of fabricating a hologram-recorded medium characterized by stacking a volume hologram photosensitive material on a reflection type relief hologram, and striking reconstructing illumination light of given wavelength on said reflection type relief hologram through said volume hologram photosensitive material, so that interference fringes produced by interference of light diffracted from said reflection type relief hologram and the incident light are recorded in said volume hologram photosensitive material.

(2) A method of fabricating a hologram-recorded medium characterized by stacking a volume hologram photosensitive material on a transmission type hologram, and striking reconstructing illumination light of given wavelength on a side of said transmission type hologram that is not opposite to said volume hologram photosensitive material, so that interference fringes produced by interference of light diffracted from said transmission type hologram and reference light incident on said volume hologram photosensitive material are recorded in said volume hologram photosensitive material.

(3) A method of fabricating a hologram-recorded medium characterized by stacking a volume hologram photosensitive material on a transmission type hologram, and striking reconstructing illumination light of given wavelength on a side of said transmission type hologram that is not opposite to said volume hologram photosensitive material, so that interference fringes produced by interference of light diffracted from said transmission type hologram and zero-order transmitted light are recorded in said volume hologram photosensitive material, followed by provision of a reflecting layer on a back side of said volume hologram photosensitive material.

(4) A method of fabricating a hologram-recorded medium characterized by locating a mask plate having an opening pattern on one side of a volume hologram photosensitive material and a reflecting mirror on another side of said volume hologram photosensitive material, said reflecting mirror having a specific angle of inclination with respect to said volume hologram photosensitive material, and striking a light beam on said volume hologram photosensitive material through said opening pattern in said mask plate, so that interference fringes produced by interference of the incident light and light reflected from said reflecting mirror are recorded in said volume hologram photosensitive material.

(5) A method of fabricating a hologram-recorded medium characterized by locating a mask plate having an opening pattern on one side of a volume hologram photosensitive material and an off-axis reflection type hologram on another side of said volume hologram photosensitive material, said off-axis reflection type hologram diffracting a light beam incident at a given angle of incidence in an opposite direction at a specific angle with respect thereto, and striking a light beam on said volume hologram photosensitive material through said opening pattern in said mask plate, so that interference fringes produced by interference of the incident light and light diffracted from said off-axis reflection type hologram are recorded in said volume hologram photosensitive material.

(6) A method of fabricating a hologram-recorded medium characterized by locating a composite reflector comprising a collection of micro-mirror surfaces varying in reflection direction per position on a back side of a volume hologram photosensitive material, and striking a light beam on a surface side of said volume hologram photosensitive material, so that interference fringes produced by interference of the incident light and light reflected from said composite reflector are recorded in said volume hologram photosensitive material.

(7) A method of fabricating a hologram-recorded medium characterized by striking two coherent thin light beams at a position of each of pixels in a volume hologram photosensitive material while said beams intersect at a relative angle corresponding to said position, thereby recording in said volume hologram photosensitive material interference fringes having an inclination and a pitch depending on said pixel position.

The hologram color display medium of the present invention—which is provided to achieve the aforesaid objection—is a hologram color display medium having interference fringes of light recorded in a thickness direction of a film, characterized by using two swelling films each containing a penetrating monomer or oligomer that is diffusible externally from a surface of said film, said penetrating monomer or oligomer being deactivated according to a given deactivation pattern, so that said hologram is swollen by said penetrating monomer or oligomer diffused from both surfaces of said hologram at different degrees of swelling depending on position.

In this case, it is preferable that the aforesaid two swelling films are brought into close contact with both surfaces of the aforesaid hologram, so that a two-dimensional diffraction pattern of two or more colors is obtained by the combination of a deactivation pattern of one swelling film with that of another swelling film.

A color image may be expressed by means of a collection of color display micro-units, each comprising a combination of two or more micro-pixels displaying two or more different colors, and the dot percent of dots in each color display micro-unit may be varied to express each color display micro-unit in any desired color by additive color mixing. If, in this case, the interference fringes recorded in the hologram is designed such that diffraction efficiency changes depending on the positions of the color display micro-units, or the hologram itself or its diffraction-side surface is designed such that absorptance changes depending on the positions of the color display micro-units, it is then possible to control the brightness or luminance of each color display micro-unit.

It is preferable that the hologram is a volume phase type hologram, and it is then preferable that the hologram is a hologram recorded in a photopolymer.

Also, the hologram color display medium of the present invention may be of diffusibility.

Such a hologram color display medium of the present invention as mentioned above may be used in the form of a reflection type hologram color filter.

Further, the present invention provides a first method of fabricating a hologram color display medium including a hologram having interference fringes of light recorded in a thickness direction of a film, wherein two swelling films each containing a penetrating monomer or oligomer that is diffusible externally from a surface of said film, said penetrating monomer or oligomer being deactivated according to a given deactivation pattern, are used so that said hologram is swollen by said penetrating monomer or oligomer diffused from both surfaces of said hologram at different degrees of swelling depending on position, characterized in that before or after the close contact of the two swelling films, in which the penetrating monomer or oligomer contained in that position is deactivated by irradiation of a given or more quantity of light, with both surfaces of said hologram, said two swelling films are irradiated according to said given deactivation pattern with a given or more quantity of light, and said hologram with the thus deactivated swelling films brought into close contact with both surfaces thereof is heated, thereby diffusing said penetrating monomer or oligomer from active areas of said swelling films into said hologram.

Furthermore, the present invention provides a second method of fabricating a hologram color display medium including hologram having interference fringes of light recorded in a thickness direction of a film, wherein two swelling films each containing a penetrating monomer or oligomer that is diffusible externally from a surface of said film, said penetrating monomer or oligomer being deactivated according to a given deactivation pattern, are used so that said hologram is swollen by said penetrating monomer or oligomer diffused from both surfaces of said hologram at different degrees of swelling depending on position, characterized in that before or after the close contact of one swelling film, in which the penetrating monomer or oligomer contained in that position is deactivated by irradiation of a given or more quantity of light, with one surface of said hologram, said one swelling film is irradiated according to said given deactivation pattern with a given or more quantity of light; said hologram with the thus deactivated swelling film brought into close contact with said one surface is heated, thereby diffusing said penetrating monomer or oligomer from an active area of said one swelling film into said hologram; before or after the close contact of another swelling film, in which the penetrating monomer or oligomer contained in that position is deactivated by irradiation of a given or more quantity of light, with another surface of said hologram, said another swelling film is irradiated according to said given deactivation pattern with a given or more quantity of light; said hologram with the thus deactivated swelling film brought into close contact with said another surface is again heated, thereby diffusing said penetrating monomer or oligomer from an active area of said another swelling film into said hologram.

In these methods, it is preferable that the hologram is a volume phase type hologram, and it is then preferable that the hologram is a hologram recorded in a photopolymer.

Furthermore, the present invention provides another multicolor hologram display unit comprising volume holograms multi-recorded therein, said volume holograms diffracting light of at least two different wavelengths, characterized by further comprising a color tuning film containing a penetrating monomer or oligomer that is diffusible from a surface thereof to an outside thereof, said penetrating monomer or oligomer being deactivated according to a given deactivation pattern, so that said monomer or oligomer is diffused from said color tuning film, whereby a portion of said volume holograms in no alignment with said deactivated pattern is swollen to diffract light of a wavelength that is different from a wavelength that is diffracted by a portion of said volume holograms in alignment with said deactivated pattern.

Preferably, the multi-recorded volume holograms are recorded all over a surface thereof, while the deactivation pattern comprising dots. This multicolor volume hologram display unit may be used as a hologram reflecting and scattering plate for liquid crystal display apparatus. The multicolor volume hologram display unit may also include an area having a different dot percent.

Preferably, the multi-recorded volume holograms are each recorded in a separate pattern area. In this case, an area swollen by the color tuning film and an unswollen area provide dots wherein red, green, and blue colors are reconstructible. The multicolor volume hologram display unit may also include an area having a different dot area.

The color tuning film may be integrally provided on the multicolor hologram display unit.

It is to be noted that the foregoing multicolor hologram display unit of the invention may be used as a reflection type hologram color filter.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 13 provides illustrations of how hologram elements of a reflection type hologram color filter are two-dimensionally arranged.

FIG. 14 provides illustrations of an exemplary construction of a hologram-recording medium according to the invention.

FIG. 34 is illustrates of the state of each area in the multicolor hologram display unit of FIG. 28.

FIG. 43 is a sectional schematic of a liquid crystal display device using a conventional hologram color filter.

FIG. 44 illustrates one method of fabricating a conventional hologram color display medium.

FIG. 45 illustrates another method of fabricating a conventional hologram color display medium.

DESCRIPTION OF THE PREFERRED EMBODIMENTS

Reference will now be made to the fundamental principles of the reflection type diffuse hologram of the present invention as well as some embodiments thereof.

Figure 1:
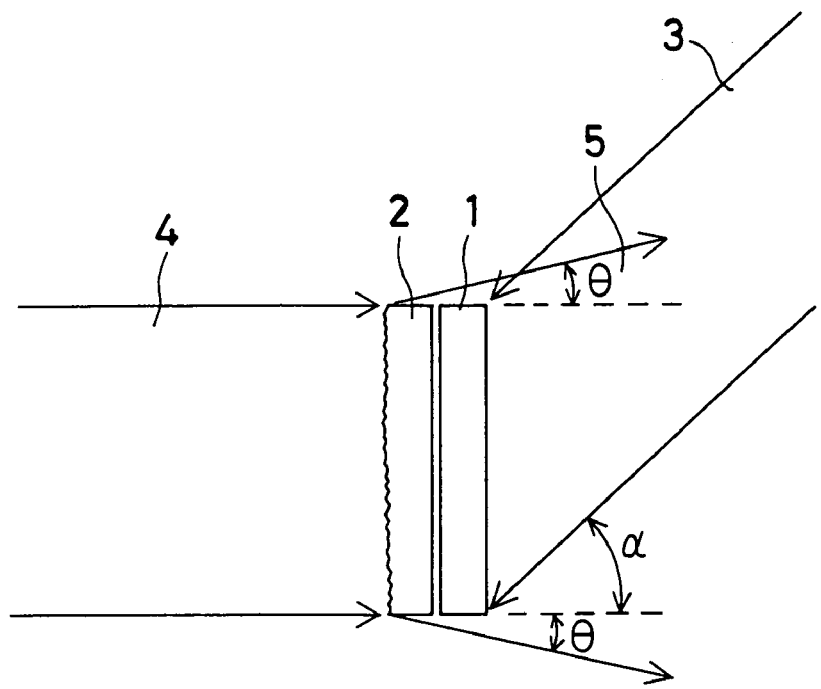
FIG. 1 illustrates a typical arrangement of how to record a reflection type diffuse hologram according to the invention.

FIG. 1 illustrates a typical arrangement of how to record a reflection type diffuse hologram according to the present invention. As shown, a diffusing plate 2 having a diffusion angle θ (a maximum diffusion angle) is located into close contact with a hologram photosensitive material 1 such as a photopolymer which can record a volume hologram therein. Parallel light 3 is obliquely incident on the photosensitive material 1 at an angle of incidence α, while parallel light 4 is perpendicularly incident on the diffusing plate 2. Thereupon, the parallel light 4 passes through the diffusing plate 2 to become diffused light 5 having a diffusion angle θ, which, in the photosensitive material 1, in turn interferes with the oblique parallel light 3 incident thereon from the opposite direction to produce interference fringes. In this way, a reflection (or Lippmann) type hologram is formed.

Figure 2:
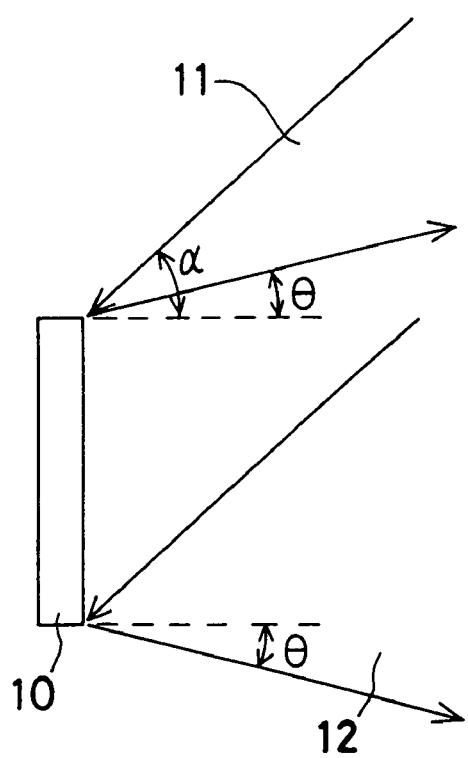
FIG. 2 is a schematic which shows that the reflection type diffuse hologram depicted in FIG. 1 has the ability to diffuse.

As depicted in FIG. 2, parallel illumination light 11 is incident on a reflection type hologram 10 formed as depicted in FIG. 1 at the same angle of incidence α at which the parallel light 3 has been incident obliquely on the material 1 to record the hologram 10, whereupon diffused light 12 whose diffusion angle θ is the same as that of the diffused light 5 used to record the hologram 10 is reflected, and diffracted from the reflection type hologram 10.

Figure 3:
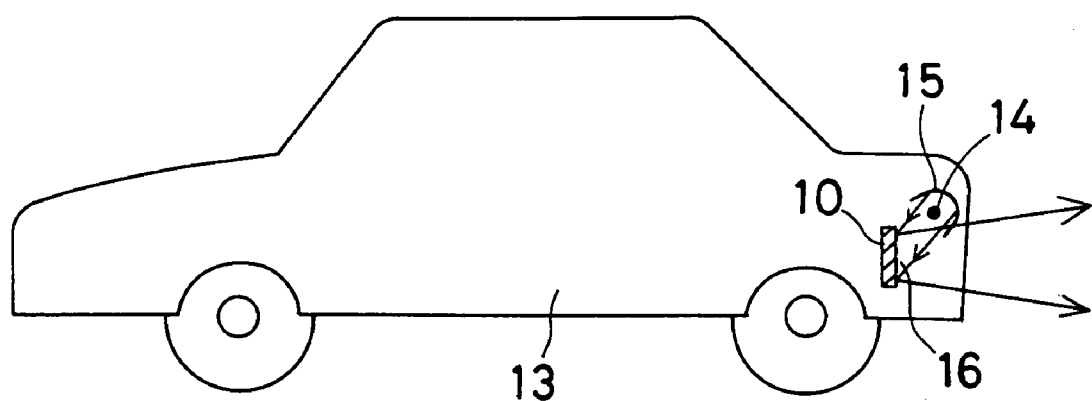
FIG. 3 provides an illustration of how the reflection type diffuse hologram of the invention is located for a brake lamp or direction indicator lamp, and what effect is obtained in this case.

Consider now the case where such a reflection type hologram 10 is mounted on a rear portion of a car 13 as sketched in FIG. 3 as an example. Light from a light source 14 is converted through an optical system 15 (e.g., a paraboloidal mirror) into parallel light 16 to illuminate the reflection type hologram 10 obliquely from above. Then, the light 16 is reflected, and diffracted in the rearward direction of car 13 while the diffusion angle is limited to a desired angle of ±θ, thereby showing that the preceding car is about to apply a brake or change direction. In addition, the use of such a reflection type diffuse hologram makes it possible to limit the diffusion angle within the preselected range, as mentioned above, so that the diffusion of light at an angle larger than required can be avoided to prevent wasteful consumption of light from the lamp. Thus, distinct, and bright indication is available.

Figure 4:
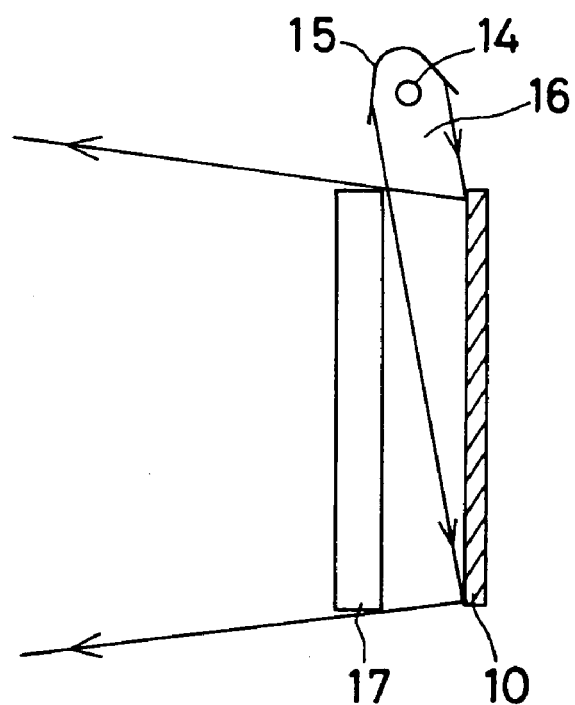
FIG. 4 provides an illustration of how the reflection type diffuse hologram of the invention is located for backlighting a liquid crystal display device, and what effect is obtained in this case.

Alternatively, such a reflection type hologram 10 as mentioned above may be located on a backlight side of a liquid crystal display device 17 as depicted in FIG. 4, for instance. Light from a light source 14 is converted through an optical system 15 (e.g., a paraboloidal mirror) into parallel light 16 to illuminate the reflection type hologram 10 obliquely from above. Thereupon, the light 16 is diffracted, and reflected onto the liquid crystal display device 17 while the diffusion angle is limited to the desired angle of ±θ, so that the light 16 can arrive at the viewer through a transparent portion of the liquid crystal display device 17. In this case, too, the viewing angle of the liquid crystal display device spreads out to the angle ±q, but the backlight is confined within the desired angle range, so that wasteful consumption of illumination light can be avoided.

Figure 5:
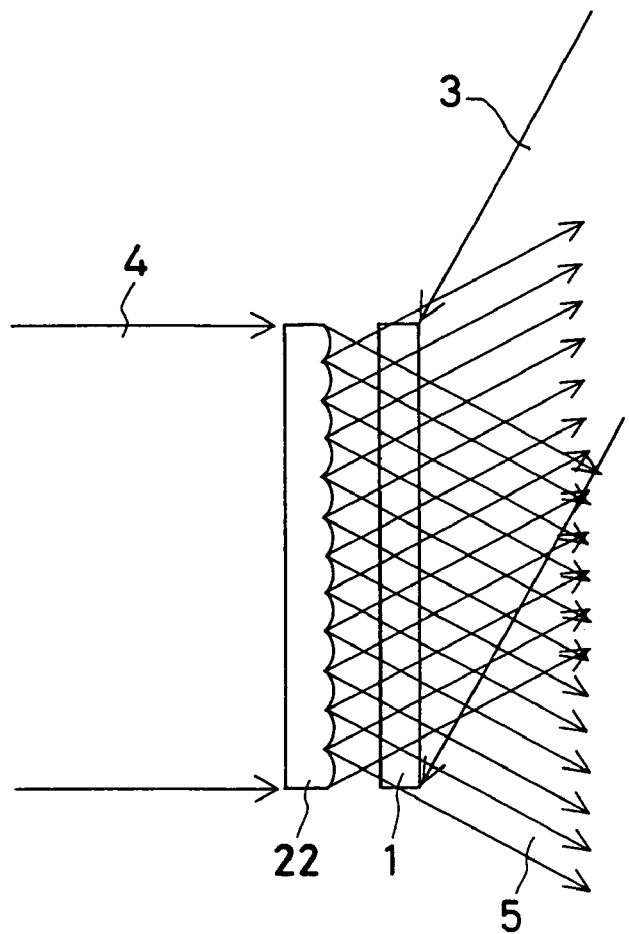
FIG. 5 illustrates a typical arrangement of how to record a reflection type diffuse hologram using an array of microlenses or a lenticular screen in place of a diffusing plate.

In the case of FIG. 1, the reflection type diffuse hologram of the present invention is recorded using the diffusing plate 2 having a limited diffusion angle. Instead, an array of microlenses or a lenticular screen 22, as depicted in FIG. 5, may be used as a diffuse optical element. It is noted that the array of microlenses is an arrangement wherein axially symmetric microlenses are two-dimensionally located, and the lenticular screen is an arrangement wherein cylindrical microlenses are one-dimensionally located, each as shown in section in FIG. 5. In this case, there is obtained a reflection type diffuse hologram with a diffusion angle θ corresponding to the collection or divergence angle of the microlenses or cylindrical microlenses forming the array or lenticular screen 22.

Figure 6:
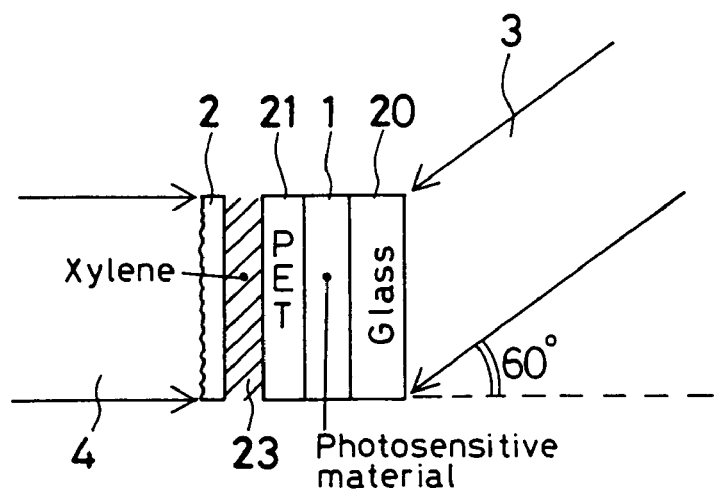
FIG. 6 provides an illustration of how to make an exemplary reflection type diffuse hologram of the invention.

An account will then be given of specific embodiments of fabricating such reflection type diffuse holograms as mentioned above. As sketched in FIG. 6, a glass substrate 20 was coated thereon with a photosensitive material 1, for instance, Omnidex 706 (a photosensitive film made by Du Pont, U.S.A.), and a PET film 21 in the form of a cover film was applied on the material 1. Then, a diffusing plate 2 formed of a non-glare film having a haze of 25.7% was brought into close contact with the PET film 21 with an index-matching liquid 23 composed of xylene located between them. After this, the diffusing plate 2 was irradiated in the normal direction with object light 4 defined by a parallel beam of Kr laser light (of 647 nm wavelength) and, at the same time, the glass substrate 20 was irradiated at an angle of incidence of 60° with respect to the normal direction with reference light 3 defined by a parallel beam of the same Kr laser light. The ratio between the reference light and the object light was 1:1, and the combined exposure of the two light beams 3 and 4 was 200 mJ/cm². Upon removed from the diffusing plate 2, the photosensitive material 1 was irradiated with 100 mJ/cm² of ultraviolet rays, and then heated at 120° C. for 2 hours to obtain a reflection type diffuse hologram having a diffraction efficiency of 65% and a diffraction peak wavelength of 647 nm, and reflecting and diffracting parallel light at a diffusion angle of 12°, said parallel light incident at an angle of incidence of 60°. Notice that diffraction efficiency was determined by measuring transmittance with an automatic recording spectrophotometer (UV-3100PC made by Shimadzu Corporation), and subtracting that transmittance from 100%, and haze was expressed by a value found with NDH-1001DP made by Nippon Denshoku Co., Ltd.

Figure 7:
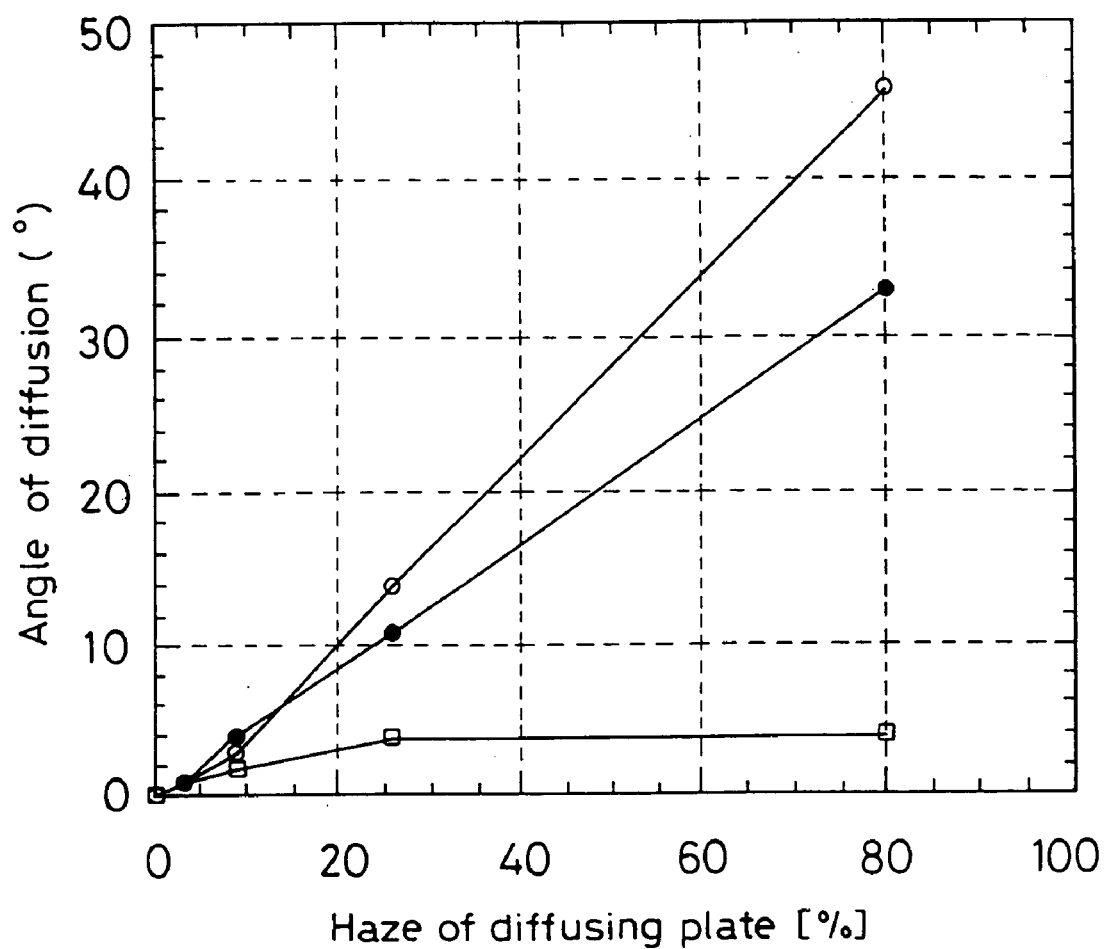
FIG. 7 is a graph of how the angle of diffusion of a reflection type diffuse hologram changes as the haze of a diffusing plate changes.

In the same manner as mentioned above, reflection type diffuse holograms were fabricated using diffusing plates 2 with varying hazes. As a result, such diffusion angle characteristics as plotted in FIG. 7 were obtained. In FIG. 7, black dots represent the diffusion angle characteristics of the diffuse plates 2 themselves, white dots the diffusion angle characteristics of the fabricated reflection type diffuse holograms as found in a direction perpendicular to the drawing sheet of FIG. 2, and white square dots the diffusion angle characteristics of them as found in a plane of the drawing sheet of FIG. 2. From this graph, it is understood that to obtain the diffusion angles of 10° to 35° needed for diffusing plates used for backlighting liquid crystal display devices, and used on automotive brake lamps or direction indicator lamps, it is desired that the haze of the diffusing plate 2 used be 20 to 60%.

It is here noted that the reflection type diffuse hologram according to the present invention is a Lippmann type hologram. Therefore, it is also possible to achieve a reflection type hologram 10 capable of reconstructing not only diffused light 12 but also an image such as a 3M image by using the same reference light 3 as used to record scattered light 5 from the diffusing plate 2 or the micro-lens array or lenticular screen 22 and, before or after recording it, allowing object light to strike from behind the photosensitive material 1, said object light forming an image such a character or picture image in front of the photosensitive material 1 (on the side on which the reference light 3 is incident), thereby multi-recording them in the photosensitive material 1.

While the reflection type diffuse hologram of the present invention, and its fabrication method have been described with reference to its principles and some specific embodiments, it is understood that the present invention is not limited thereto, and so various modifications may be possible.

As can be seen from the foregoing explanations, the aforesaid reflection type diffuse hologram of the present invention is fabricated by the incidence of diffuse light diffusing within the desired angle range and parallel light on both sides of a volume hologram-recording photosensitive material wherein they interfere. It is thus possible to prevent light from a light source from diffusing at an angle larger than required, avoiding wasteful consumption of the light from the light source, and making bright displays and indications possible. Since the diffusing plate is a volume hologram, it is further possible to achieve easy fabrication of diffusing plates having given characteristics by replication.

Reference will then be made to a specific example of a reflection type of direct-view color display device making use of the hologram color filter according to the present invention.

Figure 8:
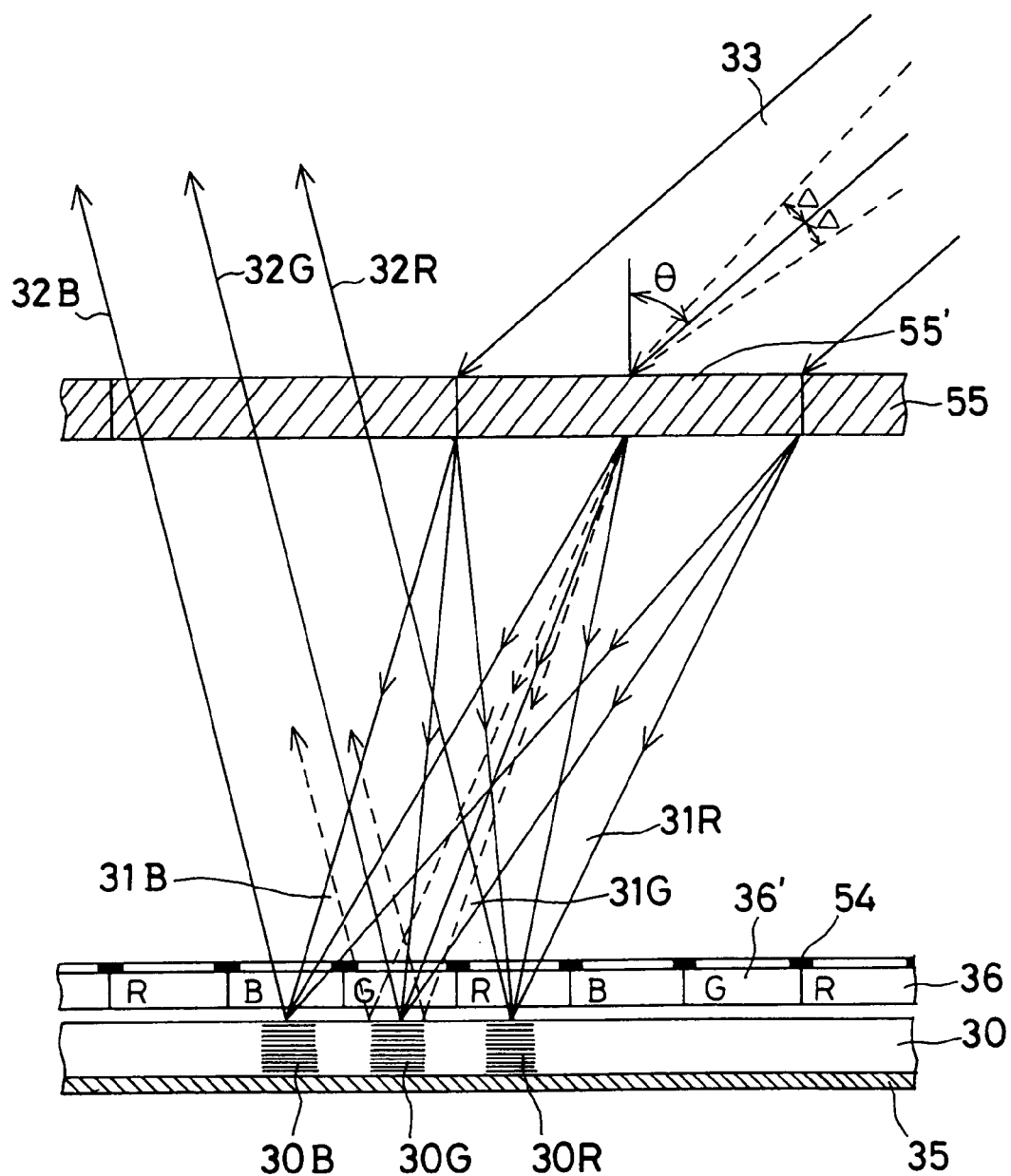
FIG. 8 is a sectional schematic showing one embodiment of a reflection type of direct-view color display device using a hologram color filter of the invention.

FIG. 8 is a sectional schematic of one embodiment of a reflection type of direct-view color display device constructed using a hologram color filter, for instance, one shown in FIG. 43. As illustrated, a hologram color filter 55 is spaced away from a side of a transmission type spatial light modulator 36 on which ambient illumination light 33 is to strike, said modulator comprising a liquid crystal display element, a polymer-dispersed type liquid crystal (PDLC) display element, etc., which is regularly divided into pixels 36'. On the back side of the transmission type spatial light modulator 36 there is located a reflection type hologram 30 which will be described at great length, with a light-absorbing layer 35 mounted on the back side of the hologram 30. A black matrix 54 is interposed between adjoining pixels 36' in the transmission type spatial light modulator 36. It is here noted that the distance between the hologram color filter 55 and the reflection type hologram 30 is selected such that it is substantially equal to the light-collecting (focal) distance of each micro-hologram 55'.

In this case, too, the hologram color filter 55 comprises micro-holograms 55' which are arranged in an array form at the same pitch as that of R, G, and B spectral pixels, corresponding to the period of repetition of R, G, and B spectral pixels in the transmission type spatial light modulator 36, i.e., sets of three adjoining pixels 36' in the transmission type spatial light modulator 36, as viewed in a plane of the drawing sheet. One micro-hologram 55' is located in line with each set of three adjoining pixels 36' in the transmission type spatial light modulator 36, as viewed in the plane of the drawing sheet. The micro-holograms 55' are then arranged in a Fresnel zone plate form such that a green component ray 31G of illumination light 33 incident on the hologram color filter 55 at an angle θ with respect to its normal line is collected in the vicinity of a middle G pixel of the three R, G, and B pixels corresponding to each micro-hologram 55'. Each or the micro-hologram 55' in this case is constructed from a relief, phase, amplitude or other transmission type of hologram which has little, if any, dependence of diffraction efficient on wavelength. The wording "little, if any, dependence of diffraction efficiency on wavelength" used herein is understood to refer specifically to a hologram of the type which diffracts all wavelengths by one diffraction grating, much unlike a Lippmann type hologram which diffracts a particular wavelength alone but does not substantially permit other wavelengths to be transmitted therethrough. The diffraction grating having little dependence of diffraction efficiency on wavelength diffracts different wavelengths at different angles of diffraction.

In such an arrangement, consider now the case where the ambient light 33 strikes at an angle of incidence θ on the surface side of the hologram color filter 55. The light 33 is subject to wavelength dispersion by the hologram color filter 55, so that the light collection positions for wavelengths are dispersed in a direction parallel with the plane of the hologram color filter 55. If, in this case, the hologram color filter 55 is constructed and arranged such that red, green, and blue wavelength components 31R, 31G, and 31B are diffractively collected in the vicinity of the surface of the reflection type hologram 30 at positions of the pixels R, G, and B displaying red, green, and blue, respectively, the color components pass through the associated pixels 36' without undergoing substantial attenuation by the black matrices 54, and then arrive at the reflection type hologram 30 at the associated positions.

Here, the reflection type hologram 30 is a volume phase (Lippmann) type hologram, and interference fringes 30R, 30G, and 30B in the reflection type hologram 30—which lie in the vicinity of positions where red, green, and blue diffracted components 31R, 31G, and 31B corresponding to the ambient light 33 having an angle of incidence θ are collected—are formed to separately reflect light of red wavelength, light of green wavelength, and light of blue wavelength, respectively. In addition, the interference fringes 30R, 30G, and 30B are inclined such that the aforesaid red, green and blue diffracted components 31R, 31G, and 31B are converted by diffraction and reflection into reflected light 32R, 32G, and 32B, respectively, which in turn propagate in a substantially identical direction.

Incidentally, some ambient light 33 incident on the hologram color filter 55 within an angle range of θ±Δ in the vicinity of the angle of incidence θ, too, is subject to wavelength dispersion by the hologram color filter 55, and hence to color separation as is the case with the color components 31R, 31G, and 31B. However, this light is diffracted at an angle different from that indicated by solid lines in FIG. 8. In FIG. 8 only principal rays of the green component are indicated by broken lines. For each color component, however, such principal rays are distributed in the vicinity of both sides of the direction of dispersion of diffracted component 31R, 31G or 31B, when the angle of incidence is θ. Accordingly, such diffracted components, too, should be reflected, and diffracted in the same direction as in the case of the reflected light 32R, 32G, and 32B. To achieve this, the interference fringes 30R, 30G, and 30B in the reflection type hologram, too, are continuously formed and distributed at positions corresponding to the pixels R, G, and B.

Thus, all the ambient light 33 striking on the hologram color filter 55 not only at the angle of incidence θ but also within the angle range of θ±Δ are subject to wavelength dispersion thereby. Of the ambient light 33, the red wavelength component 31R strikes on the red-displaying pixel R where it is subject to intensity modulation depending on the state of that pixel, and then passes therethrough. This transmitted component is reflected by the interference fringe 30R in the reflection type hologram 30 into reflected light 32R in a certain direction, which in turn passes back through the pixel R from its rear side, and then strikes on, and passes through, the hologram color filter 55 without being now hardly diffracted, finally striking on the eye of the viewer positioned in that direction. The same is also true of the green, and blue wavelength components 31G, and 31B subject to spectral diffraction by the hologram color filter 55. Specifically, they strike on the green, and blue-displaying pixels G, and B where they are subject to intensity modulation depending on the states of those pixels, and then pass therethrough. The transmitted components are reflected by the interference fringes 30G, and 30B into reflected light 32G, and 32B in a certain direction, which in turn pass back through the pixels G, and B from their rear sides, and then strike on, and pass, through the hologram color filter 55 without being now hardly diffracted, finally striking on the eye of viewer positioned in that direction. It is thus possible to display color images by the combination of modulated states of the pixels R, G, and B. It is here noted that one part of ambient light 33 departing from the angle range of θ±Δ, too, is diffracted by the hologram color filter 55, but another part passes therethrough, reaching the reflection type hologram 30. However, since the direction of incidence and wavelength of the latter part do not comply with the diffraction conditions for the interference fringes 30R, 30G, and 30G, it passes through the reflection type hologram 30 to the light-absorbing layer 35 where it is absorbed; that is, it cannot be reflected onto the viewer.

By using the hologram color filter 55 and reflection type hologram 30 in combination with the transmission type spatial light modulator 36 comprising a collection of pixels, for instance, a liquid crystal display device, it is thus possible to achieve a reflection type of direct-view color display device such as a color liquid crystal display device, which can use ambient light to present bright displays without using any backlight source.

While the reflection type of direct-view display device making use of the hologram color filter of the present invention has been described with reference to the specific embodiment, it is understood that the present invention is not limited thereto, and so various modifications may be possible.

As can be seen from the foregoing explanations, the hologram color filter of the present invention can be used with a reflection type hologram and in combination with a transmission type spatial light modulator comprising a collection of pixels such as a liquid crystal display device, thereby achieving a reflection type of direct-view color display device such as a color liquid crystal display device, which can use ambient light to present bright displays without using any backlight source.

Another embodiment of the reflection type color liquid crystal display device according to the present invention will now be explained.

Figure 10:
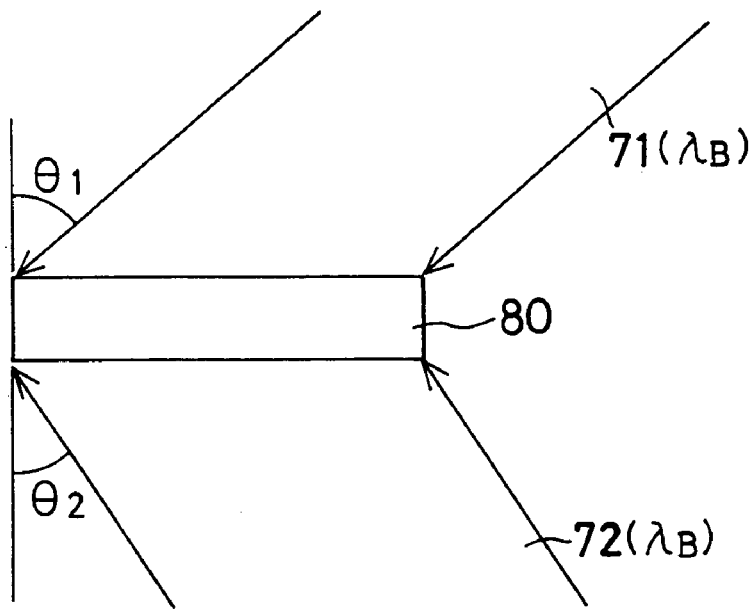
FIG. 10 provides an illustration of how to record a volume type reflection hologram, and the action of this volume reflection hologram.
Figure 10:
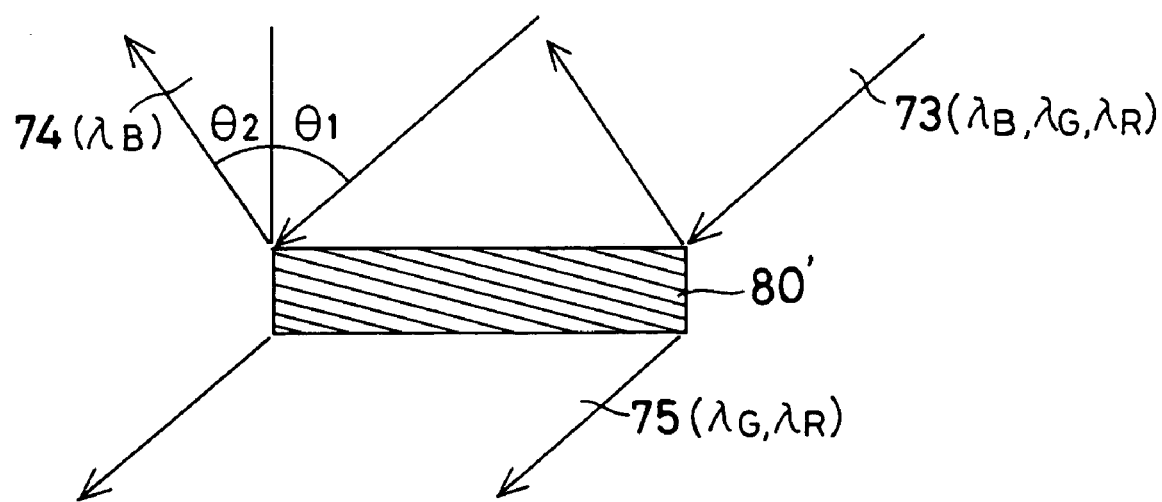

Prior to making an explanation of that embodiment, a brief account will be given of a volume type reflection hologram used on a hologram reflection layer. FIG. 10 is a perspective view for illustrating how to record a volume type reflection hologram, and the action thereof. In FIG. 10(*a*), consider now that coherent parallel object light 71, and reference light 72, each of wavelength $\lambda_B$, strike at angles of incidence of $\theta_1$, and $\theta_2$ on both sides of a photo-polymer or other hologram photosensitive material 80 that is thick with respect to the spatial frequency. (It is noted that the index B represents the wavelength of a blue zone, and that indices G, and R will hereinafter stand for the wavelengths of green, and red zones). They interfere to record parallel uniform interference fringes in the photosensitive material 80. As depicted in FIG. 10(*b*), only illumination light having the same angle of incidence $\theta_1$ as that of the object light 71 used for recording or only components of ambient light 73 with a wavelength lying at and in the vicinity of $\lambda_B$ are selectively reflected, and diffracted by the thus recorded hologram 80', and the thus reflected, and diffracted light 74 propagates at an exit angle $\theta_2$ and substantially in the same direction as the propagation direction of the reference light 72 used for recording. However, light components 75 having other wavelengths $\lambda_G$ and $\lambda_R$, and light components striking at angles of incidence other than $\theta_1$ are allowed to pass through the hologram 80'. The same is also true of holograms recorded using other wavelengths $\lambda_G$, and $\lambda_R$.

Thus, the volume type reflection hologram is excellent in the ability to select wavelength, and angle, and so can control the half bandwidth of a diffraction wavelength region, the range of diffraction direction, etc. to some extent by selection of photosensitive material thickness, recording conditions, post-treatment conditions, etc.

Figure 11:
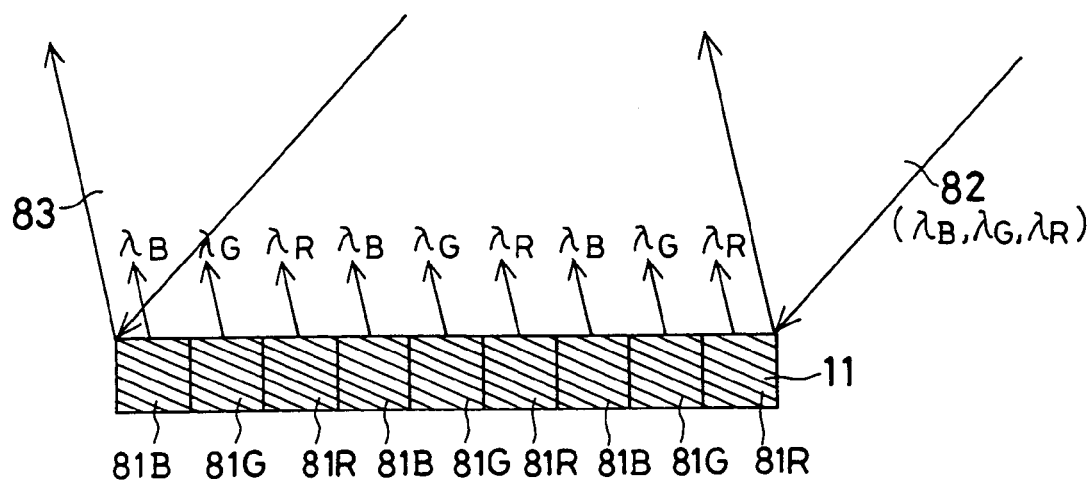
FIG. 11 is a schematic illustrating the construction, and action of a reflection type hologram color filter used in the invention.

Here consider now a composite reflection hologram 81 fabricated by periodically arranging sets of three microholograms with diffraction wavelengths lying in the blue, green, and red regions in an array form. As depicted in FIG. 11, illumination light or ambient light 82 is reflected, and diffracted by the composite reflection hologram 81 upon striking thereon from a given direction, and the thus reflected, and diffracted light 83 propagates in a given direction. However, a blue-reflecting and -diffracting hologram element 81B in the composite reflection hologram 81 diffracts only wavelength $\lambda_B$ lying in the blue region in a direction thereof. Likewise, a green-reflecting and -diffracting hologram element 81G in the composite reflection hologram 81 diffracts only wavelength $\lambda_G$ lying in the green region in a direction thereof, while a red-reflecting and -diffracting hologram element 81R diffracts only wavelength $\lambda_R$ lying in the red region in a direction thereof. It follows that the composite reflection hologram 81 can act as a reflection type hologram color filter comprising reflection filter elements 81R, 81G, and 81B of the three primary colors R, G, and B.

Figure 9:
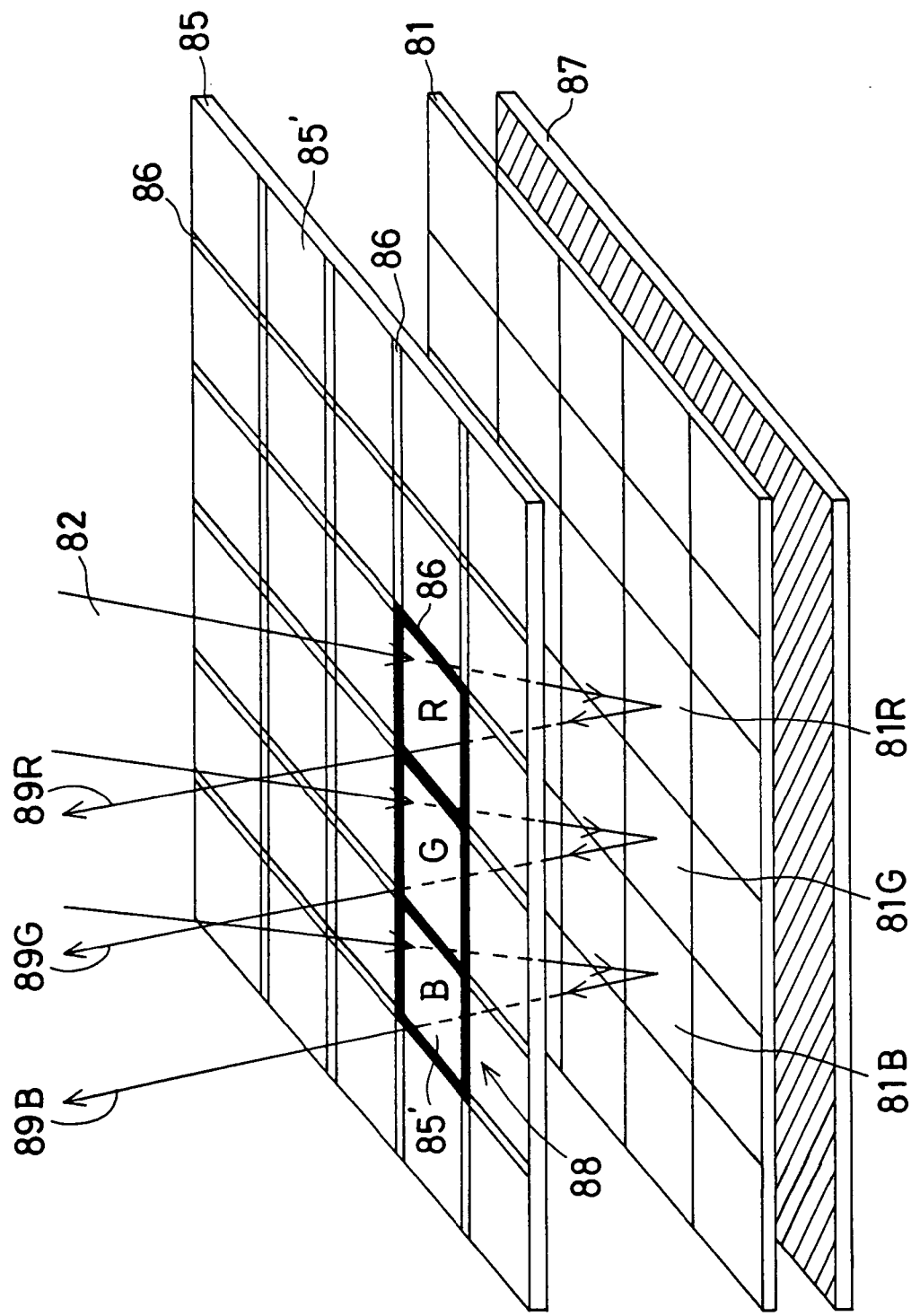
FIG. 9 is an exploded perspective schematic of one embodiment of a reflection type color display device of the invention.

FIG. 9 is an exploded, perspective schematic of one embodiment of the reflection type color display device fabricated using such a reflection type hologram color filter 81 according to the present invention. As illustrated, such a reflection type hologram color filter 81 as mentioned above is located on the back side of a transmission type spatial light modulator 85 built up of a liquid crystal display element, a polymer-dispersed type liquid crystal (PDLC) display element, etc., which is regularly divided into pixels 85', and an absorption layer 87 is positioned on the back side of the reflection type color filter 81. These transmission type spatial light modulator 85, reflection type hologram color filter 81, and absorption layer 87 may be assembled with or without some gaps between them. A black matrix 86 is interposed between adjoining pixels 85' in the transmission type spatial light modulator 85. Three adjoining pixels 85' in the transmission type spatial light modulator 85 constitute together one color display unit 88, in which pixels B, G, and R are blue, green, and red displaying pixels, respectively. Then, the elements forming the reflection type hologram color filter 81 are arranged such that these blue, green, and red displaying pixels B, G, and R in the transmission type spatial light modulator 85 correspond to the blue, green, and red reflecting filter elements 81B, 81G, and 81R in the reflection type hologram color filter 81.

Upon illumination light or ambient light striking on the surface side of the transmission type spatial light modulator 85 in the reflection type color display device assembled as mentioned above, a component 82 of the ambient light that strikes thereon at a given angle of incidence passes through the pixels B, G, and R in the transmission type spatial light modulation 85 while it is subject to intensity modulation depending on their states. At this time, wavelength components $\lambda_B$, $\lambda_G$, and $\lambda_R$ in the ambient light 82 are subject to intensity modulation at the same proportion for each pixel B, G, and R. Reference is here made to the light 82 that has passed through the pixels B, G, and R while it has been subject to intensity modulation. The light 82 which has passed through the blue-displaying pixel B strikes on the blue-reflecting filter element 81B where only a blue wavelength component $\lambda_B$ thereof is selectively reflected, and diffracted in a given direction. Then, the thus reflected, and diffracted light passes back through the blue-displaying pixel B while it is again subject to the same modulation, so that the pixel B emits blue light 89B. However, wavelength components that are not diffracted by the filter element 81B, i.e., $\lambda_G$, and $\lambda_R$ pass through the filter element 81B, and are absorbed by the absorption layer 87 mounted on the back side of the reflection type hologram color filter 81. Likewise, the light 82, which has passed through the green-displaying pixel G while it has been subject to intensity modulation thereby, strikes on the green-reflecting filter element 81G where only a green wavelength component $\lambda_G$ is selectively reflected, and diffracted in a given direction. Then, the thus reflected, and diffracted light passes back through the green-displaying pixel G while it is again subject to the same modulation, so that the pixel G emits green light 89G substantially in the same direction as that of the blue light 89B the pixel B emits. Again likewise, the light 82, which has passed through the red-displaying pixel R while it has been subject to intensity modulation thereby, strikes on the red-reflecting filter element 81R where only a red wavelength component $\lambda_R$ is selectively reflected, and diffracted in a given direction. Then, the thus reflected, and diffracted light passes back through the red-displaying pixel R while it is again subject to the same modulation, so that the pixel R emits red light 89R substantially in the same direction as those of the green, and blue light 89B, and 89G the pixels B, and G emit.

Depending on the combination of intensity modulation by the pixels R, G, and B in the color display unit 88, it is thus possible to display any desired color with any desired luminance by the additive color mixing of the three displayed light 89B, 89G, and 89R. It is therefore possible to display a color image observable from the direction of the displayed light 89B, 89G, and 89R depending on the combination of the two-dimensionally located color display units 88 upon displayed.

Figure 12:
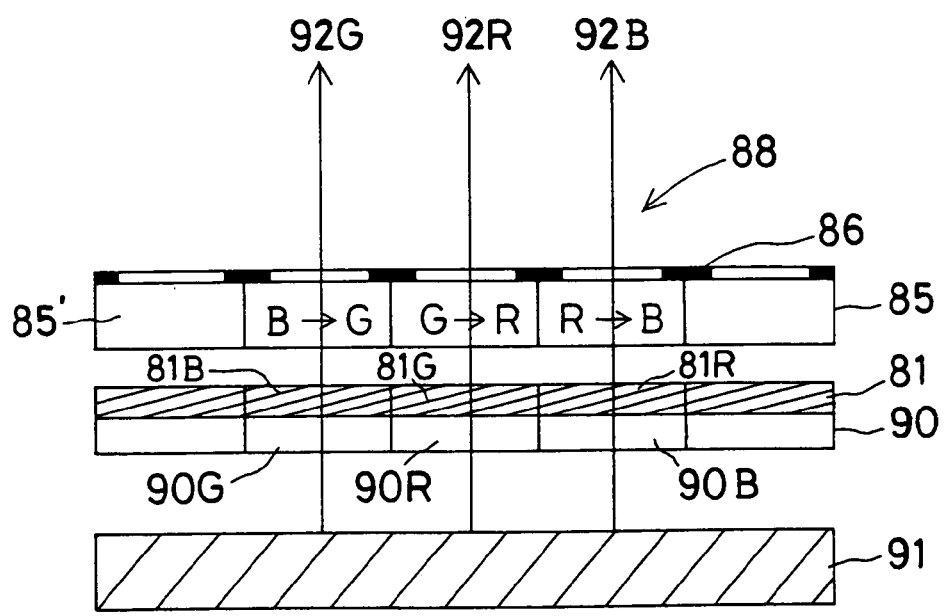
FIG. 12 is a sectional schematic of one modification of the display device depicted in FIG. 9, which is designed so that color information can be displayed even by backlight illumination.

FIG. 12 is a sectional schematic of one modified embodiment of the display device shown in FIG. 9, which enables images to be displayed even by use of illumination by backlight. The embodiment of FIG. 12 is similar to that of FIG. 9 with the exception that an absorption filter 90 instead of the absorption layer 87 is located on the back side of the reflection type hologram color filter 81, and a backlight source 91 is positioned on the back side of the filter 90. This absorption filter 90 is an array comprising an absorption filter element 90G capable of transmitting only light lying in the green region or only light lying in the green, and blue regions at a position of a blue-reflecting filter element 81B in the reflection type hologram color filter 81, an absorption filter element 90R capable of transmitting only light lying in the red region or only light in the red, and green regions at a position of a green-reflecting filter element 81G, and an absorption filter element 90B capable of transmitting only light lying in the blue region or only light lying in the blue, and red regions at a position of a red-reflecting filter element 81R. Correspondingly, a display device-driving circuit is provided such that color information displayed on pixels 85' in the transmission type spatial light modulator 85 changes automatically, for instance, such that information B seen as blue when illuminated by the ambient light 82 changes automatically over to green information G when the backlight source 91 is put on, information G seen as green when illuminated by the ambient light 82 changes automatically over to red information R when the backlight source 91 is put on, and information R seen as red when illuminated by the ambient light 82 changes automatically over to blue information B when the backlight source 91 is put on.

When the backlight source 91 is held off, therefore, it is possible to display a color image by use of illumination by the ambient light 82, as explained with reference to FIG. 9. Upon the backlight source 91 put on, the pixels B, G, and R change over to G, R, and B, so that color information displayed on each pixel changes. At a position where the pixel B is displayed in the case of the reflection type, white light from the backlight source 91 is reduced through the absorption filter element 90G to only light lying in the green region or only light lying in the green, and blue regions. Then, the light lying in the blue region is cut by the blue-reflecting filter element 81B, so that only the light lying in the green region passes through the absorption filter 90, and the reflection type hologram color filter 81. At this time, the green pixel emits green light 92G because the pixel B has changed over to the pixel G. Likewise, at a position where the pixel G is displayed in the case of the reflection type, white light from the backlight source 91 is reduced through the absorption filter element 90R to only light lying in the red region or only light lying in the red, and green regions. Then, the light lying in the green region is cut by the green-reflecting filter element 81G, so that only the light lying in the red region passes through the absorption filter 90, and the reflection type hologram color filter 81. At this time, the red pixel emits red light 92R because the pixel G has changed over to the pixel R. Moreover, at a position where the pixel R is displayed in the case of the reflection type, the blue pixel emits blue light 92B. Depending on the combination of intensity modulation by the pixels R, G, and B in the color display unit 88 after the backlight source 91 is put on, it is thus possible to display any desired color with any desired luminance by the additive color mixing of the three displayed light 92B, 92G, and 92R. It is therefore possible to display a color image depending on the combination of the two-dimensionally located color display units 88 upon displayed.

According to this embodiment, it is thus possible, and hence favorable, to display color images by use of illumination by ambient light in a bright environment, and by use of illumination by backlight in a dark environment. It is noted that the present invention is not limited to the combination, as shown in FIG. 12, of the color elements of the reflection type hologram color filter 81 with the color elements of the absorption filter 90, and so other combinations may be possible.

In this connection, it is noted that the reflection type diffraction hologram elements 81B, 81G, and 81R in the reflection type hologram color filter 81 are two-dimensionally arranged in alignment with the pixels B, G, and R in the transmission type spatial light modulator 85 used with reflected illumination light in three basic matrix patterns as shown in FIG. 13. The first is a matrix pattern called a striped type, as shown in FIG. 13(a), wherein hologram elements B, G, and R (indicated by 81B, 81G, and 81R, respectively) appear repeatedly in each row. Notice that dotted lines given in FIG. 13(a) are not needed in actual applications. The second is a matrix pattern called a mosaic type, as shown in FIG. 13(b), wherein the period of repetition of a set of hologram elements B, G, and R in one row is shifted by a lead or lag of ⅓ from that of a set of hologram elements B, G, and R in a row located just above. The third is a matrix pattern called a triangle or delta type, as shown in FIG. 13(c), wherein the period of repetition of a set of hologram elements B, G, and R in one row is delayed by ½ from that of a set of hologram elements B, G, and R in a row located just above it. For color filter fabrication, the striped type matrix pattern is preferred because only the one-dimensionally arranged three types of striped_holograms need be provided.

A reflection type hologram color filter 81 comprising a two-dimensional arrangement of such reflection type hologram elements 81B, 81G, and 81R as mentioned above may be obtained by dividing one hologram photosensitive material to zones, and recording interference fringes at recording wavelengths $\lambda_B$, $\lambda_G$, and $\lambda_R$ that vary for each zone by such a method as depicted in FIG. 10(a). However, it is preferable to use the method already proposed by the present applicant in Japanese Patent Application No. 120016/1993, wherein uniform interference fringes are recorded all over the surface of a hologram photosensitive material such as a photopolymer, as shown in FIG. 10(a) for instance, and a swelling film obtained by mixing a monomer or oligomer, a photopolymerization initiator, etc. with a binder polymer is then brought into close contact with the hologram photosensitive material with the uniform interference fringes recorded therein, so that the amount of the monomer or oligomer diffusing from the swelling film into the photosensitive material with the interference fringes recorded therein is controlled to regulate fringe spacings to a given amount. It is also preferable to use the method proposed by the present applicant in Japanese Patent Application No. 192020/1996.

As explained above, it is possible to obtain a reflection type color display device such as a color liquid crystal display device which can use ambient light to present bright displays without recourse to any backlight source by using the reflection type hologram color filter 81 in combination with the transmission type spatial light modulator 85 comprising a collection of pixels, such as a liquid crystal display device or polymer-dispersed type liquid crystal display device.

While the reflection type color display device of the present invention has been described specifically with reference to some embodiments, it is understood that the present invention is not limited to these embodiments, and so various modifications may be feasible. For instance, a conventional absorption type of RGB color filter may be additionally used on either side of the transmission type spatial light modulator 85.

According to the present invention as can be seen from the foregoing explanations, it is possible to obtain a reflection type color display device such as a color liquid crystal display device which can use ambient light to present bright displays without recourse to any backlight source by using the reflection type hologram color filter of the present invention in combination with a transmission type spatial light modulator built up of a collection of pixels and having controllable transmittance for each pixel, the former being located on the back side of the latter.

The hologram-recorded medium of the present invention which is applicable to the reflection type hologram 30 depicted in FIG. 8, and the reflection type hologram color filter 81 depicted in FIG. 9, and the principles and embodiments of fabricating the same will then be explained with reference to the drawings.

FIG. 14 illustrates an exemplified structure of the hologram-recorded medium of the present invention. Specifically, FIG. 14(a) is a general plan view of the hologram-recorded medium shown at 101, FIG. 14(b) is an enlarged view of an encircled small area in the hologram-recorded medium 101 shown in FIG. 14(a), and FIG. 14(c) is a sectional view taken along the line C–C' in FIG. 14(b).

The hologram-recorded medium 101 comprises a volume (Lippmann) type hologram photosensitive material such as a photopolymer, and has a desired color pattern formed thereon, as shown in FIG. 14(a). This color pattern is a full-color pattern, and develops colors for the reasons mentioned later. Alternatively, a plurality of color patterns may have been formed on the photosensitive material so that they can be seen in varying patterns depending on a viewing direction. As shown in FIG. 14(b), the hologram-recorded medium 101 has its recorded area divided regularly into a micro-dot form of pixels 102. In the embodiment illustrated, the pixels are arranged in a gridiron pattern, but may not necessarily be limited to this pattern. For instance, the pixels may be in a piled pattern. One pixel 102 may be not only quadrangular but also circular, triangular or hexagonal in shape.

In each pixel 102 there is recorded a volume type of interference fringe 103, as shown sectionally in FIG. 14(c). The interference fringes 103 usually comprise a spatial alternation of plane high, and low refractive index zones, which are arranged parallel at a constant pitch. Such interference fringes will hereinafter be called a Bragg grating 103. In FIG. 14(c), four adjoining pixels $102_1$, to $102_4$ are depicted for the purpose of illustrating schematically some possible configurations that the pixels 102 can have as the Bragg grating 103.

The pixels $102_1$, and $102_2$ have each the Bragg grating 103 formed parallel with the recording surface, but they are different from each other in terms of pitch (grating spacing). Consider now that light strikes on the pixels $102_1$, and $102_2$. The incident light is diffracted in a direction in which the angles of incidence, and diffraction are equal to each other with respect to the surface of the Bragg grating 103. Since only a light component of wavelength satisfying the Bragg condition is diffracted, however, the wavelength reflected, and diffracted by the pixel $102_1$, is different from that reflected, and diffracted by the pixel $102_2$ if the angle of incidence is identical. Therefore, if, with respect to a given angle of incidence, the wavelengths diffracted by the pixel $102_1$, the pixel $102_2$, and a pixel (not shown) in which the Bragg grating 103 differing in pitch from those of the pixels $102_1$, and $102_2$ is likewise formed parallel on the recording surfaced are assigned to blue, green, and red regions, respectively, it is then possible to record a color pattern of the three primary colors R, G, and B depending on how the pixels 102 are combined. Notice that how to select color tone, and gradation will be described later.

On the other hand, the pixels $102_3$ and $102_4$ are identical in terms of grating spacing, but differ in terms of the inclination of grating surface (fringe surface). The angle of inclination, and the direction of grating surface can be freely selected. Incident light is diffracted by the Bragg grating 103 in a direction in which the angle of incidence, and the angle of diffraction are equal to each other with respect to the grating surface. Accordingly, since it is only when the Bragg grating 103 is at an angle satisfying the Bragg condition that only light of wavelength satisfying the Bragg condition can be seen in a constant viewing direction different from the direction of incidence of light, the pixels $102_3$, and $102_4$ cannot simultaneously be observed in the same color when the direction of illumination is specified. In the case of monochromatic illumination, the pixels $102_3$, and $102_4$ can selectively be observed depending on a viewing direction. By the combination of such pixels 102, it is thus possible to record a plurality of patterns which change depending on a viewing direction. It is here noted that since one Bragg grating 103 satisfies the Bragg condition at a different wavelength when the angle of incidence varies, one pixel $102_3$ or $102_4$ changes color depending on a viewing direction if white light for illumination diffuses in the illumination direction.

By variously selecting the pitch, and inclination of the interference fringes 103 to be recorded in the pixels 102, it is thus possible to freely select diffraction angle, and diffraction wavelength. By selecting the pitch, and inclination of the interference fringes 103 from predetermined combinations depending on the positions of the pixels 102, therefore, it is possible to record color patterns which change depending on a viewing direction. It is here noted that since a plurality of different interference fringes 103 recorded in a single pixel 102 in a superposed manner can be diffracted for reconstruction, a plurality of color patterns can freely be recorded in a superposed manner without any limitation on recording areas.

In order to allow the hologram-recorded medium 101 comprising a group of such pixels 102 to express halftone colors other than R (red), G (green), and B (blue) with any desired gradation, R, G, and B dot areas, and their dot percent may be varied to vary gradation, and color tone, as in the case of printing. It is here noted that the R, G, and B dots may be obtained by two methods, i.e., by dividing a single pixel into three parts, and by associating a set of adjoining three pixels with dots R, G, and B. Both methods are essentially identical with each other.

Figure 15A:
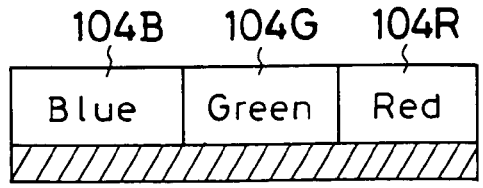
FIG. 15 is schematics for illustrating one area gradation method for changing color tone by dot percent changes.
Figure 15B:
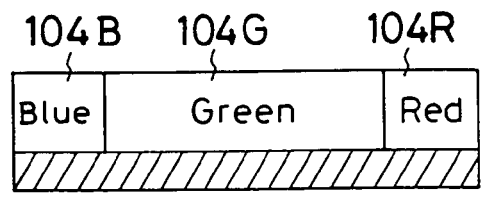

FIG. 15 illustrates a typical area gradation method wherein color tone is varied by varying dot percent. FIG. 15(a) illustrates the case where the dot percent between a red dot 104R having interference fringes 103 recorded therein to express R, a green dot 104G having interference fringes 103 recorded therein to express G, and a blue dot 104B having interference fringes 103 recorded therein to express B is 1:1:1 so that they are seen as white by additive color mixing. If, as depicted in FIG. 15(b), the areas of the red, and blue dots 104R, and 104B are reduced with a corresponding increase in the area of the green dot 104G, these dots are then seen as green. As the area of the green dot 104G increases relatively, the green color is more enhanced in gradation. It is thus possible to express any desired color tone with any desired gradation by controlling the dot percent between the red, green, and blue dots 104R, 104G, and 104B.

Figure 16A:
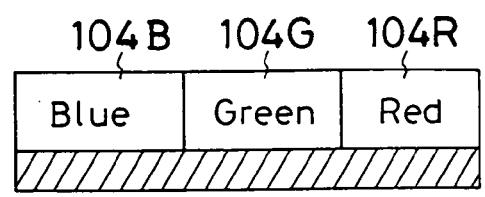
FIG. 16 is schematics for illustrating another area gradation method for changing color tone by dot percent changes.
Figure 16B:
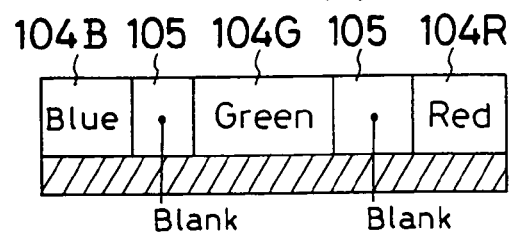

FIG. 16 illustrates another dot area gradation method wherein dot percent is again varied to vary color tone. Of red, green, and blue dots 104R, 104G, and 104B with their dot percent being 1:1:1 as depicted in FIG. 16(a), the areas of the red, and blue dots 104R, and 104B are reduced by the interposition of blanks 105, so that the area of the green dot 104G increases relatively. The larger the area of the green dot 10G, the more enhanced the green color is in gradation. This method is similar to an ordinary color printing method, and makes it possible to express any desired color tone with any desired gradation by controlling the dot percent between the red, green, and blue dots 104R, 104G, and 104B.

Figure 17A:
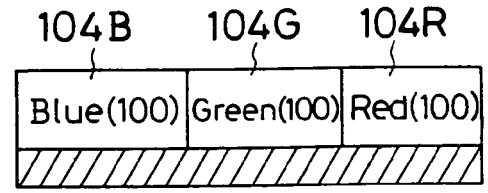
FIG. 17 is schematics for illustrating a density gradation method for controlling color tone, and gradation by placing the efficiency of diffraction of interference fringes under control.
Figure 17B:
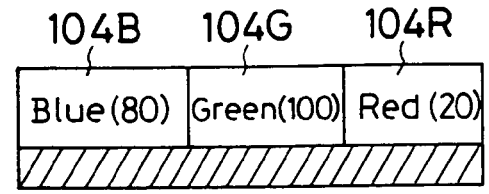

FIG. 17 illustrates a density, not area, gradation method wherein the diffraction efficiency of interference fringes 103 is regulated to any desired value when recording the interference fringes 103, thereby controlling color tone, and gradation. The dot percent between a red dot 104R having interference fringes 103 recorded therein to express R, a green dot 104G having interference fringes 103 recorded therein to express G, and a blue dot 104B having interference fringes 103 recorded therein to express B remains fixed at 1:1:1, and in the case of FIG. 17(a), the diffraction efficiencies of the dots 104R, 104G, and 104B are all set at 100%, so that they are seen as white by additive color mixing. When, as shown in FIG. 17(b), the diffraction efficiencies of the red, and blue dots 104R, and 104B are reduced to 20%, and 80%, respectively, a halftone color between green and blue is obtained. It is thus possible to express any desired color tone with any desired gradation by controlling the diffraction efficiencies of the red, green, and blue dots 104R, 104G, and 104B.

The aforesaid area, and density gradation methods may be used in combination. It is here noted that the embodiment depicted in FIG. 17 may be modified such that interference fringes 103 for expressing red, green, and blue are recorded in one pixel in a superposed manner with controlled diffraction efficiencies of the interference fringes 103, so that any desired color tone can be expressed with any desired gradation.

Now reference will be made to how to record the Bragg grating 103 having varying grating surface spacing, and inclination for each pixel 102, i.e., how to fabricate the hologram-recorded medium of the present invention. Broadly speaking, this is achieved by four methods, the first one wherein the medium is fabricated from a computer-generated hologram (CGH) by replication, the second wherein the medium is fabricated by use of a mask pattern, and an inclined plane mirror, the third wherein the medium is fabricated by use of a group of micro-mirrors that vary in reflection direction per position, and the fourth wherein the medium is fabricated by recording the Bragg grating while two coherent light beams are moved relatively with respect to a hologram-recording medium.

Several approaches may be envisaged to the CGH replication method. A CGH of the relief type is in itself fabricated by using a computer to calculate interference fringes (a diffraction grating) which diffract light of given wavelength with respect to a given zone alone in a given direction, and drawing the interference fringes on a glass or other substrate with an electron beam resist coated thereon by use of an electron beam, for instance, followed by development. Likewise, a plurality of CGHs are fabricated, which have different interference fringes in different patterns. CGHs of the reflection or transmission type, too, may be fabricated.

Figure 18A:
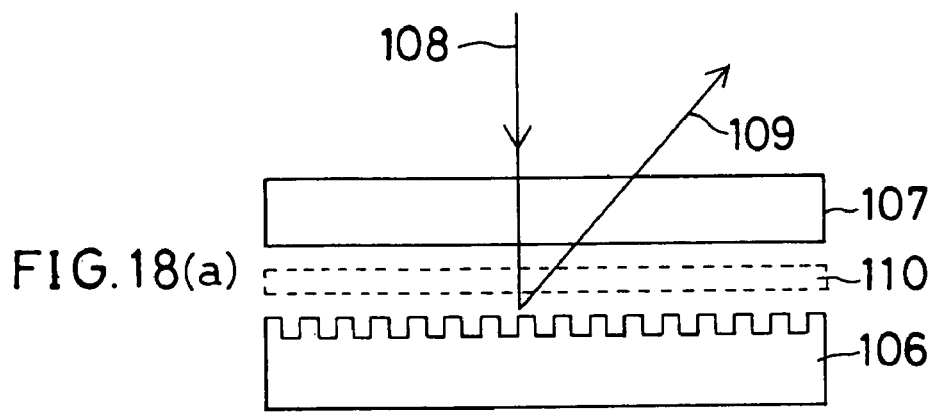
FIG. 18 illustrates how to make a hologram-recorded medium from a computer-generated hologram by replication.

According to the first approach, a volume hologram photosensitive material 107 such as a photopolymer is stacked on a reflection type CGH 106, and reconstructing illumination light 108 of given wavelength is then allowed to strike on the CGH 106 through the hologram photosensitive material 107, as shown in FIG. 18(a). Thereupon, first-order diffracted light 109 is diffracted from the CGH 106 in the opposite direction, and then interferes with the incident light 108 to produce interference fringes, which are in turn recorded in the photosensitive material 107. Upon removal of the CGH 106, another CGH having different interference fringes in a different pattern is used to record such different interference fringes in the same volume hologram photosensitive material 107, thereby obtaining a hologram-recorded medium 101 of the present invention which has a plurality of patterns recorded therein, said patterns comprising a group of pixels with the same volume type interference fringes 103 recorded therein, as depicted in FIG. 14. In connection with the arrangement shown in FIG. 18(a), it is noted that a dichroic filter 110 comprising a multilayer interference film and capable of cutting higher-order diffracted light striking on the CGH 106 at angles different from those of the incident light 108, and first-order diffracted light 109 may be interposed between the CGH 106 and the hologram photosensitive material 107 to prevent unnecessary interference fringes from being recorded therein.

Figure 18B:
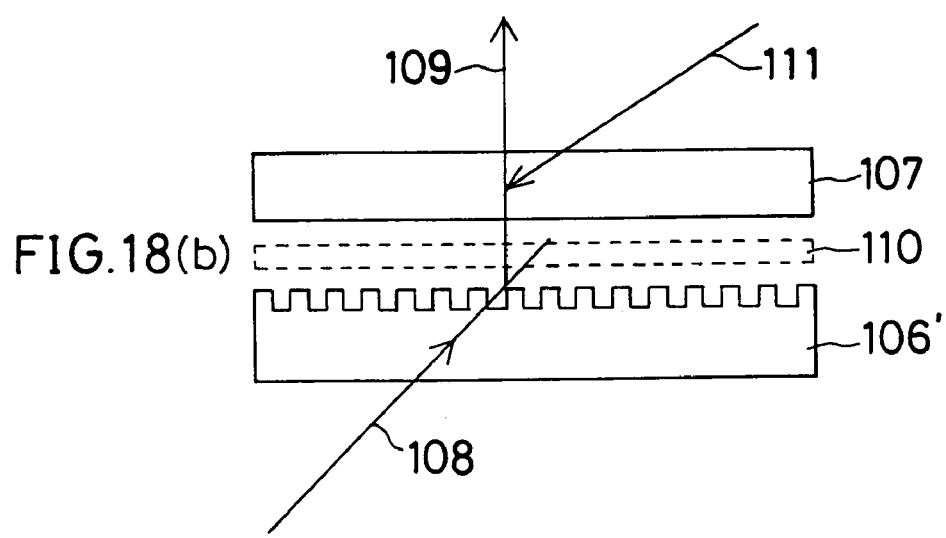

According to another method, a volume hologram photosensitive material 107 such as a photopolymer is stacked on a transmission type CGH 106', and reconstructing illumination light 108 of given wavelength is then allowed to strike on the side of the CGH 106' that is not opposite to the hologram material 107, as depicted in FIG. 18(b). Thereupon, first-order diffracted light 109 is diffracted from the CGH 106' in the opposite direction. At the same time, reference light 111 is allowed to strike on the photosensitive material 107, so that the first-order diffracted light 109, and reference light 111 interfere in the hologram photosensitive material 107 to record interference fringes therein. Upon removal of the CGH 106', another CGH having different interference fringes in a different pattern is used to record such different interference fringes in the same volume hologram photosensitive material 107, thereby obtaining a hologram-recorded medium 101 of the present invention which has a plurality of patterns recorded therein, said patterns comprising a group of pixels with the same volume type interference fringes 103 recorded therein, as depicted in FIG. 14. In this case, too, it is noted that a dichroic filter 110 capable of cutting zero-order light, and higher-order diffracted light striking on the CGH 106' at an angle different from that of the first-order diffracted light 109 may be interposed between the CGH 106' and the hologram photosensitive material 107 to prevent unnecessary interference fringes from being recorded therein.

Figure 18C:
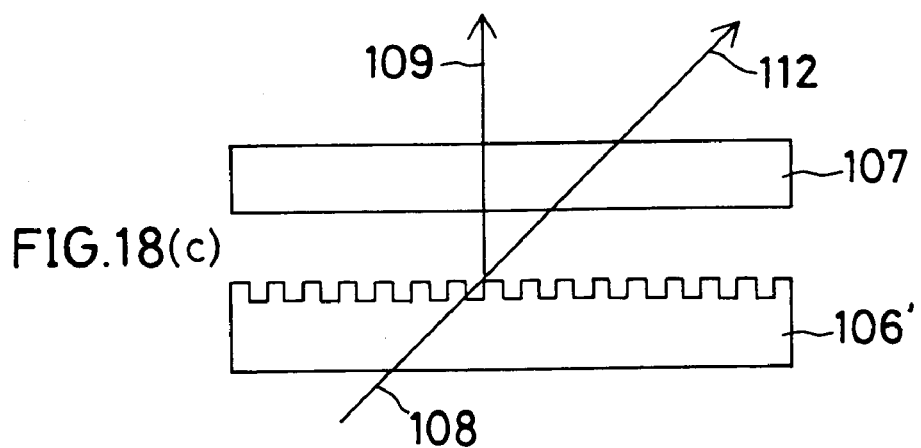
Figure 19:
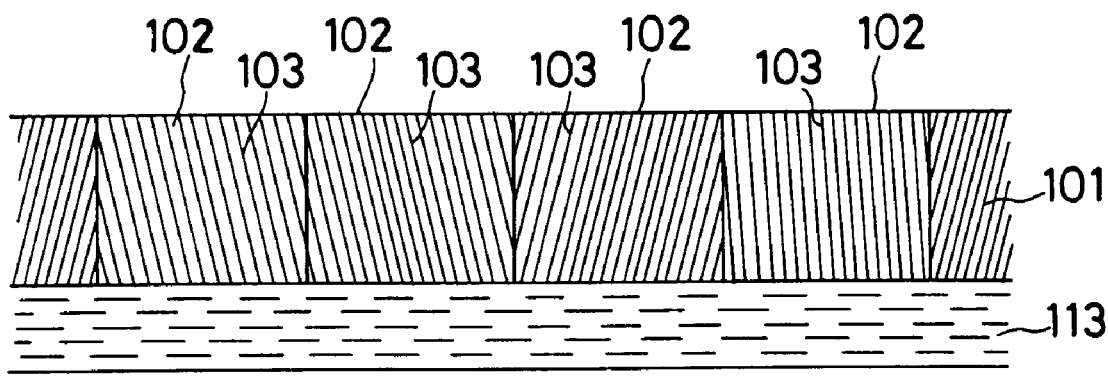
FIG. 19 is a sectional schematic of a typical hologram-recorded medium made using a transmission type computer-generated hologram.

According to yet another approach, a volume hologram photosensitive material 107 such as a photopolymer is stacked on a transmission type CGH 106', and reconstructing illumination light 108 of given wavelength is then allowed to strike on the side of the CGH 106' that is not opposite to the hologram material 107, as depicted in FIG. 18(c). Thereupon, first-order diffracted light 109 is diffracted from the CGH 106' in the opposite direction, and zero-order light 112 goes straightforward, so that both light 109 and 112 strike on the hologram photosensitive material 107 from the same direction to record a transmission type of volume interference fringes 103 therein. Upon removal of the CGH 106', another CGH having different interference fringes in a different pattern is used to record such different interference fringes in the same volume hologram photosensitive material 107, thereby obtaining a hologram-recorded medium of the present invention which has a plurality of patterns recorded therein, said patterns comprising a group of pixels with the same volume type interference fringes 103 recorded therein. However, since, in this case, the recorded volume hologram is of the transmission type, the recorded patterns cannot be seen from the illumination side. Accordingly, as shown sectionally in FIG. 19, a reflecting layer 113 such as an aluminum layer must be provided on the back side of the hologram-recorded medium 101 to let it be of the reflection type.

Figure 20A:
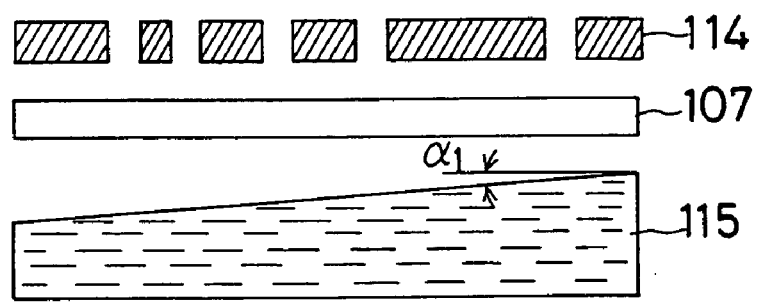
FIG. 20 illustrates how to fabricate a hologram-recorded medium using a mask pattern, and an inclined plane mirror.
Figure 20B:
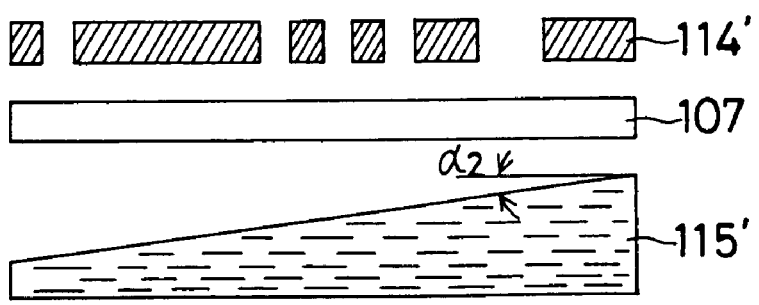

According to the second method using a mask pattern, and an inclined plane mirror, a plurality of mask plates 114 and 114' are fabricated, which have different patterns of openings to be recorded, as depicted in FIG. 20. In association with these mask plates 114 and 114', plane mirrors 115 and 115' having different angles of inclination $\alpha_1$ and $\alpha_2$ are provided. Of course, one plane mirror may be used to alter the angle of inclination between $\alpha_1$ and $\alpha_2$. Then, as depicted in FIG. 20(*a*), a volume hologram photosensitive material 107 is interposed between the mask plate 114 and the plane mirror 115 such that they are positioned in proximity to one another. Upon the whole of the hologram photo-sensitive material 107 illuminated by light through the openings in the mask plate 114, the incident light, and light reflected by the plane mirror 115 and tilting dependent on the angle of inclination $\alpha_1$ interfere in the material 107 to record interference fringes therein. Upon removal of the mask plate 114, another mask plate 114' having a different opening pattern is located with the hologram photosensitive material 107 and the plane mirror 115' such that they are positioned in proximity to one another, thereby recording a different type of interference fringes in the same volume hologram photosensitive material 107. In this way there is obtained a hologram-recorded medium of the invention which has a plurality of patterns recorded therein, said patterns comprising a group of pixels with the same volume hologram photosensitive material 107. In this connection, it is also effective to use primaries-separating original patterns obtained in the color separation step for printing as the mask plates 114 and 114'.

Figure 21A:
FIG. 21 illustrates how to fabricate a hologram-recorded medium using a mask pattern, and an off-axis reflection type hologram.
Figure 21B:
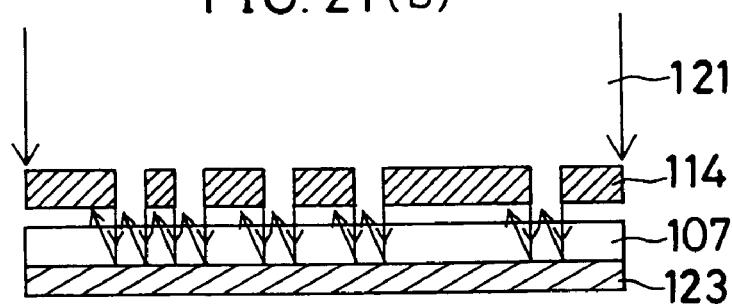

With the method shown in FIG. 20, however, there is possibility that a portion with no volume type interference fringes 103 recorded therein remains, because the distance between the hologram photosensitive material 107 and the plane mirrors 115, 115' becomes too large due to the inclination of the plane mirrors 115, 115', resulting in no interference of the light passing through the openings in the mask plates 114, 114' with the light reflected by the plane mirrors 115, 115' upon passing through the hologram photosensitive material 107. To avoid this, the method of FIG. 20 may be modified as depicted in FIG. 21(*a*). For instance, a plurality of off-axis reflection type holograms 123 are provided, which diffract an almost vertically incident light beam 121 at an angle θ into diffracted light 122 propagating in the reflection direction, and have different angles θ. As depicted in FIG. 21(*b*), a volume hologram photosensitive material 107 is interposed between a mask plate 114 and the off-axis reflection type hologram 123 such that they are positioned in proximity to one another, and the whole of the volume hologram photosensitive material 107 is illuminated by the light 121 through the openings in the mask plate 114 to record one interference fringe therein. Upon removal of the aforesaid off-axis reflection type hologram 123, another off-axis reflection type hologram 123 having another angle θ is used to record another interference fringe in the volume hologram photosensitive material 107. As in the case of FIG. 20, there is thus obtained a hologram-recorded medium of the present invention which has a plurality of patterns recorded therein, said patterns comprising a group of pixels with the same volume type interference fringes 103 recorded therein.

Figure 22:
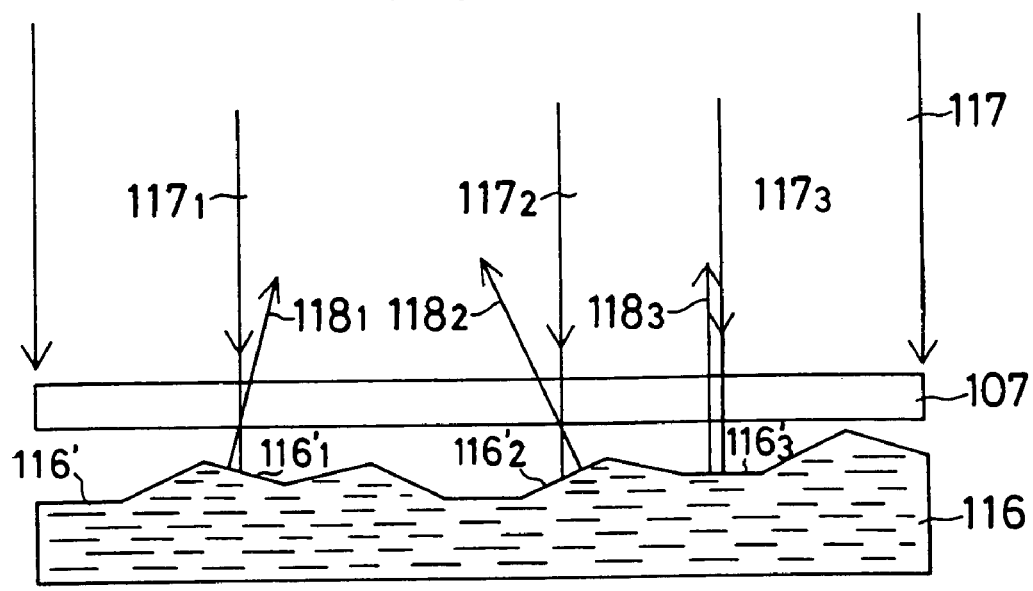
FIG. 22 illustrates how to fabricate a hologram-recorded medium using a group of micro-mirrors that vary in reflection direction per position.

According to the third method using a group of micromirrors varying in reflection direction per position, a composite reflector 116 is provided, which comprises a collection of micro-mirrors 116' varying in reflection direction per position, as depicted in FIG. 22. A volume hologram photosensitive material 107 is positioned in proximity to the surface of the reflector 116. Then, a light beam 117 is permitted to strike on the hologram photosensitive material 107, whereupon the light beam 117 passes through the hologram photosensitive material 107, and is reflected at micro-mirror surfaces 116'$_1$, 116'$_2$, and 116'$_3$ into reflected light 118$_1$, 118$_2$, and 118$_3$, which propagate in different directions. The reflected light 118$_1$, 118$_2$, and 118$_3$ and the incident light 117$_1$, 117$_2$, and 117$_3$ interfere in the hologram photosensitive material 107 to record interference fringes varying per position therein. If a desired pattern is expressed by a group of the micro-mirror surfaces 116' having the same reflection direction, therefore, it is possible to obtain a hologram-recorded medium of the present invention which has a plurality of patterns recorded therein, said patterns comprising a group of pixels with the same volume type interference fringes 103 recorded therein. It is understood that different composite reflectors 116 may be used to record interference fringes in one hologram photo-sensitive material 107 in a superposed manner. In this case, the number of patterns and colors to be recorded increase. In the method of FIG. 22, too, an off-axis reflection type micro-holograms 123 varying in diffraction direction per position, such as those shown in FIG. 21(*a*) may be used in place of the micro-mirror surfaces 116' varying in reflection direction per position.

Figure 23A:
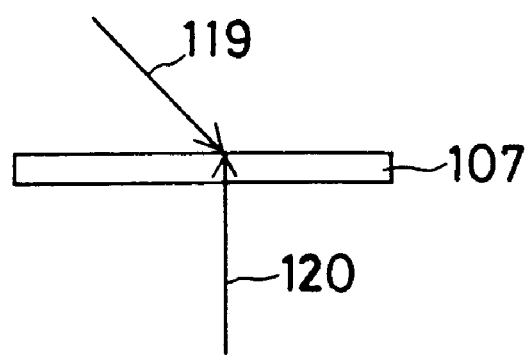
FIG. 23 illustrates how to fabricate a hologram-recorded medium while two coherent light beams are moved relatively with respect to the hologram-recording medium.
Figure 23B:
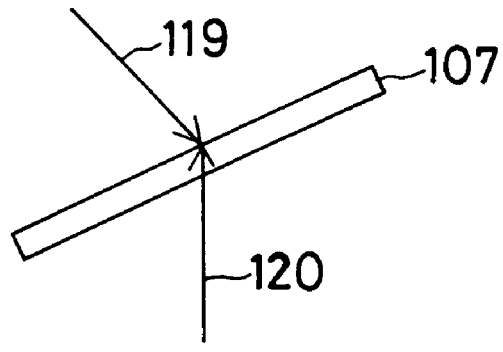

According to the fourth method of recording interference fringes while two coherent light beams are moved relatively with respect to a hologram-recording medium, two coherent thin light beams 119 and 120 intersect each other at a given relative angle in a specific pixel position in a volume hologram photosensitive material 107 positioned at a certain angle, thereby recording in that pixel position a volume type interference fringe 103 derived from the conditions for aligning these parts, as depicted in FIG. 23(*a*). In another pixel position, another volume type interference fringe 103 derived from the conditions for setting the angle of the hologram photosensitive material 107 and/or the relative angles of the light beams 119 and 120 which are different from those mentioned above is recorded in the hologram photosensitive material. This process is sequentially carried out for all pixel positions where the interference fringes 103 are recorded until a hologram-recorded medium of the present invention is finally obtained, which has a plurality of patterns recorded therein, said patterns comprising a group of pixels with the same volume type interference fringes 103 recorded therein.

While the hologram-recorded medium of the present invention, and the method of fabricating the same have been described with reference to several embodiments, it is understood that the present invention is not limited thereto, and so various modifications may be feasible. In particular, if interference fringes obtained by the interference of diffused light and parallel light, as typically depicted in FIG. 1, are used as the interference fringes 103 to be recorded in the pixels 102$_1$, to 102$_4$, it is then possible to obtain color pixels 102$_1$, to 102$_4$ of the diffuse reflection type. Such a hologram-recorded medium lends itself well fit to the reflection type hologram 30 depicted in FIG. 8, and the reflection type hologram color filter 81 depicted in FIG. 9.

According to the present invention as explained above, it is possible to obtain a hologram-recorded medium having high diffraction efficiency and capable of reconstructing a bright pattern, because it is a medium which has an imagewise or other pattern comprising a collection of pixels, and in which any one of a volume type of different diffracting gratings comprising volume holograms is assigned to at least a part of the pixels. It is also possible to record a multiplex pattern with no drop of diffraction efficiency. Further, it is possible to record, and reconstruct, a full-color pattern while color tone, and gradation are placed under control by additive color mixing. Furthermore, it is possible to record, and reconstruct, different patterns which are sharply changeable depending on a viewing direction, and an illumination direction.

Reference will then be made to the principles, and embodiments of the hologram color display medium of the present invention which is applicable to the reflection type hologram 30 of FIG. 8, and the reflection type hologram color filter 81 of FIG. 9, as well as of the method of medium fabrication.

Referring first to the principles of this hologram color display medium, two swelling films obtained by mixing a monomer or oligomer, a photopolymerization initiator, etc. with a binder polymer are provided, as in the case of a photopolymer. Before or after the close contact of these two swelling films with both sides of a photopolymer or other photosensitive material with interference fringes recorded therein, a given area of each swelling film is irradiated with light in a quantity sufficient to deactivate the swelling agent (monomer or oligomer) contained in that area while the other area of the film is not irradiated with light to keep the swelling agent in an active state. Then, the active swelling agent is diffused from the selected areas of the swelling films into the photosensitive material through both its sides, and fixed in place, thereby arbitrarily forming three or four zones, a first zone where the swelling agent is diffused from both sides of the material, a second zone where the swelling agent is diffused from one side of the material, a third zone where the swelling agent is diffused from the other side of the material, and a fourth zone where the swelling agent is not diffused from either side of the material at all, so that three or four fringe spacings are available to reconstruct a given three- or four-color pattern.

The hologram color display medium of the present invention, and the method of medium fabrication according to the present invention will now be explained specifically with reference to the drawings.

FIG. 24 illustrates the principle of a first embodiment of the hologram color display medium of the invention. FIG. 24(*a*) is a plan view of a swelling film 131 to be in close contact with the surface side of the material, and FIG. 24(*b*) is a plan view of a swelling film 132 to be in close contact with the back side of the material. Each film may have been obtained by mixing a monomer or oligomer, a photopolymerization initiator, etc. with a binder polymer, as in the case of a photopolymer. An area 131*n* occupying the right ⅔ of the swelling film 131 to be into close contact with the surface side of the material, and an area 132*n* occupying the right ⅓ of the swelling film 132 to be into close contact with the back side of the material have been deactivated by exposure to light in a quantity sufficient to make inert substantially all of the penetrating active monomer or oligomer in the swelling films. In other words, the swelling film 131 is active in an area 131*a* occupying the left ⅓ thereof, while the swelling film 132 is active in an area 132*a* occupying the left ⅔ thereof.

Apart from this, a volume hologram 130 comprising plane interference fringes at a constant pitch is recorded in a photopolymer or other photosensitive material, as in the case of FIG. 44(*a*). Then, the swelling films 131, and 132 with some areas deactivated according to a certain deactivation pattern as depicted in FIGS. 24(*a*), and 24(*b*) are brought into close contact with the surface, and back sides of the material, as depicted sectionally in FIG. 24(*c*). The stack is heated under temperature, and time conditions sufficient to diffuse the penetrating active monomer or oligomer from the swelling films 131, and 132 into the volume hologram 130.

After such heat treatment, the swelling films 131, and 132 are held together with, or removed from, the hologram 130. Thereupon, a volume hologram 140 after subjected to the swelling treatment are divided into three areas depending on the degree of swelling, as depicted in FIG. 24(*d*), i.e., an area A swollen by the swelling agent diffused from both swelling films 131 and 132, an area B swollen by the swelling agent diffused from the swelling film 132, and an area C not subjected to swelling at all. The degree of swelling is area A>area B>area C. If, for instance, the volume hologram 130 is illuminated by light of blue wavelength, the area C does not substantially swell to diffract, and reproduce the blue light in a given direction. On the other hand, the area B having a medium degree of swelling diffracts, and reproduces green light longer in wavelength than blue light in the same direction. Furthermore, the area A having the largest degree of swelling diffracts, and reproduces red light longer in wavelength than green light in the same direction. It is thus possible to record any desired two- or three-color pattern by the simultaneous swelling of the swelling films 131 and 132 with some areas deactivated according to a given deactivation pattern, which are brought into close contact with both sides of the volume hologram 130.

FIG. 25 illustrates the principle of a second embodiment of the hologram color display medium of the present invention. FIG. 25(*a*) is a plan view of a swelling film 131 which is to be first brought into close contact with the surface side of the material for swelling. An area 131*n* occupying the right ½ of the swelling film 131 has been deactivated by exposure to light, as in the case of FIG. 24.

Then, as shown in FIG. 25(*b*), the swelling film 131 with the area 131*n* deactivated according to a constant deactivation pattern as depicted in FIG. 25(*a*) is brought into close contact with the surface of a volume hologram 130 previously obtained by recording plane interference fringes in a photopolymer or other photosensitive material at a constant pitch. The stack is heated under temperature, and time conditions sufficient to diffuse the penetrating active monomer or oligomer from the swelling film 131 into the volume hologram 130.

Another swelling film 132 such as one shown in FIG. 25(*c*) is provided, which is to be brought into close contact with the back side of the material. An area 132*n* occupying the central ½ of the film 132 has been deactivated by exposure to light, as in the case of FIG. 24, except areas 132*a*, and 132*a* occupying the left, and right ¼ of the film 132.

After the surface side of the volume hologram 130 has been heated and swollen as depicted in FIG. 25(*b*), the swelling film 132 with the area 132*n* deactivated according to a constant deactivation pattern as depicted in FIG. 25(*c*) is brought into close contact with the back side of the volume hologram 130, as depicted in FIG. 25(*d*). The stack is heated under temperature, and time conditions sufficient to diffuse the penetrating active monomer or oligomer from the swelling films 132 into the volume hologram 130.

After such heat treatment, the swelling films 131, and 132 are held together with, or removed from, the hologram 130. Thereupon, a volume hologram 140 after subjected to the swelling treatment are divided into four areas depending on the degree of swelling, as depicted in FIG. 25(*e*), i.e., an area A swollen by the swelling agent diffused from both swelling films 131 and 132, an area B swollen by the swelling agent diffused from the swelling film 131 provided on the surface side of the material, and subject to enhanced swelling by heating for the swelling treatment of the back side of the material, an area D swollen by the swelling agent diffused from the swelling film 132 provided on the back side of the material, and an area C not subjected to swelling at all. The degree of swelling is area A>area B>area D>area C. If, for instance, the volume hologram 130 is illuminated by light of blue wavelength, the area C does not substantially swell to diffract, and reproduce blue light in a given direction. On the other hand, the area D having some degree of swelling diffracts, and reproduces bluish green light longer in wavelength than blue light in the same direction. The area B larger in the degree of swelling than the area D diffracts, and reproduces green light longer in wavelength than bluish green light in the same direction. Furthermore, the area A having the largest degree of swelling diffracts, and reproduces red light longer in wavelength than green light in the same direction. It is thus possible to record any desired three- or four-color pattern by the successive swelling of the swelling films 131, and 132 with some areas deactivated according to a given deactivation pattern, which are brought into close contact with both sides of the volume hologram 130.

In the aforesaid embodiments, the deactivation of the given areas of the swelling films 131, and 132 is carried out by exposure to ultraviolet or other light of given wavelength before the close contact thereof with the volume hologram 130. However, the swelling films 131, and 132 may be deactivated after such close contact. In connection with the case of FIG. 24, however, notice that the deactivation of the swelling film 131 or 132 results in the deactivation of the other film 132 or 131 in the same pattern. To avoid this may be achievable by making the swelling films 131 and 132 different in wavelength selectivity from each other. It is thus preferable that the swelling film 131 is deactivated by light of wavelength coincident with the sensitivity thereof, and that the swelling film 132 is deactivated by light of another wavelength coincident with the sensitivity thereof.

Figure 24A:
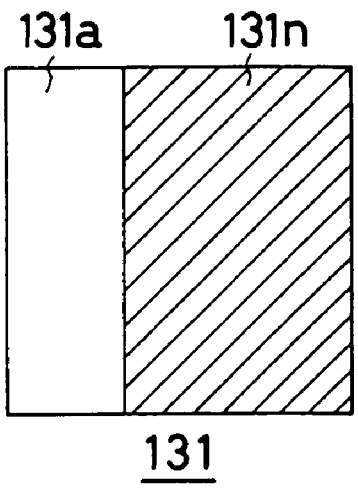
FIG. 24 illustrates the first principle of the method for fabricating a hologram color display medium of the invention.
Figure 24B:
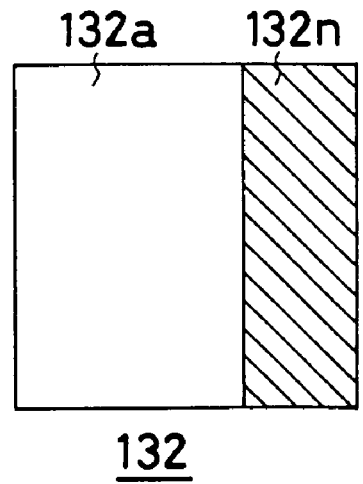
Figure 24C:
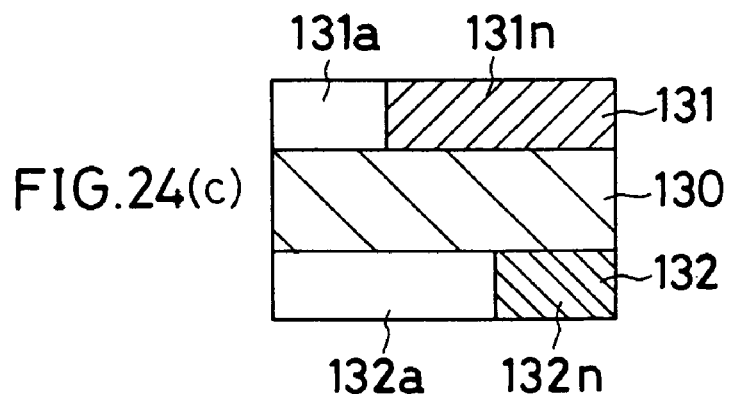
Figure 24D:
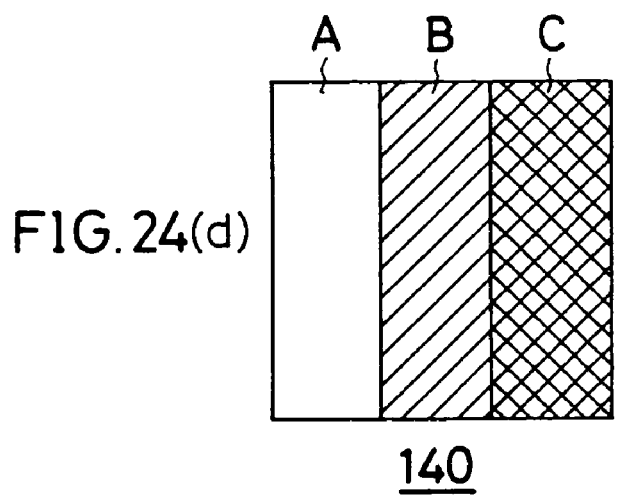
Figure 25A:
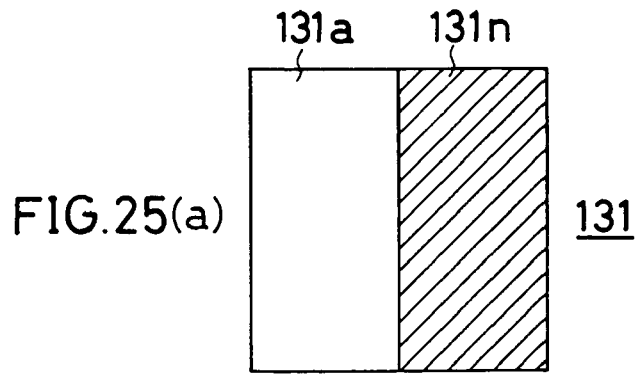
FIG. 25 illustrates the second principle of the method for fabricating a hologram color display medium of the invention.
Figure 25B:
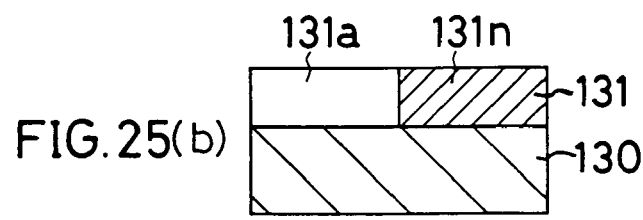
Figure 25C:
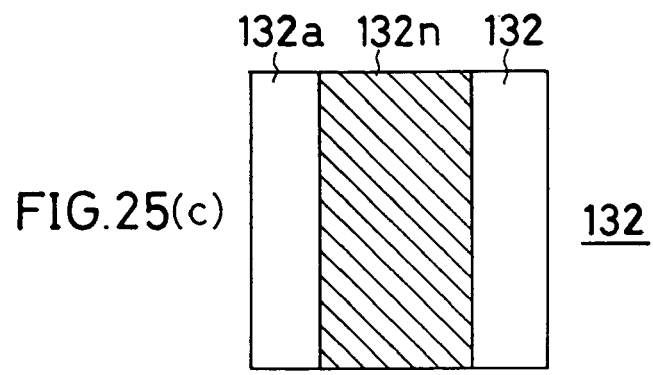
Figure 25D:
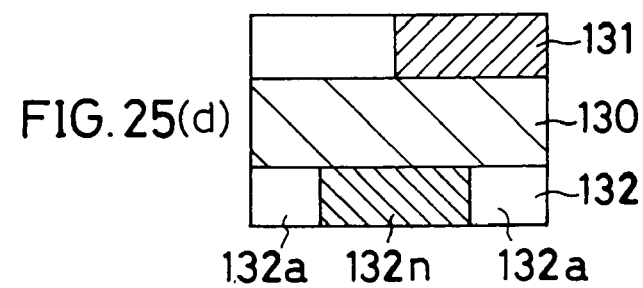
Figure 25E:
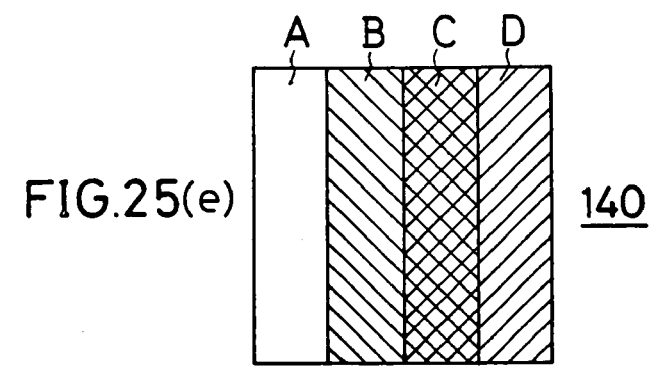
Figure 26:
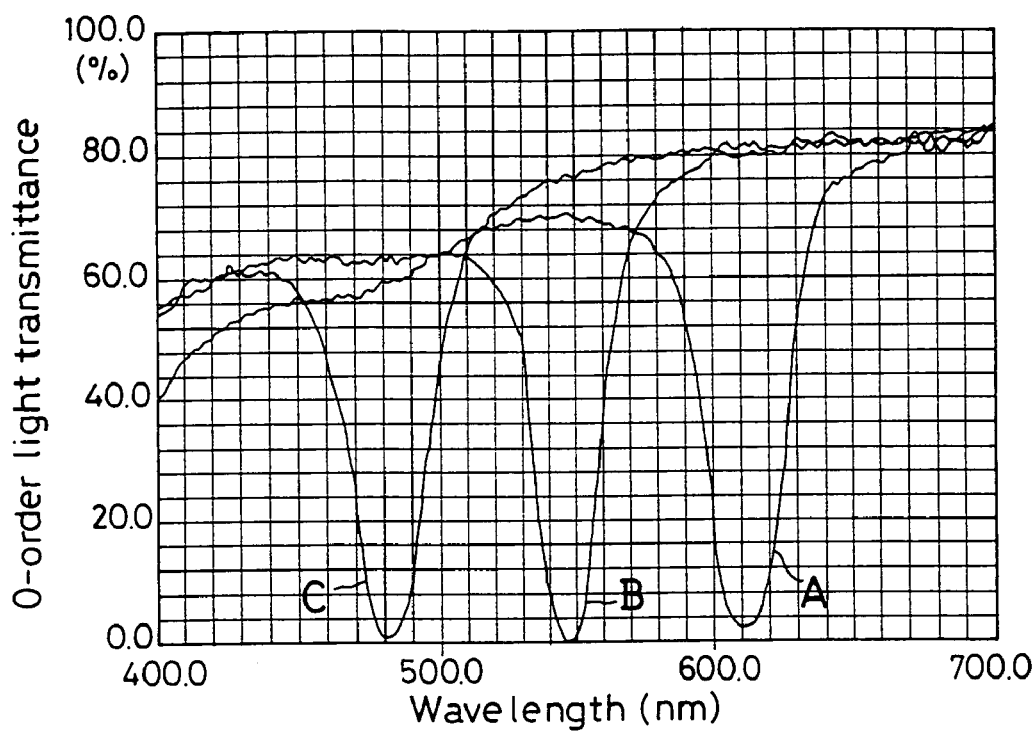
FIG. 26 is a graph showing a diffraction efficiency profile of a first embodiment of the volume hologram of the invention.
Figure 27:
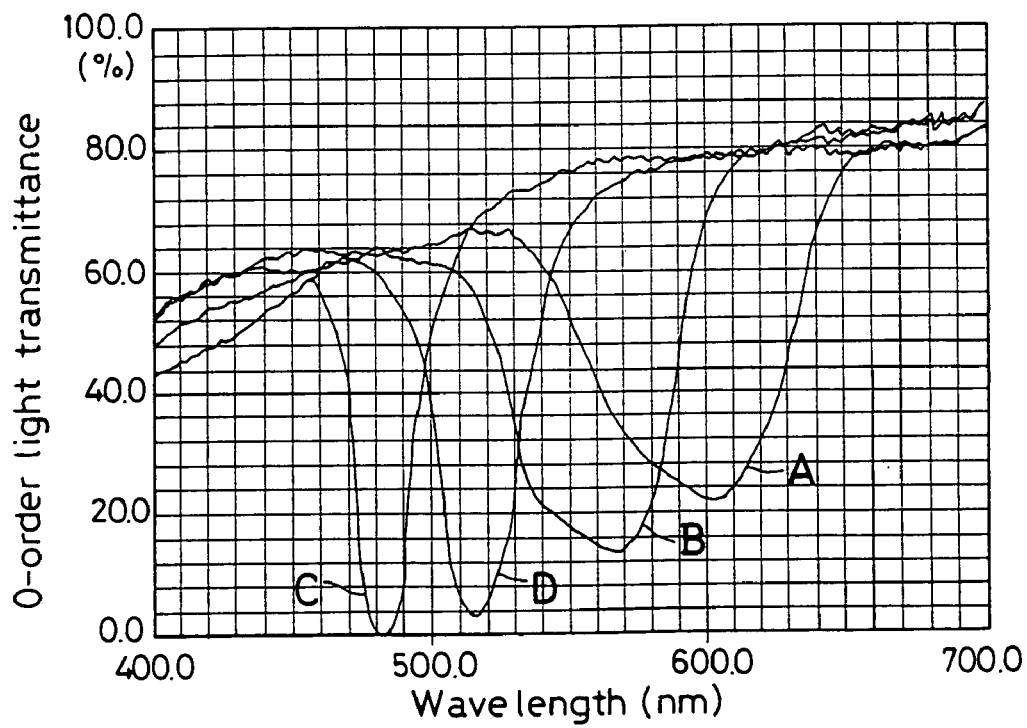
FIG. 27 is a graph showing a diffraction efficiency profile of a second embodiment of the volume hologram.

Reference will now be made to an embodiment of recording three or four colors by the treatments illustrated in FIGS. 24, and 25. Specifically, Omnidex 706 (made by Du Pont) was used as a photopolymer for recording the volume hologram 130 therein, and CTF 75 (made by Du Pont) was used as the swelling films 131, and 132. The heat treatments explained with reference to FIGS. 24(c), 25(b), and 25(d) were carried out at 120° C. for 2 hours. As a result, volume holograms 140 having such diffraction efficiency profiles as shown in FIGS. 26, and 27 are obtained in the embodiments depicted in FIGS. 24, and 25, respectively. In FIGS. 26, and 27 curves A to D correspond to the areas A to D in FIGS. 24(d), and 25(e). However, notice that the ordinates represent zero-order light transmittance having complementary relation to diffraction efficiency, rather than direct diffraction efficiency. From these figures, it is found that desired color reproducibility can be available.

Patterns obtained with the aforesaid methods are only three- or four-color patterns. To obtain halftone colors other than these colors, it is preferable to resort to the principle of additive color mixing by dot percents of micro-pixels displaying those two, three, and four colors. That is, a color image is represented by a collection of color display micro-units comprising pixels A to C or A to D of such shape as depicted in FIG. 24(d) or 25(e). In this case, any desired color can be expressed by varying the dot percent of the pixels A, B, C, and D on the assumption that the color display unit has a constant area.

In this case, however, although it is possible to control the color of each color display unit yet it is impossible to control the brightness or luminance thereof. Such control is achievable by two methods. The first method involves recording in the volume hologram 130 interference fringes having uniform fringe spacings such that their diffraction efficiency varies depending on the positions of the aforesaid color display units, not interference fringes having uniform diffraction efficiency (refractive index modulation). Notice that the interference fringes have a constant spacing between adjoining fringes, and are each in a plane form, with the refractive index modulation varying per position. In the second method, the volume hologram 130 used may be of a halftone-including absorption type, or may be provided on its diffraction side with a layer such that the intensity of diffracted light varies depending on the position of the aforesaid color display units. Specifically, the volume hologram 130 is provided on its surface with a layer with a halftone-including white-and-black image such as a white-and-black photograph negative recorded therein, or the medium of volume hologram 130 used is of an absorption type such that the intensity of diffracted light varies depending on position.

While the hologram color display unit of the present invention, and the method of fabricating the same have been described with reference to several embodiments and examples, it is understood that the present invention is not limited thereto, and so various modifications may be possible. In the examples of FIGS. 24 and 25, too, the degree of deactivation of the swelling films 131 and 132, for instance, may be regulated to different values by controlling the quantity of irradiating light, thereby regulating the degree of swelling. In the foregoing embodiments, plane interference fringes have been recorded in the volume hologram 130 at a constant pitch. In this case, too, color areas A to D of the diffuse reflection type can be obtained by recording interference fringes produced by the interference of diffused light and parallel light, as typically shown in FIG. 1. Such a hologram color display medium is suitable for use on the reflection type hologram 30 depicted in FIG. 8, and the reflection type hologram color filter 81 depicted in FIG. 9.

According to the hologram color display medium of the present invention, and the method of fabricating the same as explained above, a stable pattern of two or more different colors can be reproduced by swelling from a hologram with uniform interference fringes recorded therein without recourse to light quantity control, because the hologram is swollen from both its sides using two swelling films irradiated with a given or more quantity of light according to the deactivation pattern. In addition, a two-dimensional diffraction pattern of two or more colors can be displayed by the combination of the deactivated pattern of one swelling film with that of another swelling film.

Reference will then be made to embodiments of the multicolor hologram display unit according to the present invention, which is applicable to the reflection type hologram 30 of FIG. 8, and the reflection type hologram color filter 81 of FIG. 9.

Figure 28:
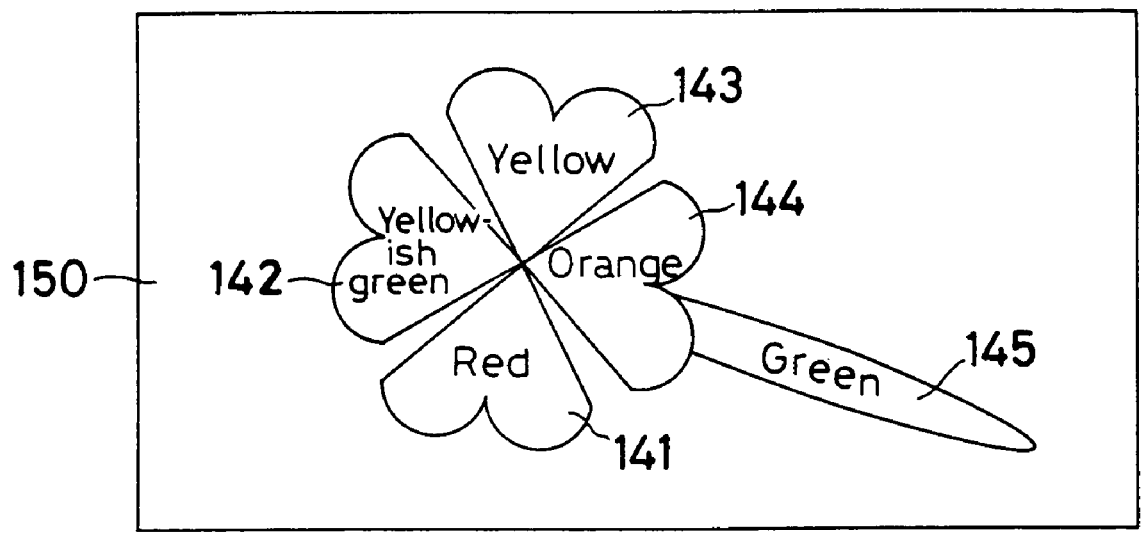
FIG. 28 is a plan schematic of one embodiment of the multicolor hologram display unit of the invention.

Consider here that a hologram display unit 150 designed to display a flower pattern comprising a red flower leaf area 141, a yellowish green flower leaf area 142, an yellow flower leaf area 143 and an orange flower leaf area 144, and a pattern a comprising a green stem area 145 on a colorless transparent background is fabricated from a red diffraction volume hologram, and a green diffraction volume hologram, as shown in FIG. 28.

Figure 29:
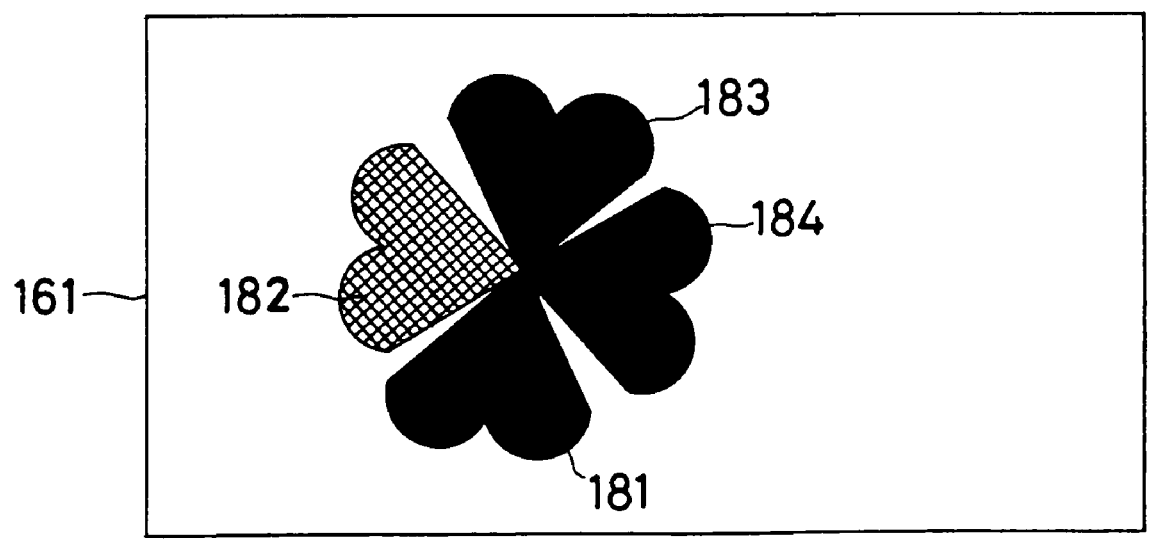
FIG. 29 is a plan schematic of one mask pattern used in the process of fabricating the multicolor hologram display unit of FIG. 28.
Figure 31A:
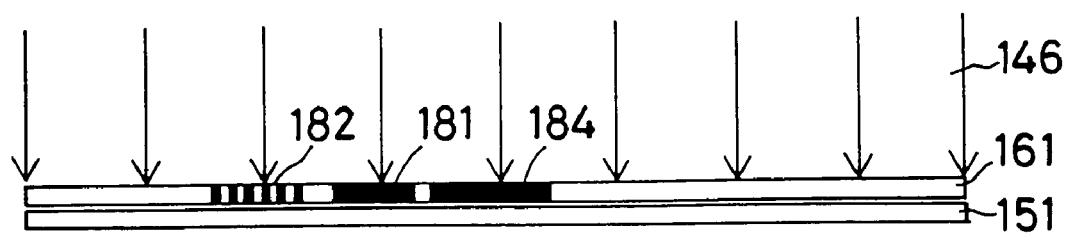
FIG. 31 is illustrative of the step of deactivating a part of the recording photosensitive material used in the process of fabricating the multicolor hologram display unit of FIG. 28.

To this end, two volume hologram-recording photosensitive materials 151 and 152 formed of photopolymers, etc. are provided. A red mask pattern 161 such as one depicted in FIG. 29 is superposed on one recording photosensitive material 151, and then irradiated with ultraviolet rays 6 to expose the recording photosensitive material 151 to the rays, as depicted in FIG. 31(a). Pattern areas 181, 183 and 184 of the mask pattern 161 corresponding to the red, yellow, and orange flower leaf areas 141, 143, and 144 of the hologram display unit 150 are opaque to the ultraviolet rays 146, and a pattern area 182 of the mask pattern 161 corresponding to the yellowish green flower leaf area 142 of the hologram display unit 150 forms a 50% dot area with dots opaque to the ultraviolet rays 146. Accordingly, portions of the recording photosensitive material 151 corresponding to the pattern areas 181, 183 and 184 are all insensitive to the ultraviolet rays 146 and remain sensitive to other light, and a portion of the photosensitive material 151 corresponding to the pattern area 182 has a 50% dot area part remaining sensitive to other light, too. Thus, portions of the photosensitive material 151 that do not correspond to the pattern areas 181 to 184, and a portion of the photosensitive material 151 that corresponds to another 50% non-dot area part of the pattern area 182 have been deactivated by exposure to the ultraviolet rays 146.

Figure 30:
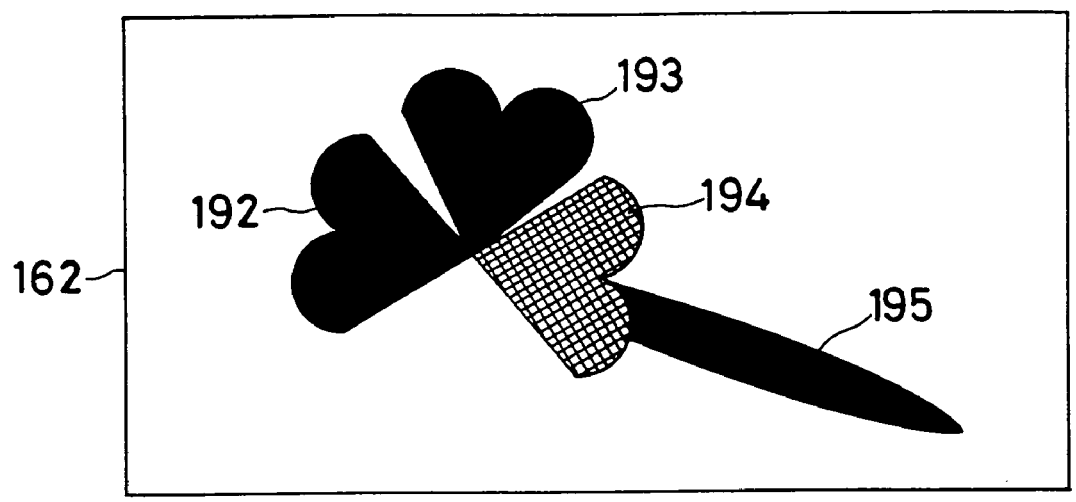
FIG. 30 a plan schematic of another mask pattern used in the process of fabricating the multicolor hologram display unit of FIG. 28.
Figure 31B:
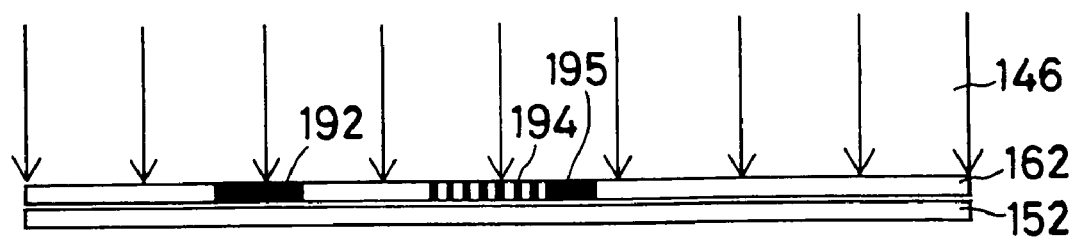

A green mask pattern 162 such as one depicted in FIG. 30 is superposed on another recording photosensitive material 152, and then irradiated with ultraviolet rays 146 to expose the material 152 to the rays, as depicted in FIG. 31(b). Patterns areas 192, 193 and 195 of the mask pattern 162 corresponding to the yellowish green, yellow, and green flower leas areas 142, 143, and 145 of the hologram display unit 150 are opaque to the ultraviolet rays 146, and a pattern area 194 of the mask pattern 162 corresponding to the orange flower leaf area 144 of the hologram display unit 150 forms a 50% dot area with dots opaque to the ultraviolet rays 146. Accordingly, portions of the recording photosensitive material 152 corresponding to the pattern areas 192, 193 and 195 are all insensitive to the ultraviolet rays 146 and remain sensitive to other light, and a portion of the photosensitive material 152 corresponding to the pattern area 194 has a 50% dot area part remaining sensitive to other light, too. Thus, portions of the photosensitive material 152 that do not correspond to the pattern areas 192 to 195, and a portion of the photosensitive material 151 that corresponds to another 50% non-dot area part of the pattern area 194 have been deactivated by exposure to the ultraviolet rays 146.

Figure 32A:
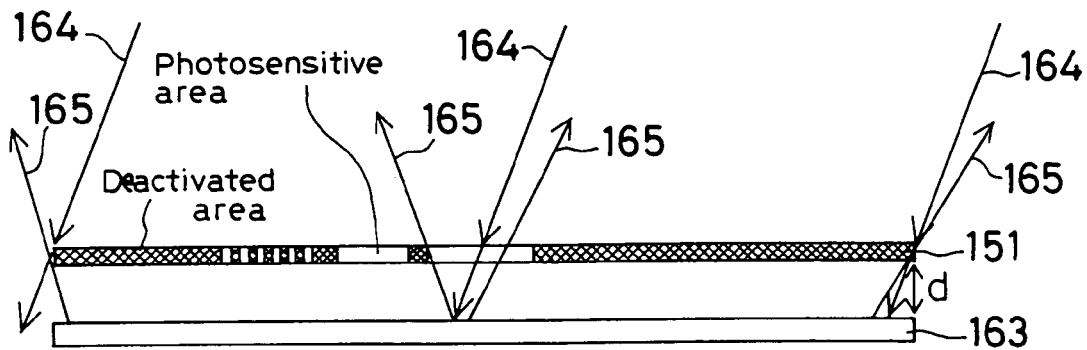
FIG. 32 is illustrative of the step of recording a hologram in the recording photosensitive material in the process of fabricating the multicolor hologram display unit of FIG. 28.
Figure 32B:
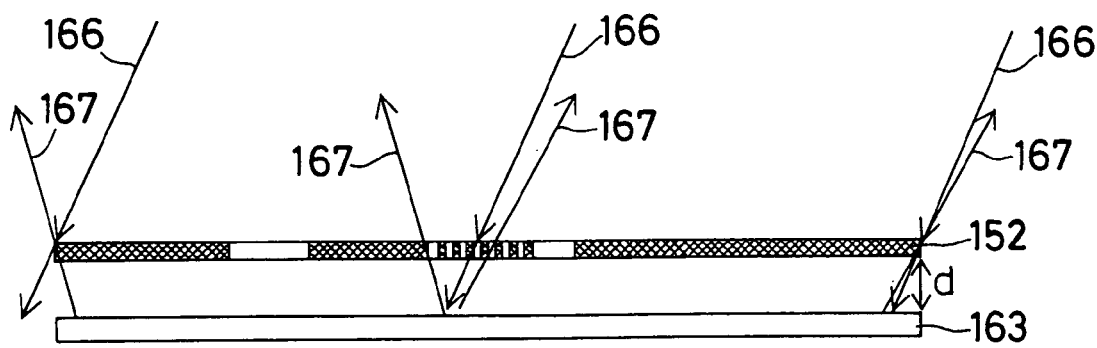

Then, a red diffraction volume hologram that reflects, scatters, and diffracts light of red wavelength (e.g., 647 nm), and a green diffraction volume hologram that reflects, scatters, and diffracts light of green wavelength (e.g., 532 nm) are recorded in active (photosensitive) areas of the recording photosensitive materials 151 and 152 with some areas deactivated through the red, and green mask patterns 161 and 162. To this end, a reflecting and scattering plate 163 is located on the back side of the recording photo-sensitive material 151 or 152 as mentioned above, with a distance d between them, as can be seen from FIGS. 32(a) and 32(b). Then, light 24 of red wavelength, and light 26 of green wavelength are allowed to strike at a given angle of incidence on the surface side of the photosensitive material 151 or 152, so that light 165 and 167 reflected, and scattered by the reflecting and scattering plate 163 upon passing through the material 151 or 152, and the incident light 164 and 166 interfere in the photosensitive area to record therein the red diffraction volume hologram that reflects, scatters, and diffracts the light of red wavelength, and the green diffraction volume hologram that reflects, scatters, and diffracts the light of green wavelength. It is here to be noted that the distance d is determined depending on the desired reflection and scattering characteristics of the volume holograms recorded. Of course the plate 163 may be in close contact with the photosensitive material, that is, the distance d may be nearly equal to zero.

Figure 33:
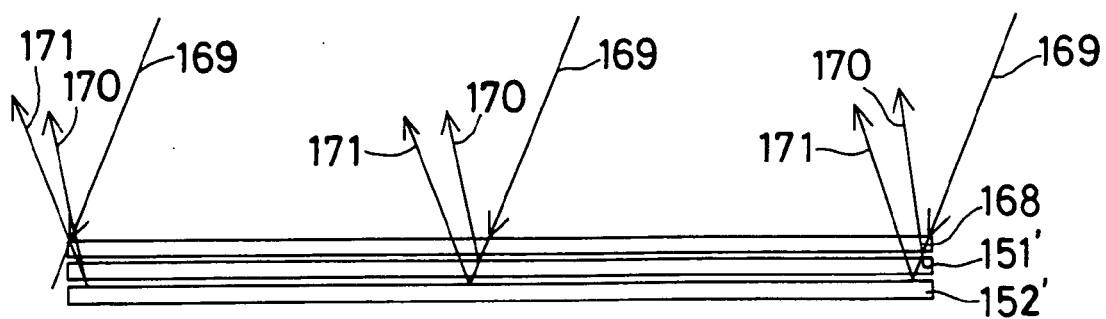
FIG. 33 is illustrative of the step of replicating the multicolor hologram display unit of FIG. 28 from an original plate.

Then, films 151' and 152' with the red, and green diffraction volume holograms recorded in the active areas are aligned, and put one upon another to obtain the hologram display unit 150 such as one depicted in FIG. 28. Another volume hologram-recording photosensitive material 168 is superposed on the hologram display unit 150, as depicted in FIG. 33. Then, illumination light 169 including light of red wavelength (e.g., 647 nm) and light of green wavelength (e.g., 532 nm) is allowed to strike on the recording photosensitive material 168. Thereupon, the incident light 169, light 170 (of red wavelength) diffracted from the hologram area of the film 151', and light 171 (of green wavelength) diffracted from the hologram area of the film 152' interfere in the recording photosensitive material 168 to multi-record interference fringes therein. In this way, the hologram display unit 150 depicted in FIG. 28 is obtained.

In what state the areas 141 to 145 of the hologram display unit 150 are arranged is shown in FIGS. 34(a) to 34(e). Referring first to an area easy to understand, only a hologram capable of reflecting, and scattering red is recorded in the area 141, as hatched upward to the right in FIG. 34(a). This hologram is seen as red in white illumination light. Recorded in the area 145 is only a hologram capable of reflecting, and scattering green (as hatched upward to the left in FIG. 34(e)), which is seen as green in white illumination light. Holograms capable of reflecting and scattering red, and green, respectively, are recorded in the area 143 in a superposed manner, as depicted in FIG. 34(c). These holograms diffract both wavelengths (e.g., 647 nm and 532 nm) (see FIG. 35), and are seen as yellow by additive color mixing.

Figure 35:
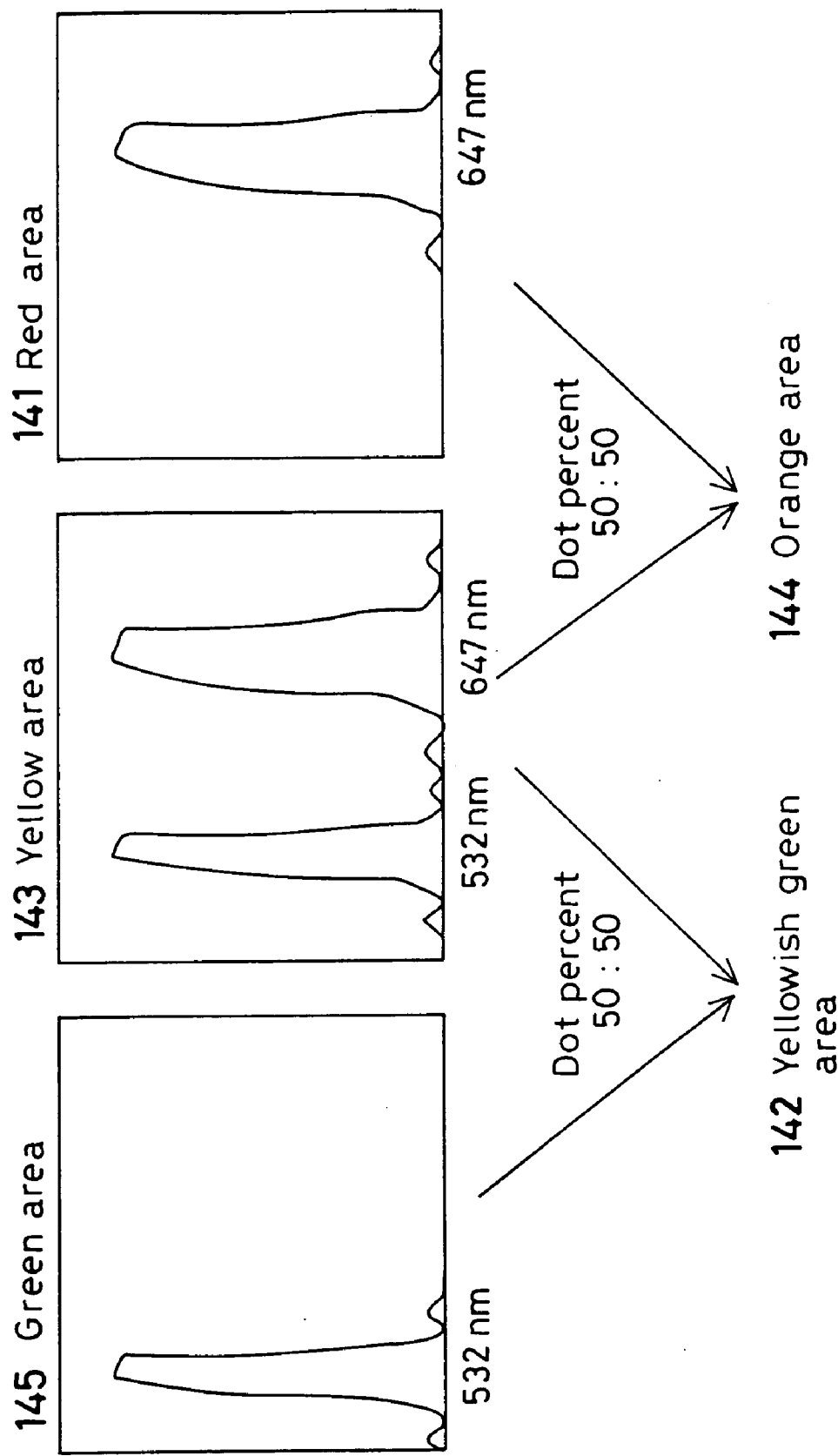
FIG. 35 is illustrative of on what principle the multicolor hologram display unit of FIG. 28 produces a halftone color.

In the area 142, micro-dots 147 exist at a 50 dot percent on a background 148, as depicted in FIG. 34(b), and holograms capable of reflecting and scattering red, and green, respectively, are recorded on the dots themselves in a superposed manner, as in the case of the area 143, and are seen as yellow. The background 148, which has only a hologram capable of reflecting, and scattering green recorded therein, is seen as green. Thus, the dots 147 exist on the background 148, and the ratio of the dots 174 seen as yellow and the background 148 seen as green is 50:50, and so the holograms are seen as yellowish green by additive color mixing, as shown in FIG. 35.

In the area 144, micro-dots 147 exist at a 50 dot percent on the background 148, as depicted in FIG. 34(d), and holograms capable of reflecting and scattering red, and green, respectively, are recorded on the dots themselves in a superposed manner, as in the case of the area 143, and are seen as yellow. The background 148, which has only a hologram capable of reflecting, and scattering red recorded therein, is seen as red. Thus, the dots 147 exists on the background 148, and the ratio of the dots 174 seen as yellow and the background 148 seen as red is 50:50, and so the hologram are seen as orange by additive color mixing, as shown in FIG. 35.

While the areas 142 and 144 have been described as having a 50 dot percent, it is understood that the dot percent may have any desired value. It is thus possible to obtain any desired halftone colors between green and yellow, and yellow and red.

While the hologram display unit 150 has been described as being constructed from a multi-recorded or stacked unit of two holograms differing in color, i.e., the red diffraction volume hologram, and the green diffraction volume hologram, it is understood that it may be constructed from a multi-recorded or stacked unit of three holograms differing in color by placing an additional blue diffraction volume hologram thereon. A detailed account of how to fabricate such a unit is omitted because needed for this is only the provision of a mask pattern, a recording photosensitive material, and recording wavelength for the added color.

Then, reference is made to another multi-color hologram display unit in which a volume hologram recorded at two wavelengths is combined with color tuning, and how to product such a multi-color hologram display unit.

Figure 36:
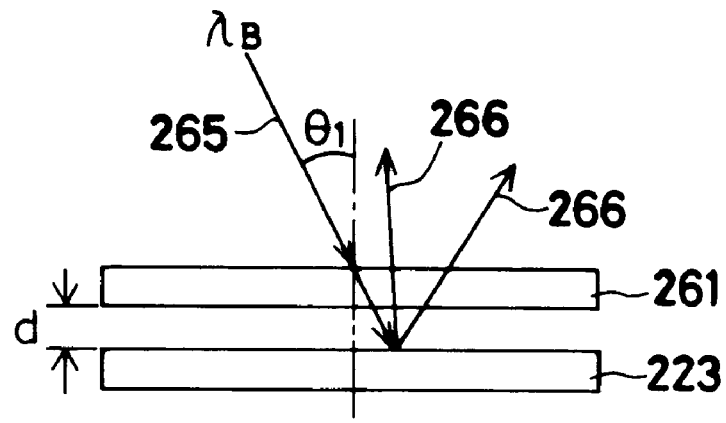
FIG. 36 is illustrative of a part of the process of recording another embodiment of the multicolor hologram display unit of the invention.
Figure 36:
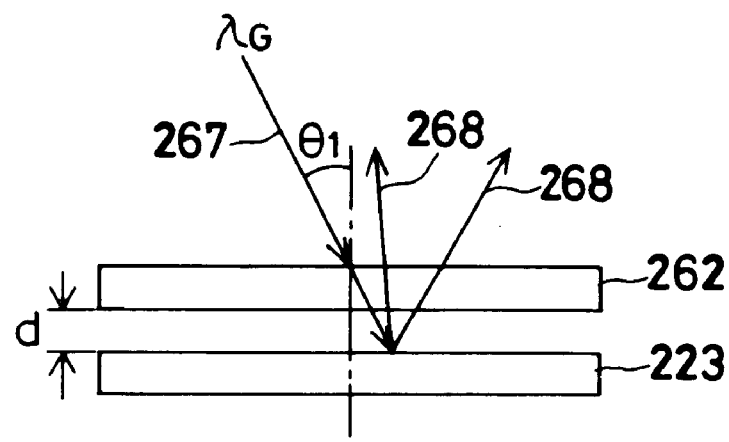
Figure 36:
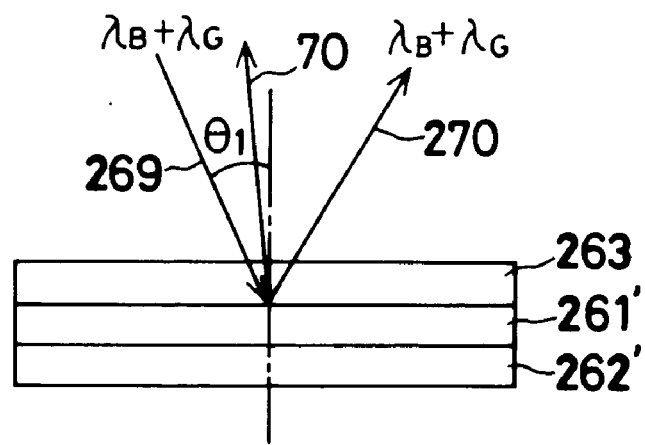

As shown in FIG. 36, two volume hologram-recording photosensitive materials 261 and 262, each formed of a photopolymer, are first provided. A reflecting and scattering plate 223 is located on the back side of one recording photosensitive material 261 with a given distance d between them, as shown in FIG. 36(a). Light 265 of a blue wavelength $\lambda_B$ strikes at an angle of incidence $\theta_1$ all over an effective area of the recording photosensitive material 261. This incident light is reflected and scattered at the reflecting and scattering plate 223 upon transmission through the recording photosensitive material 261, and the thus reflected and scattered light 266 and the incident light 265 interfere in the photosensitive area to record therein a blue diffraction volume hologram 261' that reflects, scatters, and diffracts light of blue wavelength uniformly from the entire effective area. Likewise, the reflecting and scattering plate 223 is located on the back side of the recording photosensitive material 262 with a given distance d between them, as illustrated in FIG. 36(b). Light 267 of a green wavelength $\lambda_G$ strikes at the same angle of incidence $\theta_1$ all over an effective area of the recording photosensitive material 262. This incident light is reflected and scattered at the reflecting and scattering plate 223 upon transmission through the recording photosensitive material 262, and the thus reflected and scattered light 268 and the incident light 267 interfere in the photosensitive area to record therein a green diffraction volume hologram 262' that reflects, scatters, and diffracts light of green wavelength uniformly from the entire effective area. It is here to be understood that the distance d is determined depending on the desired reflection and scattering characteristics of the volume hologram to be recorded. Of course, the plate 223 may be in close contact with the recording material, that is, the distance d may be nearly equal to zero.

As illustrated in FIG. 36(c), the aforesaid blue, and green diffraction volume holograms 261' and 262' are put one upon another to prepare a hologram assembly. Another volume hologram-recording photosensitive material 263 is put on the hologram assembly in close contact or spaced-away relation thereto. Coherent replicating-illumination light 269 including wavelengths $\lambda_B$ and $\lambda_G$ strikes at an angle of incidence $\theta_1$ on the recording photosensitive material 263, whereupon the illumination light 269 and reflected, scattered and diffracted light 270 comprising a light component of wavelength $\lambda_B$ diffracted through the volume hologram 261' and a light component of wavelength $\lambda_G$ diffracted through the volume hologram 262' interfere in the recording photosensitive material 263 to make a hologram 263' in which there are multi-recorded a blue diffraction volume hologram that reflects, scatters, and diffracts light of blue wavelength uniformly from the entire surface of its effective area, and a green diffraction volume hologram that reflects, scatters, and diffracts light of green wavelength. It is here to be noted that the hologram 263' in which there are multi-recorded a blue diffraction volume hologram that reflects, scatters, and diffracts light of blue wavelength uniformly from the entire surface of its effective area, and a green diffraction volume hologram that reflects, scatters, and diffracts light of green wavelength may also be made by exposing a single recording photosensitive material 263 to light concurrently or successively as shown in FIGS. 36(a) and 36(b).

Figure 37A:
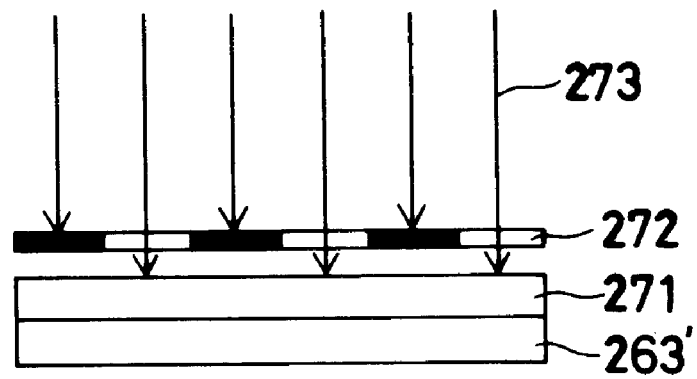
FIG. 37 is illustrative of another part of the process of recording another embodiment of the multicolor hologram display unit of the invention.
Figure 37B:
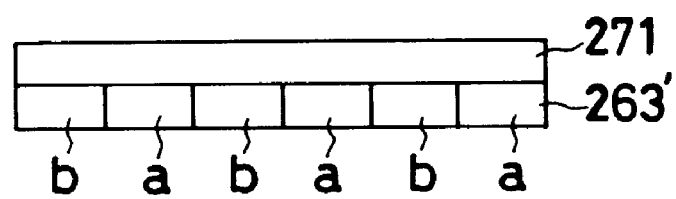

Then, as shown in FIG. 37(a), a swelling film 271 (hereinafter called a color tuning film), which is obtained as explained with reference to FIGS. 44 and 45, that is, by mixing a monomer or oligomer and a photopolymerization initiator, etc. with a binder polymer as in the case of a photopolymer, is superposed on the thus prepared hologram 363'. While a mask 272 having a repeated pattern comprising transparent openings such as dots is placed over the color tuning film 271, the color tuning film 271 is irradiated with ultraviolet radiation or other light 273 in a quantity sufficient to polymerize and thereby deactivate a nearly all part of the active penetrating monomer or oligomer contained therein, so that portions of the color tuning film 271 corresponding to the transparent openings in the mask 272 are substantially deactivated. After such irradiation, the assembly is thermally treated under temperature and time conditions sufficient to diffuse the active penetrating monomer or oligomer from the color tuning film 271 into the hologram 263'. Consequently, in a portion—shown by b in FIG. 37(b)—of the hologram 263' corresponding to a position on which the light 273 does not strike, the distance between the interference fringes of the blue diffraction volume hologram becomes wide, providing a green diffraction volume hologram that reflects, and diffracts light of green wavelength. In the same portion b, the distance between the interference fringes of the green diffraction volume hologram, too, becomes large, providing a red diffraction volume hologram that reflects, and diffracts light of red wavelength. In a portion—shown by a in FIG. 37(b)—of the hologram 263' corresponding to a position on which the color tuning film 271 is substantially deactivated by the incident light 273, both the blue, and green diffraction volume holograms remain substantially unchanged.

Figure 37C:
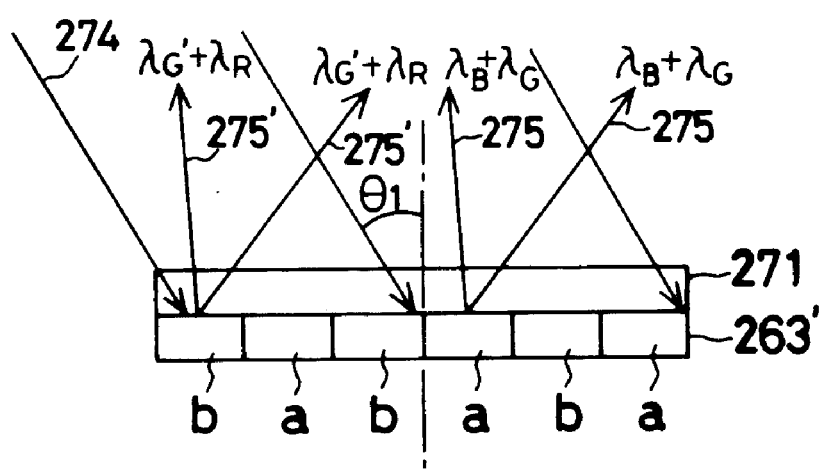

Then, as shown in FIG. 37(c), the hologram 263' color-tuned as mentioned above is irradiated at the same angle of incidence $\theta_1$ as in hologram recording with illumination light 274 including green wavelengths $\lambda_G$, $\lambda_G'$ and red wavelength $\lambda_R$. Thereupon, the light 274 is reflected, scattered, and diffracted from the portion a of the hologram 263' to produce light having wavelengths $\lambda_B$ and $\lambda_G$ while it is reflected, scattered, and diffracted from the portion b of the hologram 263' to produce light 275' having wavelengths $\lambda_G'$ and $\lambda_R$. The light 275 is seen as cyan blue while the light 275' is seen as yellow.

Figure 38A:
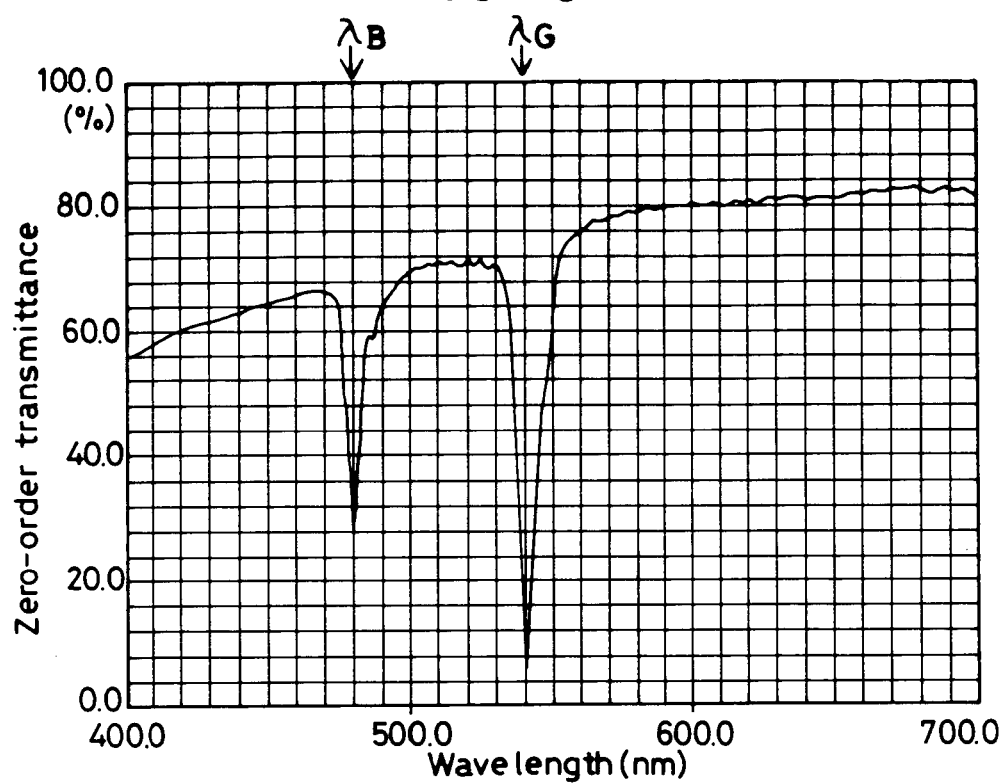
FIG. 38 is illustrative of an example of the diffraction efficiency profile of the multicolor display unit shown in FIGS. 36 and 37.
Figure 38B:
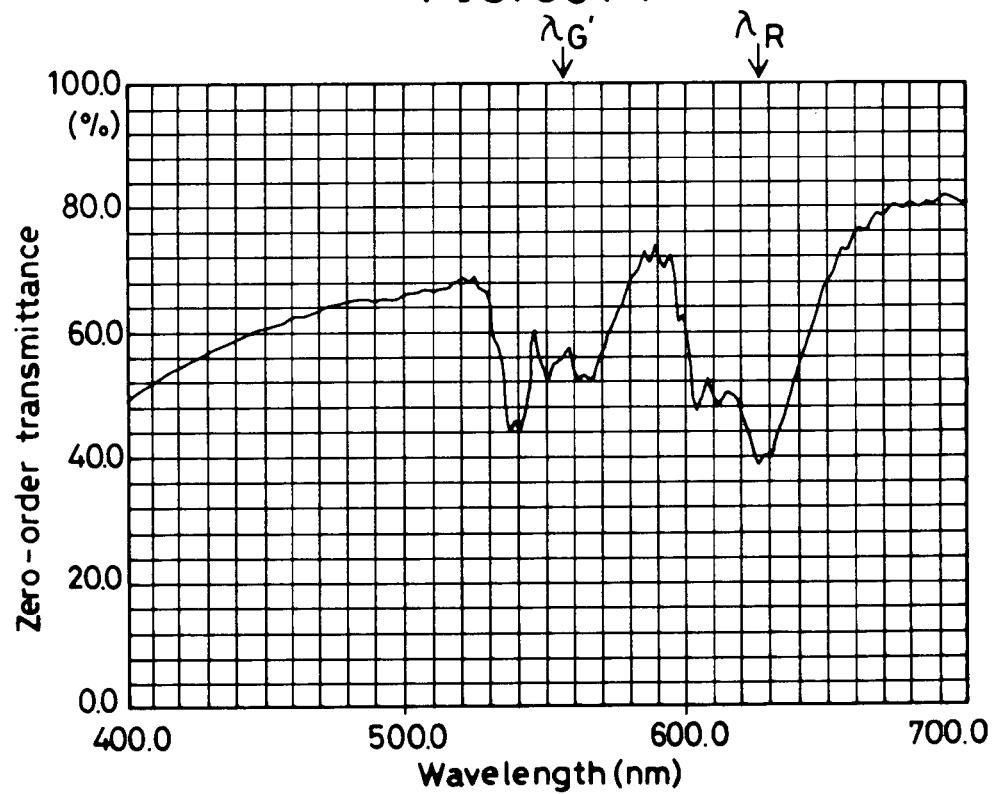

FIGS. 38(a) and 38(b) are illustrative of curves showing one example of diffraction efficiency profiles of the volume hologram at the portions a and b of hologram 263'. It is here to be noted that the ordinates show zero-order light transmittances complementary to diffraction efficiency, rather than a direct indication of diffraction efficiency. In this example, omnidex 706 (Du Pont) was used as the photopolymer for the recording photosensitive material 263 and CTF 75 (Du Pont) as the color tuning film 271. The thermal treatment for the diffusion of the active penetrating monomer or the like was carried out at 120° C. for 2 hours. From FIG. 38, it is well found that light having a blue wavelength $\lambda_B$ and a green wavelength $\lambda_G$ is reflected, scattered, and diffracted from the portion a which has not been subjected to color tuning (see FIG. 38(a)), and that light having a green wavelength $\lambda_G'$ and a red wavelength $\lambda_R$ is reflected, scattered, and diffracted from the portion b which has been subjected to color tuning.

If the portions a and b are fine, the hologram 263' is as a whole seen as an added cyan blue and yellow color by additive color mixing. However, it is possible to reconstruct halftone colors because the mixing ratio of the cyan blue and yellow can be varied depending on area gradation or density gradation by control of the ratio of the area of the transparent portion of mask 272 (corresponding to the area of portions a) and the area of the opaque portion of mask 272 (corresponding to the area of portions b), the transmittance of the transparent portion of mask 272, e.g., dots, the quantity of light 273 used, the intensity ratio of blue and green laser light, and the thermal treatment conditions. If the mask 272 is designed such that the area gradation or density gradation varies in a position-depending manner, it is then possible to construct the hologram 263' in the form of a multi-color hologram display unit.

By similar control, it is also possible to construct the hologram 263' in the form of a hologram reflecting and scattering plate which is as a whole seen as nearly white or greenish white by additive color mixing of cyan blue and yellow. Such a hologram reflecting and scattering plate may be used as a bright reflecting and scattering plate for liquid crystal display devices.

Figure 39:
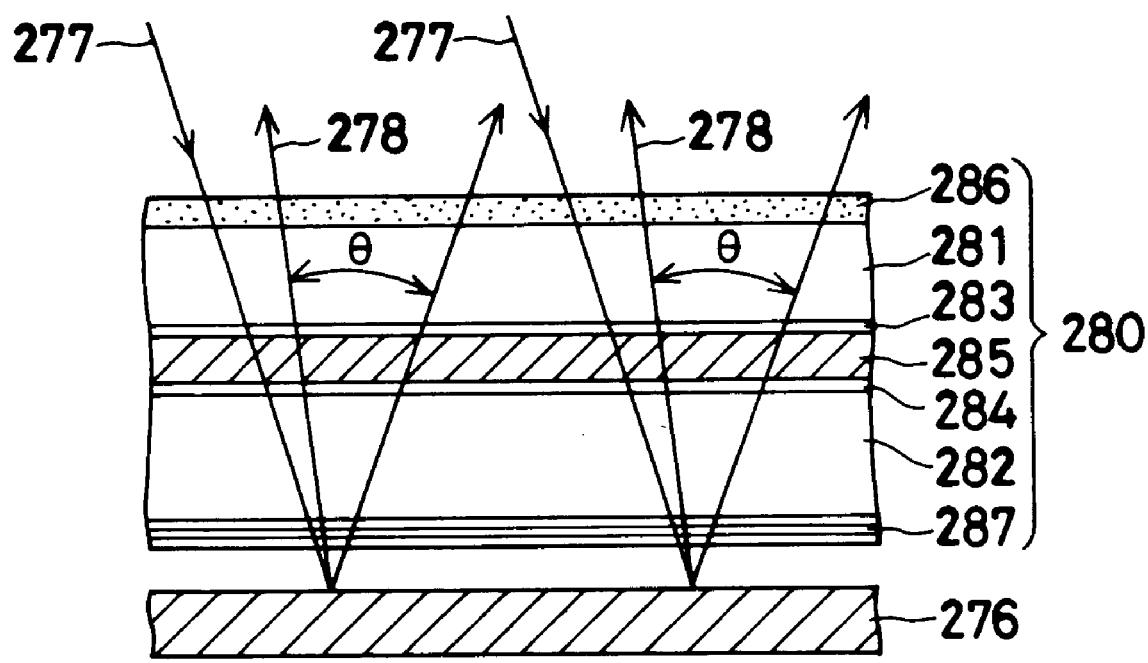
FIG. 39 is a sectional schematic of a liquid crystal display apparatus constructed using a white hologram reflecting and scattering plate based on the invention.

Here, a liquid crystal display apparatus using such a hologram reflecting and scattering plate will be briefly explained. The white hologram reflecting and scattering plate according to the present invention is a hologram designed to diffuse and reflect light incident from a specific direction (the direction of illumination light 274 in FIG. 37(c)) to only a direction defined as a viewing region. As illustrated in section in FIG. 39, a liquid crystal display apparatus is built up of a liquid crystal display device 280, and a white hologram reflecting and scattering plate 276 located on the back side thereof. Illumination light 277 incident from the display side of the liquid crystal display device 280 is converted into diffused light 278 which has been diffused and reflected only in an angle range θ commensurate with the viewing region of the liquid crystal display device, so that displays can be achieved in the bright place without recourse to any self-emission type backlight. For instance, the liquid crystal display device 280 comprises a twisted nematic or other liquid crystal layer 285 sandwiched between two glass substrates 281 and 282. One glass substrate 282 is provided on its inner surface with uniform transparent opposite electrodes 284, and the other glass substrate 281 is provided on its inner surface with transparent display electrodes 283, independent per pixel, and a black matrix (not shown). It is here to be noted that in the case of a color display apparatus, the other glass substrate 281 is additionally provided on its inner surface with transparent display electrodes 283, color filters, and black matrices independent per liquid crystal cells R, G, and B. Sides of the electrodes 283 and 284 opposite to the liquid crystal layer 285 are provided with aligning layers (not shown). The outer surface of the glass substrate 281 on the viewing side is provided with a polarizing plate 286, and the outer surface of the glass substrate 282 on the back side of the glass substrate 281 is provided with a polarizing plate 287, for instance, with the transmission axes thereof being perpendicular with respect to each other. By controlling the voltage applied between the transparent display electrodes and the transparent opposite electrodes to vary the state of transmission, it is possible to selectively display figures, characters, symbols, patterns, etc. on the liquid crystal display apparatus.

Figure 40A:
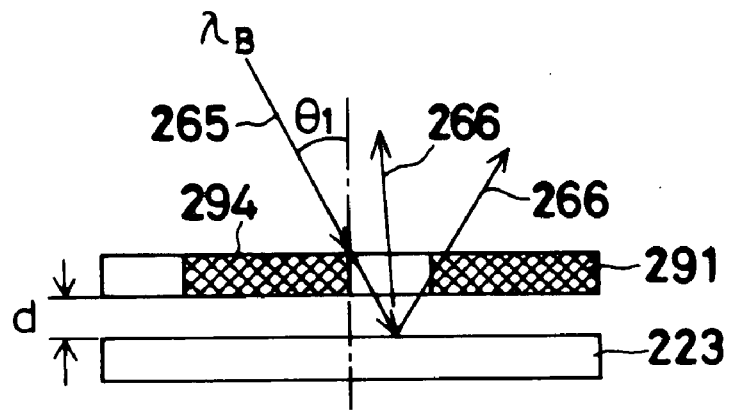
FIG. 40 is illustrative of a part of the process of recording the multicolor hologram display unit shown in FIGS. 36 and 37.

In the embodiment of FIG. 36, the blue, and green diffraction volume holograms are recorded all over the surfaces of the effective areas of recording photosensitive materials 261, and 262, respectively. Here consider the case where volume holograms are recorded in the desired pattern areas alone at the stages of FIGS. 36(a) and 36(b). First, two volume hologram-recording photosensitive materials 291 and 292 are provided. As in FIG. 31, a blue mask pattern is superposed on the recording photosensitive material 291 for recording a blue diffraction volume hologram therein. Then, the recording photosensitive material 291 is irradiated with ultraviolet radiation from the mask pattern, so that a pattern area 294 of the recording photosensitive material 291 is exposed to, and deactivated, by the ultraviolet radiation, as shown in FIG. 40(a). A green mask pattern is, on the other hand, put on the recording photosensitive material 292 for recording a green diffraction volume hologram therein. Then, the recording photosensitive material 292 is irradiated with ultraviolet radiation from the mask pattern, so that a pattern area 295 of the recording photosensitive material 292 is exposed to, and deactivated, by the ultraviolet radiation, as shown in FIG. 40(b).

Figure 40B:
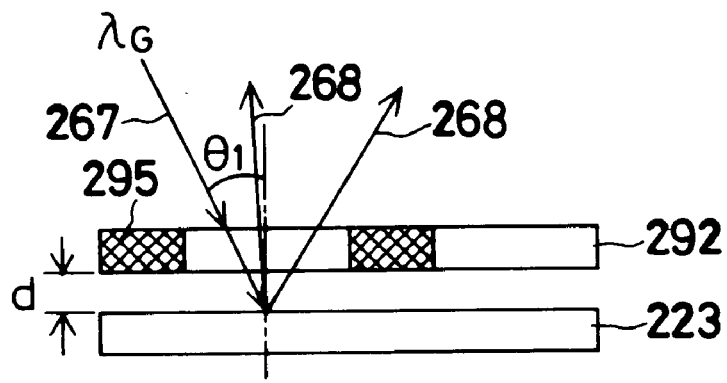
Figure 40C:
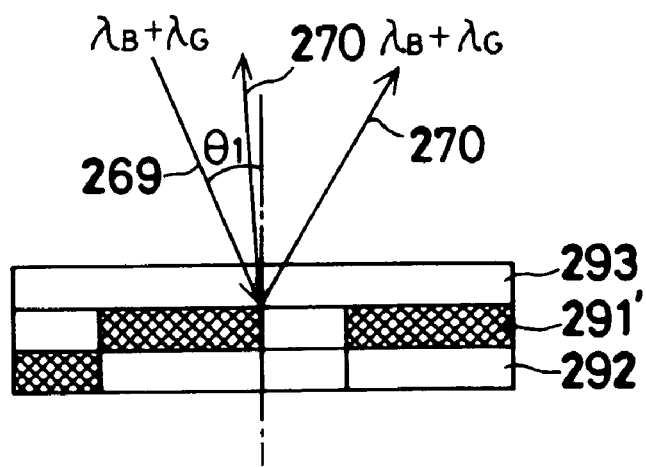

Following this, as shown in FIGS. 40(a) and 40(b), blue, and green diffraction volume holograms 291', and 292' are recorded in the remaining active areas of the recording photosensitive materials 291, and 292, respectively, as is the case with FIGS. 36(a) and 36(b), said blue diffraction volume hologram 291' being designed to reflect, scatter, and diffract light of blue wavelength from the active area alone, and said green diffraction volume hologram 292' being designed to reflect, scatter, and diffract light of green wavelength from the active area alone. Thereafter, as shown in FIG. 40(c), the blue, and green diffraction volume holograms 291', and 292' are put one upon another, as is the case with FIG. 36(c), thereby forming a hologram assembly. After another volume hologram-recording photosensitive material 293 is located in close contact with, or spaced slightly away from, the hologram assembly, it is irradiated with coherent replicating illumination light 269 including wavelengths $\lambda_B$ and $\lambda_G$ at an angle of incidence $\theta_1$, so that the incident illumination light 269, and the reflected, scattered, and diffracted light 270 comprising light diffracted through the volume hologram 291' and having wavelength $\lambda_B$ and light diffracted through the volume hologram 292' and having wavelength $\lambda_G$ interfere in the photosensitive material 293 to make a hologram 293' in which there are multi-recorded a blue diffraction volume hologram that reflects, scatters, and diffracts light of blue wavelength from a separately patterned area, and a green diffraction volume hologram that reflects, scatters, and diffracts light of green wavelength from a separately patterned area. It is here to be noted that the hologram 293' in which there are multi-recorded a blue diffraction volume hologram that reflects, scatters, and diffracts light of blue wavelength uniformly from the separately patterned area, and a green diffraction volume hologram that reflects, scatters, and diffracts light of green wavelength from the separately patterned area may also be made by exposing a single recording photosensitive material 293 to light concurrently or successively as shown in FIGS. 40(a) and 40(b).

Figure 41A:
FIG. 41 is illustrative of another part of the process of recording the multicolor hologram display unit shown in FIGS. 36 and 37.
Figure 42A:
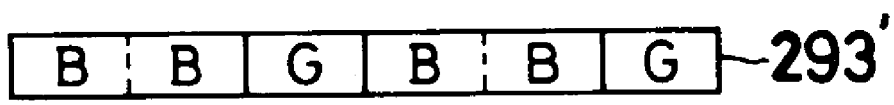
FIG. 42 is illustrative of yet another part of the process of recording the multicolor hologram display unit shown in FIGS. 36 and 37.

In the thus obtained or multi-recorded hologram 293', blue diffraction volume hologram areas B and green diffraction volume hologram areas G are alternately arranged side-by-side, as illustrated in FIGS. 41(a) and 42(a).

Figure 41B:
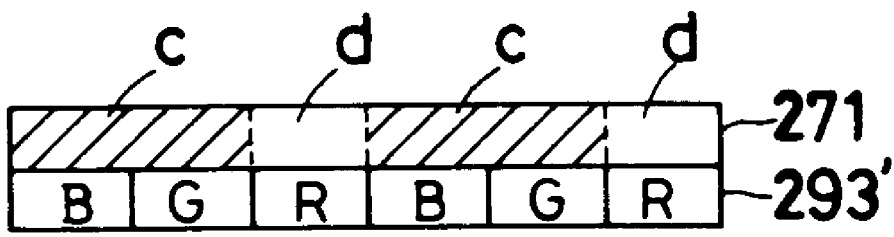

Although not illustrated, the blue diffraction volume hologram area B may overlap partly with the green diffraction volume hologram area G. In some cases, there may be a region in which both the blue, and green diffraction volume hologram areas B, and G are not recorded, although not again illustrated. Referring to FIGS. 41(*a*) and 42(*a*), the blue, and green diffraction volume hologram areas B, and G are alternately arranged side-by-side. However, FIG. 41(*a*) shows an embodiment wherein the area G is twice as wide as the area B, and FIG. 42(*a*) shows an embodiment wherein the area B is twice as wide as the area G. In the hologram 293' wherein the blue, and green diffraction volume hologram areas G, and B are multi-recorded, the blue and/or green diffraction volume holograms may be color-tuned through a color tuning film 271, as in FIGS. 37(*a*) and 37(*b*). In this case, the distance between the interference fringes of the blue diffraction volume hologram becomes large, providing a green diffraction volume hologram that reflects, and diffracts light of green wavelength, and so is the distance between the interference fringes of the green diffraction volume hologram, providing a red diffraction volume hologram that reflects, and diffracts light of red wavelength.

Figure 42B:
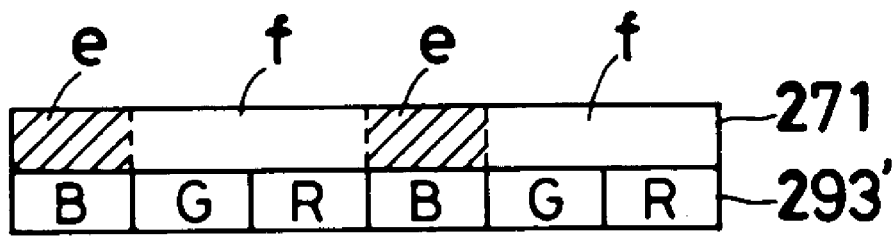

Referring to FIG. 41(*b*), an area c of the color tuning film 271 is deactivated and so unavailable for color tuning. In other words, effective for color tuning is an area d where half of the green diffraction volume hologram area G in the hologram 293' is converted into a red diffraction volume hologram area R. Referring to FIG. 42(*b*), an area e of the color tuning film 271 is deactivated and so unavailable for color tuning. In other words, effective for color tuning is an area f where half of the blue diffraction volume hologram area B in the hologram 293' is converted into a green diffraction volume hologram area G, which is in turn converted into a red diffraction volume hologram area R. In any case, three areas of substantially similar size and located adjacent to one another provide blue, green, and red diffraction volume hologram areas B, G, and R; each area provides a fine pixel. By appropriately selecting the area or density gradation of the pixels, the pattern and transmittance of the mask for the deactivation of the recording photosensitive materials 261 and 262, and the pattern and transmittance of the mask for the deactivation of the color tuning film 271, it is thus possible to display any desired color pattern, thereby expressing any desired color at any desired position by additive color mixing of RGB.

It is here to be noted that in the hologram 263' or 293' partially color tuned by the color tuning film 271, the color tuning film 271 may be either released from or integral with the final hologram display unit.

While the multicolor hologram display unit of the invention has been described with reference to several embodiments, it is understood that the invention is not limited thereto, and so various modifications may be possible. It is also understood that volume holograms of the transmission scattering type or the type that enables 3D images or other pictures to be reproduced may be used as holograms. Furthermore, it is understood that the dots used herein may be not only a collection of patterns such as micro-circles or rectangles but also a collection of micro-stripes.

In the multicolor hologram display unit of the invention as can be understood from the foregoing explanation, halftone pattern areas defined by dot percents are formed by superposing hologram dots of one color on a background hologram of another color. Thus, the accuracy needed for alignment of hologram plates having different colors may be much more reduced as compared with the case where dot alignment is required. Also, since halftone colors are produced by dot percents, not by hologram-recording intensity, they can be reconstructed in a stable manner and with good reproducibility. It is thus possible to mass-produce multicolor hologram display units in a stable manner and with good reproducibility.

According to another multicolor hologram display unit of the invention, it is possible to reproduce a color different from recorded one by simple color tuning of a part or local area of the multi-recorded volume hologram using a color tuning film. It is thus possible to produce a large amount of any color pattern by additive color mixing of the recorded color and the color-tuned color with good reproducibility. It is also possible to easily obtain a hologram reflecting and scattering plate that is substantially white all over the surface.

What is claimed is:

1. A method of fabricating a hologram-recorded medium from a photopolymer capable of recording a volume hologram, the method comprising:
    stacking the photopolymer material on a dichroic filter comprising a multilayer interference film, said dichroic filter being stacked on a first reflection type relief hologram, and
    striking reconstructing illumination light of given wavelength on said first reflection type relief hologram through said photopolymer and said dichroic filter, so that first interference fringes produced by interference of light diffracted from said first reflection type relief hologram and the incident light are recorded in said photopolymer,
    replacing said first reflection type relief hologram with a second reflection type relief hologram and striking reconstructing illumination light of the given wavelength on said second reflection type relief hologram through said photopolymer and said dichroic filter, so that second interference fringes produced by interference of light diffracted from said second reflection type relief hologram and the incident light are recorded in said photopolymer,
    wherein each of said first and second reflection type relief holograms comprises a computer generated hologram (CGH);
    the resulting hologram comprises a set of pixels and interference gratings differing in grating surface spacing and inclination for each pixel which are recorded therein; and
    the first reflection type relief hologram differs from the second reflection type relief hologram.

2. The method of fabricating a hologram-recorded medium of claim 1, wherein the computer generated hologram is fabricated using an electron beam.

3. The method of fabricating a hologram-recorded medium of claim 1, wherein the dichroic filter is replaced with another dichroic filter when the first reflection type relief hologram is replaced with the second reflection type relief hologram.

4. A method of fabricating a hologram-recorded medium from a photopolymer capable of recording a volume hologram, the method comprising:
    stacking the photopolymer on a dichroic filter comprising a multilayer interference film, said dichroic filter being stacked on a first transmission type hologram,
    striking reconstructing illumination light of given wavelength on a first side of said first transmission type hologram that is opposite a second side of said first transmission type hologram which is facing said photopolymer, so that first interference fringes produced by interference of light diffracted from said first transmission type hologram and the incident light incident on said photopolymer are recorded in said photopolymer, replacing said first transmission type hologram with a second transmission type hologram and striking reconstructing illumination light of the given wavelength on said second transmission type hologram through said photopolymer, so that second interference fringes produced by interference of light diffracted from said second transmission type hologram and the incident light are recorded in said photopolymer, wherein each of said first and second transmission type holograms comprises a computer generated hologram (CGH);

the resulting hologram comprises a set of pixels and interference gratings differing in grating surface spacing and inclination for each pixel which are recorded therein; and the first transmission type relief hologram differs from the second transmission type relief hologram.

5. The method of fabricating a hologram-recorded medium of claim 4, wherein the dichroic filter is replaced with another dichroic filter when the first transmission type hologram is replaced with the second transmission type hologram.

* * * * *